United States Patent
Bridge et al.

(10) Patent No.: US 9,325,947 B2
(45) Date of Patent: Apr. 26, 2016

(54) HIGH-SPEED EVENT DETECTION USING A COMPRESSIVE-SENSING HYPERSPECTRAL-IMAGING ARCHITECTURE

(71) Applicant: InView Technology Corporation, Austin, TX (US)

(72) Inventors: Robert F. Bridge, Austin, TX (US); Lenore McMackin, Austin, TX (US)

(73) Assignee: InView Technology Corporation, Austin, TX (US)

( * ) Notice: Subject to any disclaimer, the term of this patent is extended or adjusted under 35 U.S.C. 154(b) by 488 days.

(21) Appl. No.: 13/664,289

(22) Filed: Oct. 30, 2012

(65) Prior Publication Data

US 2013/0128042 A1   May 23, 2013

Related U.S. Application Data

(63) Continuation-in-part of application No. 13/534,528, filed on Jun. 27, 2012.

(60) Provisional application No. 61/553,347, filed on Oct. 31, 2011, provisional application No. 61/502,153, filed on Jun. 28, 2011.

(51) Int. Cl.
    *H04N 7/18*      (2006.01)
    *H04N 5/232*     (2006.01)

(52) U.S. Cl.
    CPC . *H04N 7/18* (2013.01); *H04N 5/232* (2013.01)

(58) Field of Classification Search
    CPC ....................................................... H04N 7/18
    See application file for complete search history.

(56) References Cited

U.S. PATENT DOCUMENTS

| 4,709,140 A | * | 11/1987 | Oba | H01J 40/16 250/207 |
| 4,931,384 A | * | 6/1990 | Layton | G01N 21/554 250/461.1 |

(Continued)

OTHER PUBLICATIONS

U.S. Appl. No. 61/372,826, entitled "Compressive Sensing Systems and Methods", filed Aug. 11, 2010, invented by Richard G. Baraniuk et al.

(Continued)

*Primary Examiner* — Richard Torrente
*Assistant Examiner* — Irfan Habib
(74) *Attorney, Agent, or Firm* — Meyertons Hood Kivlin Kowert & Goetzel, P.C.; Jeffrey C. Hood; Mark K. Brightwell

(57) ABSTRACT

A compressive imaging system and method for quickly detecting spectrally and spatially localized events (such as explosions or gun discharges) occurring within the field of view. An incident light stream is modulated with a temporal sequence of spatial patterns. The wavelength components in the modulated light stream are spatially separated, e.g., using a diffractive element. An array of photodetectors is used to convert subsets of the wavelength components into respective signals. An image representing the field of view may be reconstructed based on samples from some or all the signals. A selected subset of the signals are monitored to detect event occurrences, e.g., by detecting sudden changes in intensity. When the event is detected, sample data from the selected subset of signals may be analyzed to determine the event location within the field of view. The event location may be highlighted in an image being generated by the imaging system.

22 Claims, 32 Drawing Sheets

(56) References Cited

U.S. PATENT DOCUMENTS

| | | | | |
|---|---|---|---|---|
| 5,295,019 | A * | 3/1994 | Rapoport | G02B 27/1006 359/634 |
| 5,457,561 | A * | 10/1995 | Taneya | H04B 10/1121 398/119 |
| 5,546,128 | A * | 8/1996 | Nakagakiuchi | G09G 3/002 348/207.99 |
| 5,726,805 | A * | 3/1998 | Kaushik | G01J 3/02 359/489.19 |
| 5,738,825 | A * | 4/1998 | Rudigier | B01L 3/5085 422/425 |
| 5,859,427 | A * | 1/1999 | Horie | H01N 1/02409 250/201.2 |
| 6,464,363 | B1 * | 10/2002 | Nishioka | G02B 7/102 359/224.1 |
| 6,587,248 | B1 * | 7/2003 | Gyoten | G09G 3/3406 359/237 |
| 6,784,428 | B2 * | 8/2004 | Rabolt | G01J 3/02 250/339.02 |
| 6,819,469 | B1 * | 11/2004 | Koba | G03F 7/70291 359/290 |
| 6,839,166 | B2 * | 1/2005 | Fukushima | G02B 21/14 359/247 |
| 7,233,392 | B2 * | 6/2007 | Margalith | G01J 3/2823 356/300 |
| 7,330,614 | B1 * | 2/2008 | Mossberg | G02B 6/12007 356/328 |
| 8,199,244 | B2 | 6/2012 | Baraniuk et al. | |
| 8,570,406 | B2 * | 10/2013 | Kelly | G02B 26/0833 341/123 |
| 8,675,119 | B2 * | 3/2014 | Nayar | G02B 26/06 348/344 |
| 2002/0105711 | A1 * | 8/2002 | Kaneko | G01J 9/00 359/248 |
| 2004/0131002 | A1 * | 7/2004 | Odajima | G11B 7/1356 369/112.29 |
| 2004/0195511 | A1 * | 10/2004 | Elmore | G01J 3/02 250/339.02 |
| 2006/0239336 | A1 * | 10/2006 | Baraniuk | H04L 25/20 375/216 |
| 2006/0274417 | A1 * | 12/2006 | Kanazawa | G02B 5/32 359/566 |
| 2007/0146880 | A1 * | 6/2007 | Bleha | G02B 27/102 359/468 |
| 2008/0080059 | A1 * | 4/2008 | Dixon | G01N 21/6452 359/629 |
| 2008/0100836 | A1 * | 5/2008 | Hagler | G01J 3/02 356/310 |
| 2009/0116029 | A1 * | 5/2009 | Ohtera | G01J 3/02 356/456 |
| 2009/0201236 | A1 * | 8/2009 | Arai | G02B 26/0833 345/84 |
| 2010/0301218 | A1 * | 12/2010 | Ayer | G01J 3/12 250/341.1 |
| 2011/0026022 | A1 * | 2/2011 | Takizawa | G01J 3/02 356/328 |
| 2011/0080581 | A1 * | 4/2011 | Bhargava | G01J 3/02 356/302 |
| 2011/0228116 | A1 * | 9/2011 | Margalith | G01J 3/2803 348/222.1 |
| 2012/0038786 | A1 * | 2/2012 | Kelly | G02B 26/0833 348/222.1 |
| 2012/0038805 | A1 | 2/2012 | Kelly et al. | |
| 2012/0038817 | A1 * | 2/2012 | McMackin | G02B 26/0833 348/345 |
| 2012/0038819 | A1 * | 2/2012 | McMackin | H04N 5/335 348/369 |
| 2013/0077958 | A1 * | 3/2013 | Xu | G03B 11/00 396/544 |
| 2014/0253912 | A1 * | 9/2014 | Honda | G01N 21/956 356/237.5 |

OTHER PUBLICATIONS

U.S. Appl. No. 61/502,153, entitled "Various Compressive Sensing Mechanisms", filed Jun. 28, 2011, invented by James M. Tidman et al.

U.S. Appl. No. 13/631,626, entitled "Adaptive Search for Atypical Regions in Incident Light Field and Spectral Classification of Light in the Atypical Regions", filed Sep. 28, 2012, invented by Richard G. Baraniuk and Tyler H. Weston.

U.S. Appl. No. 13/534,414, entitled "Image Sequence Reconstruction based on Overlapping Measurement Subsets", filed Jun. 27, 2012, invented by James M. Tidman et al.

U.S. Appl. No. 13/534,249, entitled "User Control of the Visual Performance of a Compressive Imaging System", filed Jun. 27, 2012, invented by Robert F. Bridge et al.

Ocean Optics; "QE65000 Scientific-grade Spectrometer," Scientific-Grade Spectroscopy, Products, retrieved from <http://www.oceanoptics.com/Products/qe65000.asp> on Dec. 18, 2012; pp. 1-4.

"Hyperspectral imaging;" Wikipedia, last modified Dec. 1, 2012, retrieved from <http://en.wikipedia.org/w/index.php?title=Hyperspectral_imaging&printable=yes> on Dec. 18, 2012; pp. 1-9.

Takhar et al.; "A New Compressive Imaging Camera Architecture using Optical-Domain Compression;" Society of Photo-Optical Instrumentation Engineers, Jan. 2006, retrieved from <http://dsp.rice.edu/sites/dsp.rice.edu/files/cs/cscam-SPIEJan06.pdf> on Dec. 18, 2012; pp. 1-10.

* cited by examiner

1700

```
┌─────────────────────────────────────────────────────────────┐
│ receive a modulated light stream, where the modulated light │
│ stream is generated by modulating an incident light stream  │
│ with a temporal sequence of spatial patterns    1710        │
└─────────────────────────────────────────────────────────────┘
                              ↓
┌─────────────────────────────────────────────────────────────┐
│ separate the modulated light stream into a plurality of     │
│ wavelength components    1715                               │
└─────────────────────────────────────────────────────────────┘
                              ↓
┌─────────────────────────────────────────────────────────────┐
│ convert subsets of the wavelength components into respective│
│                  signals    1720                            │
└─────────────────────────────────────────────────────────────┘
                              ↓
┌─────────────────────────────────────────────────────────────┐
│ sample the signals in order to obtain respective sample     │
│ sequences    1725                                           │
└─────────────────────────────────────────────────────────────┘
                              ↓
┌─────────────────────────────────────────────────────────────┐
│ monitor a selected subset of the signals to detect an event │
│ occurring within a field of view corresponding to the       │
│ incident light stream, wherein said detecting the event     │
│ includes determining when the selected subset of signals    │
│ satisfy a pre-determined signal condition    1730           │
└─────────────────────────────────────────────────────────────┘
```

FIG. 17

HIGH-SPEED EVENT DETECTION USING A COMPRESSIVE-SENSING HYPERSPECTRAL-IMAGING ARCHITECTURE

RELATED APPLICATION DATA

This application claims the benefit of priority to U.S. Provisional Application No. 61/553,347, filed on Oct. 31, 2011, entitled "Hi-Speed Compressive Sensing Hyperspectral Imaging System", invented by Robert F. Bridge and Lenore McMackin, which is hereby incorporated by reference in its entirety as though fully and completely set forth herein.

Furthermore, this application is a continuation-in-part of U.S. patent application Ser. No. 13/534,528, filed on Jun. 27, 2012, entitled "Mechanisms for Conserving Power in a Compressive Imaging System", invented by Bridge, Tidman, McMackin and Chatterjee, which claims the benefit of priority to U.S. Provisional Application No. 61/502,153, filed on Jun. 28, 2011, entitled "Various Compressive Sensing Mechanisms", invented by Tidman, Weston, Bridge, McMackin, Chatterjee, Woods, Baraniuk and Kelly. patent application Ser. No. 13/534,528 and Provisional Application 61/502,153 are hereby incorporated by reference in their entireties as though fully and completely set forth herein.

FIELD OF THE INVENTION

The present invention relates to the field of compressive imaging, and more particularly, to mechanisms for detecting spectrally and spatially localized events using a compressive sensing hyperspectral imager.

DESCRIPTION OF THE RELATED ART

According to Nyquist theory, a signal x(t) whose signal energy is supported on the frequency interval [−B,B] may be reconstructed from samples {x(nT)} of the signal x(t), provided the rate $f_s=1/T_s$ at which the samples are captured is sufficiently high, i.e., provided that $f_s$ is greater than 2B. Similarly, for a signal whose signal energy is supported on the frequency interval [A,B], the signal may be reconstructed from samples captured with sample rate greater than B−A. A fundamental problem with any attempt to capture a signal x(t) according to Nyquist theory is the large number of samples that are generated, especially when B (or B−A) is large. The large number of samples is taxing on memory resources and on the capacity of transmission channels.

Nyquist theory is not limited to functions of time. Indeed, Nyquist theory applies more generally to any function of one or more real variables. For example, Nyquist theory applies to functions of two spatial variables such as images, to functions of time and two spatial variables such as video, and to the functions used in multispectral imaging, hyperspectral imaging, medical imaging and a wide variety of other applications. In the case of an image I(x,y) that depends on spatial variables x and y, the image may be reconstructed from samples of the image, provided the samples are captured with sufficiently high spatial density. For example, given samples {I(nΔx, mΔy)} captured along a rectangular grid, the horizontal and vertical densities 1/Δx and 1/Δy should be respectively greater than $2B_x$ and $2B_y$, where $B_X$ and $B_y$ are the highest x and y spatial frequencies occurring in the image I(x,y). The same problem of overwhelming data volume is experienced when attempting to capture an image according to Nyquist theory. The modem theory of compressive sensing is directed to such problems.

Compressive sensing relies on the observation that many signals (e.g., images) of practical interest are not only band-limited but also sparse or approximately sparse when represented using an appropriate choice of transformation, for example, a transformation such as a Fourier transform, a wavelet transform or a discrete cosine transform (DCT). A signal vector v is said to be K-sparse with respect to a given transformation T when the transformation of the signal vector, Tv, has no more than K non-zero coefficients. A signal vector v is said to be sparse with respect to a given transformation T when it is K-sparse with respect to that transformation for some integer K much smaller than the number L of components in the transformation vector Tv.

A signal vector v is said to be approximately K-sparse with respect to a given transformation T when the coefficients of the transformation vector, Tv, are dominated by the K largest coefficients (i.e., largest in the sense of magnitude or absolute value). In other words, if the K largest coefficients account for a high percentage of the energy in the entire set of coefficients, then the signal vector v is approximately K-sparse with respect to transformation T. A signal vector v is said to be approximately sparse with respect to a given transformation T when it is approximately K-sparse with respect to the transformation T for some integer K much less than the number L of components in the transformation vector Tv.

Given a sensing device that captures images with N samples per image and in conformity to the Nyquist condition on spatial rates, it is often the case that there exists some transformation and some integer K very much smaller than N such that the transform of each captured image will be approximately K sparse. The set of K dominant coefficients may vary from one image to the next. Furthermore, the value of K and the selection of the transformation may vary from one context (e.g., imaging application) to the next. Examples of typical transforms that might work in different contexts include the Fourier transform, the wavelet transform, the DCT, the Gabor transform, etc.

Compressive sensing specifies a way of operating on the N samples of an image so as to generate a much smaller set of samples from which the N samples may be reconstructed, given knowledge of the transform under which the image is sparse (or approximately sparse). In particular, compressive sensing invites one to think of the N samples as a vector v in an N-dimensional space and to imagine projecting the vector v onto each vector in a series of M vectors {R(i): i=1, 2, . . . , M} in the N-dimensional space, where M is larger than K but still much smaller than N. Each projection gives a corresponding real number s(i), e.g., according to the expression $$s(i)=<v,R(i)>,$$

where the notation <v,R(i)> represents the inner product (or dot product) of the vector v and the vector R(i). Thus, the series of M projections gives a vector U including M real numbers: $U_i=s(i)$. Compressive sensing theory further prescribes methods for reconstructing (or estimating) the vector v of N samples from the vector U of M real numbers. For example, according to one method, one should determine the vector x that has the smallest length (in the sense of the $L_1$ norm) subject to the condition that ΦTx=U, where Φ is a matrix whose rows are the transposes of the vectors R(i), where T is the transformation under which the image is K sparse or approximately K sparse.

Compressive sensing is important because, among other reasons, it allows reconstruction of an image based on M measurements instead of the much larger number of measurements N recommended by Nyquist theory. Thus, for example, a compressive sensing camera would be able to capture a significantly larger number of images for a given size of image store, and/or, transmit a significantly larger number of images per unit time through a communication channel of given capacity.

As mentioned above, compressive sensing operates by projecting the image vector v onto a series of M vectors. As discussed in U.S. Pat. No. 8,199,244 (issued Jun. 12, 2012, invented by Baraniuk et al.) and illustrated in FIG. 1, an imaging device (e.g., camera) may be configured to take advantage of the compressive sensing paradigm by using a digital micromirror device (DMD) 40. An incident lightfield 10 passes through a lens 20 and then interacts with the DMD 40. The DMD includes a two-dimensional array of micromirrors, each of which is configured to independently and controllably switch between two orientation states. Each micromirror reflects a corresponding portion of the incident light field based on its instantaneous orientation. Any micromirrors in a first of the two orientation states will reflect their corresponding light portions so that they pass through lens 50. Any micromirrors in a second of the two orientation states will reflect their corresponding light portions away from lens 50. Lens 50 serves to concentrate the light portions from micromirrors in the first orientation state onto a photodiode (or photodetector) situated at location 60. Thus, the photodiode generates a signal whose amplitude at any given time represents a sum of the intensities of the light portions from the micromirrors in the first orientation state.

The compressive sensing is implemented by driving the orientations of the micromirrors through a series of spatial patterns. Each spatial pattern specifies an orientation state for each of the micromirrors. The output signal of the photodiode is digitized by an A/D converter 70. In this fashion, the imaging device is able to capture a series of measurements {s(i)} that represent inner products (dot products) between the incident light field and the series of spatial patterns without first acquiring the incident light field as a pixelized digital image. The incident light field corresponds to the vector v of the discussion above, and the spatial patterns correspond to the vectors R(i) of the discussion above.

The incident light field may be modeled by a function I(x,y,t) of two spatial variables and time. Assuming for the sake of discussion that the DMD comprises a rectangular array, the DMD implements a spatial modulation of the incident light field so that the light field leaving the DMD in the direction of the lens 50 might be modeled by $$\{I(n\Delta x, m\Delta y, t) * M(n, m, t)\}$$

where m and n are integer indices, where $I(n\Delta x, m\Delta y, t)$ represents the portion of the light field that is incident upon that $(n,m)^{th}$ mirror of the DMD at time t. The function $M(n,m,t)$ represents the orientation of the $(n,m)^{th}$ mirror of the DMD at time t. At sampling times, the function $M(n,m,t)$ equals one or zero, depending on the state of the digital control signal that controls the $(n,m)^{th}$ mirror. The condition $M(n,m,t)=1$ corresponds to the orientation state that reflects onto the path that leads to the lens 50. The condition $M(n,m,t)=0$ corresponds to the orientation state that reflects away from the lens 50.

The lens 50 concentrates the spatially-modulated light field $$\{I(n\Delta x, m\Delta y, t) * M(n, m, t)\}$$

onto a light sensitive surface of the photodiode. Thus, the lens and the photodiode together implement a spatial summation of the light portions in the spatially-modulated light field:

$$S(t) = \sum_{n,m} I(n\Delta x, m\Delta y, t) M(n, m, t).$$

Signal S(t) may be interpreted as the intensity at time t of the concentrated spot of light impinging upon the light sensing surface of the photodiode. The A/D converter captures measurements of S(t). In this fashion, the compressive sensing camera optically computes an inner product of the incident light field with each spatial pattern imposed on the mirrors. The multiplication portion of the inner product is implemented by the mirrors of the DMD. The summation portion of the inner product is implemented by the concentrating action of the lens and also the integrating action of the photodiode.

In U.S. Pat. No. 8,199,244, Baraniuk at el. teach that, "Many possible embodiments exist for full-color implementation" of the compressive sensing camera, "including a series of prisms to separate the signal between 3 separate photodiodes. In a similar manner we can easily extend the capabilities of our camera for more detailed multispectral or hyperspectral imaging." Thus, Baranuik et al. suggest the possibility of performing hyperspectral imaging using a compressive sensing device. One problem that exists generally in the field of hyperspectral imaging is the problem of detecting events such as explosions, gun discharges and chemical reactions that occur suddenly and are concentrated in a limited spectral band, e.g., a band significantly smaller than the range of wavelengths being captured by the hyperspectral imager. It would be slow and inefficient to monitor the entire wavelength range to detect such events. A compressive sensing implementation of hyperspectral imaging would be subject to the same problem. It would be slow and inefficient to continuously reconstruct images at each wavelength of the hyperspectral range in order to detect spectrally-limited events. Thus, there exists a need for compressed sensing architectures capable of quickly and efficiently detecting such events. Furthermore, having detected such an event, it would be desirable to quickly locate the spatial source of the event within the field of view.

SUMMARY

In one set of embodiments, a system may be configured to acquire compressive imaging measurements at each of a plurality of wavelength bands within a wavelength spectrum. The measurements at each wavelength band may be used to reconstruct a corresponding image. Thus, the system may realize a multispectral or hyperspectral imager. The system may be further configured to detect and locate a spectral event occurring within the field of view by monitoring and analyzing the compressively-acquired measurements corresponding to a selected subset of the wavelength bands. For example, it may be known beforehand that certain types of explosion or gun discharge or chemical reaction will exhibit high-intensity radiation in a given range of wavelengths. Thus, the system may selectively monitor that range of wavelengths to detect such events. Other types of event may express in different wavelength ranges. Thus, the range of wavelengths to be monitored by the system may be programmable.

The system may include a spectral separation subsystem, an array of light sensing elements, a sampling subsystem and a detection unit. The spectral separation subsystem may be configured to receive a modulated light stream, where the modulated light stream is generated by modulating an incident light stream with a temporal sequence of spatial patterns.

The spatial patterns may be measurement patterns, i.e., may be incoherent relative to the set of patterns in which image (or image sequence) carried by the incident light stream is sparse or compressible. (Thus, the samples acquired by the system at each wavelength band comprises compressive measurements.) The spectral separation subsystem is configured to separate the modulated light stream into a plurality of wavelength components, e.g., using a diffraction grating or a prism or a series of spectral filters, etc. The plurality of wavelength components may comprise a continuum of wavelength components spread out spatially. Alternatively, the plurality of wavelength components may include wavelength components that are spatially isolated, e.g., in terms of discrete beams.

The light sensing elements (e.g., photodiodes) may be configured to receive respective subsets (e.g., bands) of the wavelength components and to generate respective signals. Each of the signals represents intensity of the respective subset of the wavelength components as a function of time. The sampling subsystem may be configured to sample the signals in order to obtain respective sample sequences. For example, the sampling system may comprise an array of analog-to-digital converters.

The detection unit may be configured to monitor a selected subset of the signals to detect an event occurring within a field of view corresponding to the incident light stream. The action of detecting the event may include determining when the selected subset of signals satisfy a pre-determined signal condition. For example, the pre-determined signal condition may be the condition that the signals of the selected subset simultaneously exceed respective programmable thresholds. As another example, the pre-determined signal condition may be the condition that rates of change of the respective signals of the selected subset simultaneously exceed respective programmable rate thresholds. As yet another example, the pre-determined signal condition may be the logical AND of the two example conditions given above. As yet another example, the pre-determined signal condition is the condition that the signals of the selected subset have respective values that conform to a pre-determined spectral signature.

In some embodiments, the system may also include a processing unit configured to reconstruct a temporal sequence of images based on the sample sequences acquired by the sampling subsystem, i.e., more than just the selected subset of sample sequences. Each image of the temporal sequence may be reconstructed based on a corresponding temporal window of sample data. (Successive ones of the temporal windows may overlap in time by a pre-determined amount.) The images of the temporal sequence may be interpreted as broad spectrum images or full-spectrum images. The images of the temporal sequence may be displayed via a display device.

In some embodiments, the processing unit may be configured to reconstruct a first image and a second image in response to the detection of the event. The first image may be reconstructed based on a first window of samples taken from the sample sequences corresponding to the selected subset. The second image may be reconstructed based on a second window of samples taken from the sample sequences corresponding to the selected subset. (The first image and the second image may be interpreted as partial-spectrum images since they do not incorporate wavelength components outside the selected subset.) The first window corresponds to a first time interval prior to the event while the second window corresponds to a second time interval that at least partially includes the event. After reconstructing the first image and the second image, the processing unit may determine spatial localization information based on a difference between the first image and the second image. (The spatial localization information indicates where the event has occurred in the field of view.) The processing unit may inject a visual representation of the spatial localization information into at least a subset of the images of the temporal sequence of images. Thus, the user is given a visual cue as to the location of the event. The user may more readily interpret and understand the event by being able to quickly focus his/her gaze upon the spatial neighborhood of the event as it is occurring within the general scene context. Thus, the user may be better prepared to assert counter measures and/or take evasive action.

In some embodiments, the processing unit may be configured to reconstruct a partial-spectrum image in response to the detection of the event. The partial-spectrum image may be based on a window of samples taken from the sample sequences corresponding to the selected subset. The window corresponds to a first time interval that at least partially includes the event. The processing unit may determine spatial localization information based on the first image, where the spatial localization information indicates where the event has occurred in the field of view. The processing unit may then inject a visual representation of the spatial localization information into at least a subset of the images of said temporal sequence of images.

In some embodiments, the processing unit may be configured to perform a search process in response to the detection of the event. The search process may operate on one or more of the sample sequences belonging to the selected subset and during the occurrence of the event, in order to identify a spatial subregion within the field of view that contains the event. The search process may include injecting search patterns into the temporal sequence of spatial patterns, and analyzing the samples of the one or more sample sequences in response to the injection of the search patterns. In one embodiment, the search process may include a hierarchical search based on a quadtree, where the quadtree corresponds to a recursive partitioning of the field of view into rectangular subsets.

In one set of embodiments, a compressive-sensing hyperspectral-imaging system may include a digital micromirror device, a spectral separation subsystem, a first array of light sensing elements, a first sampling subsystem and a detection unit.

The digital micromirror device (DMD) may be configured to receive an incident light stream, and modulate the incident light stream with a temporal sequence of spatial patterns to obtain a modulated light stream and a complementary modulated light stream.

The spectral separation subsystem may be configured to receive the modulated light stream, and separate the modulated light stream into a plurality of wavelength components.

The light sensing elements of the first array may be configured to receive respective subsets of the wavelength components and to generate respective spectral element signals. Each of the spectral element signals represents intensity of the respective subset of the wavelength components as a function of time. The first sampling subsystem may be configured to sample the spectral element signals in order to obtain respective spectrally-limited sample sequences.

The detection unit may be configured to monitor a selected subset of the spectral element signals to detect an event occurring within a field of view corresponding to the incident light stream. The action of detecting the event includes determining when the selected subset of the spectral element signals satisfy a pre-determined signal condition.

In some embodiments, the system may also include a second array of light sensing elements. The light sensing elements of the second array may be configured to convert respective spatial portions of the complementary modulated light stream into respective spatial element signals. A second sampling subsystem may be used to sample the spatial element signals to obtain respective spatially-limited sample sequences. A processing unit may be used to reconstruct a temporal sequence of images based on the spatially-limited sample sequences.

In alternative embodiments, the system may also include a light sensing device configured to convert the complementary modulated light stream into a device output signal representing intensity of the complementary modulated light stream as a function of time. An analog-to-digital converter (ADC) may be used to sample the device output signal to obtain an output sample sequence. A processing unit may be used to reconstruct a temporal sequence of images based on the output sample sequence.

In one set of embodiments, a compressive-sensing hyperspectral-imaging system may include a light modulation unit, a diffraction unit, a first array of light sensing elements, a first sampling subsystem and a detection unit.

The light modulation unit may be configured to receive an incident light stream, and modulate the incident light stream with a temporal sequence of spatial patterns to obtain a modulated light stream.

The diffraction unit may be configured to diffract the modulated light stream into a zeroth-order beam and a first-order beam, where the first-order beam includes a plurality of wavelength components that are separated spatially.

The light sensing elements of the first array may be configured to receive respective subsets of the wavelength components of the first-order beam and to generate respective spectral element signals. Each of the spectral element signals represents intensity of the respective subset of the wavelength components as a function of time. The first sampling subsystem may be configured to sample the spectral element signals in order to obtain respective spectrally-limited sample sequences.

The detection unit may be configured to monitor a selected subset of the spectral element signals to detect an event occurring within a field of view corresponding to the incident light stream. The action of detecting the event includes determining when the selected subset of the spectral element signals satisfy a pre-determined signal condition.

In some embodiments, the system also includes a second array of light sensing elements, where the light sensing elements of the second array are configured to convert spatial portions of the zeroth-order beam into respective spatial element signals. Each of the spatial element signals represents intensity of the respective spatial portion as a function of time. A second sampling subsystem may sample the spatial element signals to obtain respective spatially-limited sample sequences. A processing unit may reconstruct a temporal sequence of images based on the spatially-limited sample sequences.

In alternative embodiments, the system also include a light sensing device configured to convert the zeroth-order beam into a device output signal representing intensity of the zeroth-order beam as a function of time. An analog-to-digital converter (ADC) may be employed to sample the device output signal in order to obtain an output sample sequence. A processing unit may reconstruct a temporal sequence of images based on the output sample sequence.

Various additional embodiments are described in U.S. Provisional Application No. 61/553,347, filed on Oct. 31, 2011, entitled "Hi-Speed Compressive Sensing Hyperspectral Imaging System", invented by Robert F. Bridge and Lenore McMackin.

BRIEF DESCRIPTION OF THE DRAWINGS

A better understanding of the present invention can be obtained when the following detailed description of the preferred embodiments is considered in conjunction with the following drawings.

FIG. 17 illustrates one embodiment of a method for detecting spectral events using a selected subset of the spectral channel signals acquired by a compressive-imaging device.

Figure 1:
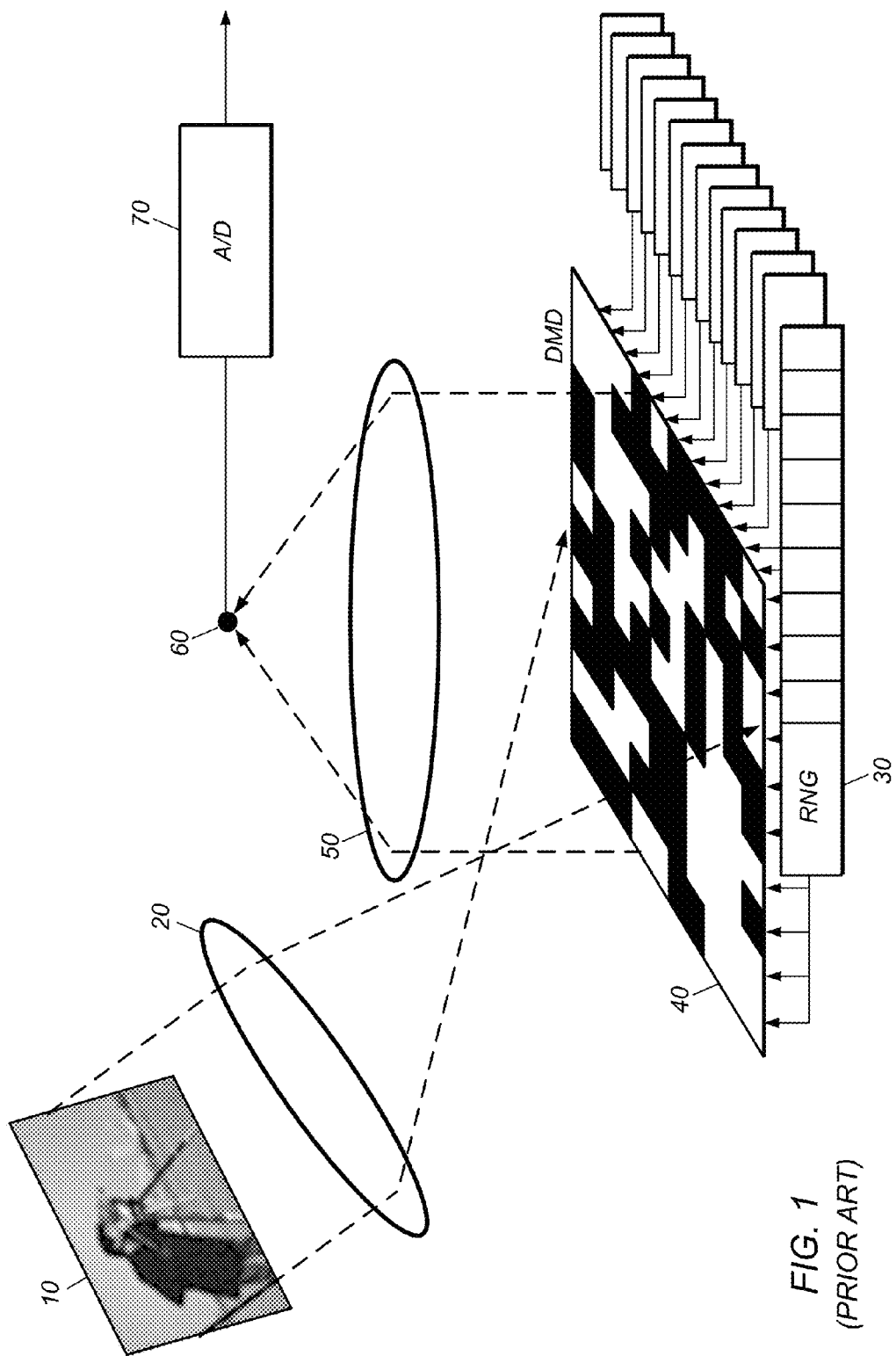
FIG. 1 illustrates a compressive sensing camera according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporations by Reference

The following patent applications are hereby incorporated by reference in their entireties as though fully and completely set forth herein.

U.S. patent application Ser. No. 13/631,626, filed on Sep. 28, 2012, entitled "Adaptive Search for Atypical Regions in Incident Light Field and Spectral Classification of Light in the Atypical Regions", invented by Richard G. Baraniuk and Tyler H. Weston;

U.S. patent application Ser. No. 13/534,414, filed on Jun. 27, 2012, entitled "Image Sequence Reconstruction based on Overlapping Measurement Subsets", invented by James M. Tidman, Tyler H. Weston, Matthew A. Herman and Lenore McMackin;

U.S. patent application Ser. No. 13/534,528, filed on Jun. 27, 2012, entitled "Mechanisms for Conserving Power in a Compressive Imaging System", invented by Robert F. Bridge, James M. Tidman, Lenore McMackin and Sujoy Chatterjee;

U.S. patent application Ser. No. 13/534,249, filed on Jun. 27, 2012, entitled "User Control of the Visual Performance of a Compressive Imaging System", invented by Robert F. Bridge, Donna E. Hewitt and Tyler H. Weston;

U.S. Provisional Application No. 61/553,347, filed on Oct. 31, 2011, entitled "Hi-Speed Compressive Sensing Hyperspectral Imaging System", invented by Robert F. Bridge and Lenore McMackin;

U.S. patent application Ser. No. 13/207,900, filed on Aug. 11, 2011, entitled "TIR Prism to Separate Incident Light and Modulated Light in Compressive Imaging Device", invented by Lenore McMackin and Sujoy Chatterjee;

U.S. patent application Ser. No. 13/207,276, filed on Aug. 10, 2011, entitled "Dynamic Range Optimization in a Compressive Imaging System", invented by Kevin F. Kelly, Gary L. Woods, Lenore McMackin, Robert F. Bridge, James M. Tidman and Donna E. Hewitt";

U.S. patent application Ser. No. 13/197,304, filed on Aug. 3, 2011, entitled "Decreasing Image Acquisition Time for Compressive Imaging Devices", invented by Kevin F. Kelly, Richard G. Baraniuk, Lenore McMackin, Robert F. Bridge, Sujoy Chatterjee and Tyler H. Weston;

Terminology

A memory medium is a non-transitory medium configured for the storage and retrieval of information. Examples of memory media include: various kinds of semiconductor-based memory such as RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., on different chips in a system or on different computers in a network.

A computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

A computer system is any device (or combination of devices) having at least one processor that is configured to execute program instructions stored on a memory medium. Examples of computer systems include personal computers (PCs), workstations, laptop computers, tablet computers, mainframe computers, server computers, client computers, network or Internet appliances, hand-held devices, mobile devices, personal digital assistants (PDAs), tablet computers, computer-based television systems, grid computing systems, wearable computers, computers implanted in living organisms, computers embedded in head-mounted displays, computers embedded in sensors forming a distributed network, etc.

A programmable hardware element (PHE) is a hardware device that includes multiple programmable function blocks connected via a system of programmable interconnects. Examples of PHEs include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores).

As used herein, the term "light" is meant to encompass within its scope of meaning any electromagnetic radiation whose spectrum lies within the wavelength range $[\lambda_L, \lambda_U]$, where the wavelength range includes the visible spectrum, the ultra-violet (UV) spectrum, infrared (IR) spectrum and the terahertz (THz) spectrum. Thus, for example, visible radiation, or UV radiation, or IR radiation, or THz radiation, or any combination thereof is "light" as used herein.

In some embodiments, a computer system may be configured to include a processor (or a set of processors) and a memory medium, where the memory medium stores program instructions, where the processor is configured to read and execute the program instructions stored in the memory medium, where the program instructions are executable by the processor to implement a method, e.g., any of the various method embodiments described herein, or, any combination of the method embodiments described herein, or, any subset of any of the method embodiments described herein, or, any combination of such subsets.

System 100 for Operating on Light

Figure 2A:
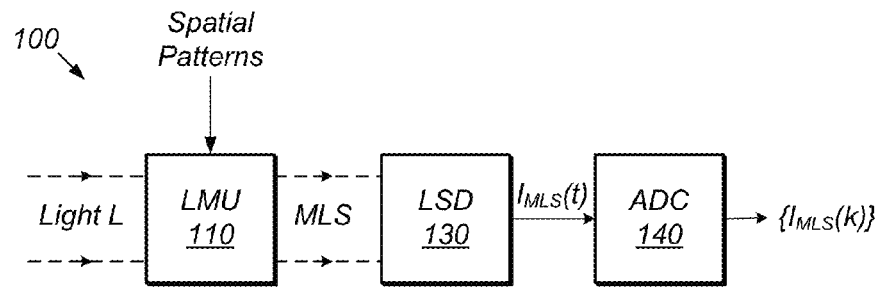
FIG. 2A illustrates one embodiment of a system 100 that is operable to capture compressive imaging samples and also samples of background light level. (LMU is an acronym for "light modulation unit". MLS is an acronym for "modulated light stream". LSD is an acronym for "light sensing device".)

A system 100 for operating on light may be configured as shown in FIG. 2A. The system 100 may include a light modulation unit 110, a light sensing device 130 and an analog-to-digital converter (ADC) 140.

The light modulation unit 110 is configured to modulate a received stream of light L with a series of spatial patterns in order to produce a modulated light stream (MLS). The spatial patterns of the series may be applied sequentially to the light stream so that successive time slices of the light stream are modulated, respectively, with successive ones of the spatial patterns. (The action of sequentially modulating the light stream L with the spatial patterns imposes the structure of time slices on the light stream.)

The light modulation unit 110 includes a plurality of light modulating elements configured to modulate corresponding portions of the light stream. Each of the spatial patterns specifies an amount (or extent or value) of modulation for each of the light modulating elements. Mathematically, one might think of the light modulation unit's action of applying a given spatial pattern as performing an element-wise multiplication of a light field vector $(x_{ij})$ representing a time slice of the light stream L by a vector of scalar modulation values $(m_{ij})$ to obtain a time slice of the modulated light stream: $(m_{ij})*(x_{ij}) = (m_{ij}x_{ij})$. The vector $(m_{ij})$ is specified by the spatial pattern. Each light modulating element effectively scales (multiplies) the intensity of its corresponding light stream portion by the corresponding scalar factor.

The light modulation unit 110 may be realized in various ways. In some embodiments, the LMU 110 may be realized by a plurality of mirrors (e.g., micromirrors) whose orientations are independently controllable. In another set of embodiments, the LMU 110 may be realized by an array of elements whose transmittances are independently controllable, e.g., as with an array of LCD shutters. An electrical control signal supplied to each element controls the extent to which light is able to transmit through the element. In yet another set of embodiments, the LMU 110 may be realized by an array of independently-controllable mechanical shutters (e.g., micromechanical shutters) that cover an array of apertures, with the shutters opening and closing in response to electrical control signals, thereby controlling the flow of light through the corresponding apertures. In yet another set of embodiments, the LMU 110 may be realized by a perforated mechanical plate, with the entire plate moving in response to electrical control signals, thereby controlling the flow of light through the corresponding perforations. In yet another set of embodiments, the LMU 110 may be realized by an array of transceiver elements, where each element receives and then immediately retransmits light in a controllable fashion. In yet another set of embodiments, the LMU 110 may be realized by a grating light valve (GLV) device. In yet another embodiment, the LMU 110 may be realized by a liquid-crystal-on-silicon (LCOS) device.

In some embodiments, the light modulating elements are arranged in an array, e.g., a two-dimensional array or a one-dimensional array. Any of various array geometries are contemplated. For example, in some embodiments, the array is a square array or rectangular array. In another embodiment, the array is hexagonal. In some embodiments, the light modulating elements are arranged in a spatially random fashion.

Let N denote the number of light modulating elements in the light modulation unit 110. In various embodiments, the number N may take a wide variety of values. For example, in different sets of embodiments, N may be, respectively, in the range [64, 256], in the range [256, 1024], in the range [1024, 4096], in the range $[2^{12}, 2^{14}]$, in the range $[2^{14}, 2^{16}]$, in the range $[2^{16}, 2^{18}]$, in the range $[2^{18}, 2^{20}]$, in the range $[2^{20}, 2^{22}]$, in the range $[2^{22}, 2^{24}]$, in the range $[2^{24}, 2^{26}]$, in the range from $2^{26}$ to infinity. The particular value used in any given embodiment may depend on one or more factors specific to the embodiment.

The light sensing device 130 may be configured to receive the modulated light stream MLS and to generate an analog electrical signal $I_{MLS}(t)$ representing intensity of the modulated light stream as a function of time.

The light sensing device 130 may include one or more light sensing elements. The term "light sensing element" may be interpreted as meaning "a transducer between a light signal and an electrical signal". For example, a photodiode is a light sensing element. In various other embodiments, light sensing elements might include devices such as metal-semiconductor-metal (MSM) photodetectors, phototransistors, phototubes and photomultiplier tubes.

In some embodiments, the light sensing device 130 includes one or more amplifiers (e.g., transimpedance amplifiers) to amplify the analog electrical signals generated by the one or more light sensing elements.

The ADC 140 acquires a sequence of samples $\{I_{MLS}(k)\}$ of the analog electrical signal $I_{MLS}(t)$. Each of the samples may be interpreted as an inner product between a corresponding time slice of the light stream L and a corresponding one of the spatial patterns. The set of samples $\{I_{MLS}(k)\}$ comprises an encoded representation, e.g., a compressed representation, of an image and may be used to reconstruct the image based on any reconstruction algorithm known in the field of compressive sensing. (The image is said to be "reconstructed" because it is recognized as having previously existed, although only transiently, in the incident light stream. By use of the term "reconstruct", we do not mean to suggest that the image has existed in stored digital form prior to the acquisition of the samples.) To reconstruct a sequence of images, the samples of the sequence $\{I_{MLS}(k)\}$ may be partitioned into contiguous subsets, and then the subsets may be processed to reconstruct corresponding images.

In some embodiments, the samples $\{I_{MLS}(k)\}$ may be used for some purpose other than, or in addition to, image (or image sequence) reconstruction. For example, system 100 (or some other system) may operate on the samples to perform an inference task, such as detecting the presence of a signal or object, identifying a signal or an object, classifying a signal or an object, estimating one or more parameters relating to a signal or an object, tracking a signal or an object, etc. In some embodiments, an object under observation by system 100 may be identified or classified by virtue of its sample set $\{I_{MLS}(k)\}$ (or parameters derived from that sample set) being similar to one of a collection of stored sample sets (or parameter sets).

In some embodiments, the light sensing device 130 includes exactly one light sensing element. (For example, the single light sensing element may be a photodiode.) The light sensing element may couple to an amplifier (e.g., a TIA) (e.g., a multi-stage amplifier).

In some embodiments, the light sensing device 130 may include a plurality of light sensing elements (e.g., photodiodes). Each light sensing element may convert light impinging on its light sensing surface into a corresponding analog electrical signal representing intensity of the impinging light as a function of time. In some embodiments, each light sensing element may couple to a corresponding amplifier so that the analog electrical signal produced by the light sensing element can be amplified prior to digitization. System 100 may be configured so that each light sensing element receives, e.g., a corresponding spatial portion (or spectral portion) of the modulated light stream.

In one embodiment, the analog electrical signals produced, respectively, by the light sensing elements may be summed to obtain a sum signal. The sum signal may then be digitized by the ADC 140 to obtain the sequence of samples $\{I_{MLS}(k)\}$. In another embodiment, the analog electrical signals may be individually digitized, each with its own ADC, to obtain corresponding sample sequences. The sample sequences may then be added to obtain the sequence $\{I_{MLS}(k)\}$. In another embodiment, the analog electrical signals produced by the light sensing elements may be sampled by a smaller number of ADCs than light sensing elements through the use of time multiplexing. For example, in one embodiment, system 100 may be configured to sample two or more of the analog electrical signals by switching the input of an ADC among the outputs of the two or more corresponding light sensing elements at a sufficiently high rate.

In some embodiments, the light sensing device 130 may include an array of light sensing elements. Arrays of any of a wide variety of sizes, configurations and material technologies are contemplated. In one embodiment, the light sensing device 130 includes a focal plane array coupled to a readout integrated circuit. In one embodiment, the light sensing device 130 may include an array of cells, where each cell includes a corresponding light sensing element and is configured to integrate and hold photo-induced charge created by the light sensing element, and to convert the integrated charge into a corresponding cell voltage. The light sensing device may also include (or couple to) circuitry configured to sample the cell voltages using one or more ADCs.

In some embodiments, the light sensing device 130 may include a plurality (or array) of light sensing elements, where each light sensing element is configured to receive a corresponding spatial portion of the modulated light stream, and each spatial portion of the modulated light stream comes from a corresponding sub-region of the array of light modulating elements. (For example, the light sensing device 130 may include a quadrant photodiode, where each quadrant of the photodiode is configured to receive modulated light from a corresponding quadrant of the array of light modulating elements. As another example, the light sensing device 130 may include a bi-cell photodiode. As yet another example, the light sensing device 130 may include a focal plane array.) Each light sensing element generates a corresponding signal representing intensity of the corresponding spatial portion as a function of time. Each signal may be digitized (e.g., by a corresponding ADC, or perhaps by a shared ADC) to obtain a corresponding sequence of samples. Thus, a plurality of sample sequences are obtained, one sample sequence per light sensing element. Each sample sequence may be processed to reconstruct a corresponding sub-image. The sub-images may be joined together to form a whole image. The sample sequences may be captured in response to the modulation of the incident light stream with a sequence of M spatial patterns, e.g., as variously described above. By employing any of various reconstruction algorithms known in the field of compressive sensing, the number of pixels in each reconstructed image may be greater than (e.g., much greater than) M. To reconstruct each sub-image, the reconstruction algorithm uses the corresponding sample sequence and the restriction of the spatial patterns to the corresponding sub-region of the array of light modulating elements.

In some embodiments, the light sensing device 130 includes a small number of light sensing elements (e.g., in respective embodiments, one, two, less than 8, less than 16, less the 32, less than 64, less than 128, less than 256). Because the light sensing device of these embodiments includes a small number of light sensing elements (e.g., far less than the typical modern CCD-based or CMOS-based camera), an entity interested in producing any of these embodiments may afford to spend more per light sensing element to realize features that are beyond the capabilities of modern array-based image sensors of large pixel count, e.g., features such as higher sensitivity, extended range of sensitivity, new range(s)

of sensitivity, extended dynamic range, higher bandwidth/ lower response time. Furthermore, because the light sensing device includes a small number of light sensing elements, an entity interested in producing any of these embodiments may use newer light sensing technologies (e.g., based on new materials or combinations of materials) that are not yet mature enough to be manufactured into focal plane arrays (FPA) with large pixel count. For example, new detector materials such as super-lattices, quantum dots, carbon nanotubes and graphene can significantly enhance the performance of IR detectors by reducing detector noise, increasing sensitivity, and/or decreasing detector cooling requirements.

In one embodiment, the light sensing device 130 is a thermo-electrically cooled InGaAs detector. (InGaAs stands for "Indium Gallium Arsenide".) In other embodiments, the InGaAs detector may be cooled by other mechanisms (e.g., liquid nitrogen or a Sterling engine). In yet other embodiments, the InGaAs detector may operate without cooling. In yet other embodiments, different detector materials may be used, e.g., materials such as MCT (mercury-cadmium-telluride), InSb (Indium Antimonide) and VOx (Vanadium Oxide).

In different embodiments, the light sensing device 130 may be sensitive to light at different wavelengths or wavelength ranges. In some embodiments, the light sensing device 130 may be sensitive to light over a broad range of wavelengths, e.g., over the entire visible spectrum or over the entire range $[\lambda_L, \lambda_u]$ as defined above.

In some embodiments, the light sensing device 130 may include one or more dual-sandwich photodetectors. A dual sandwich photodetector includes two photodiodes stacked (or layered) one on top of the other.

In one embodiment, the light sensing device 130 may include one or more avalanche photodiodes.

In one embodiment, the light sensing device 130 may include one or more photomultiplier tubes (PMTs).

In some embodiments, a filter may be placed in front of the light sensing device 130 to restrict the modulated light stream to a specific range of wavelengths or specific polarization. Thus, the signal $I_{MLS}(t)$ generated by the light sensing device 130 may be representative of the intensity of the restricted light stream. For example, by using a filter that passes only IR $light_r$, the light sensing device may be effectively converted into an IR detector. The sample principle may be applied to effectively convert the light sensing device into a detector for red or blue or green or UV or any desired wavelength band, or, a detector for light of a certain polarization.

In some embodiments, system 100 includes a color wheel whose rotation is synchronized with the application of the spatial patterns to the light modulation unit. As it rotates, the color wheel cyclically applies a number of optical bandpass filters to the modulated light stream MLS. Each bandpass filter restricts the modulated light stream to a corresponding sub-band of wavelengths. Thus, the samples captured by the ADC 140 will include samples of intensity in each of the sub-bands. The samples may be de-multiplexed to form separate sub-band sequences. Each sub-band sequence may be processed to generate a corresponding sub-band image. (As an example, the color wheel may include a red-pass filter, a green-pass filter and a blue-pass filter to support color imaging.)

In some embodiments, the system 100 may include a memory (or a set of memories of one or more kinds).

Figure 2B:
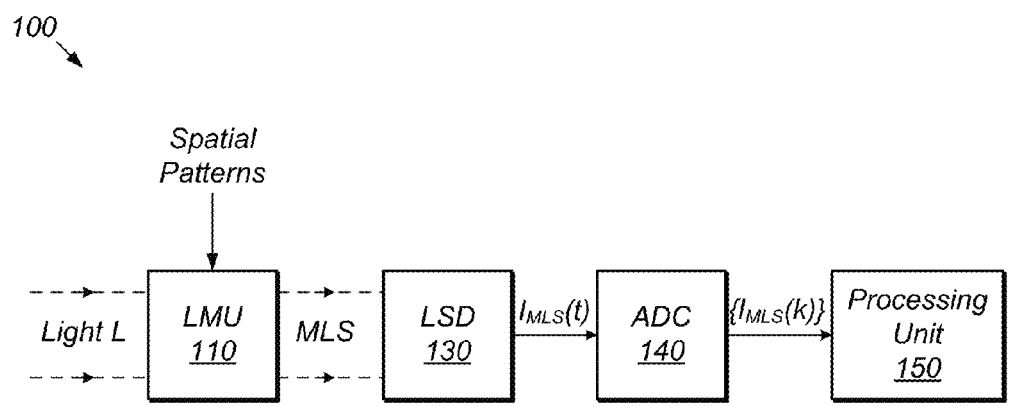
FIG. 2B illustrates an embodiment of system 100 that includes a processing unit 150.

In some embodiments, system 100 may include a processing unit 150, e.g., as shown in FIG. 2B. The processing unit 150 may be a digital circuit or a combination of digital circuits. For example, the processing unit may be a microprocessor (or system of interconnected of microprocessors), a programmable hardware element such as a field-programmable gate array (FPGA), an application specific integrated circuit (ASIC), or any combination such elements. The processing unit 150 may be configured to perform one or more functions such as image (or image sequence) reconstruction, system control, user interface, statistical analysis, and one or more inferences tasks.

The system 100 (e.g., the processing unit 150) may store the samples $\{I_{MLS}(k)\}$ in a memory, e.g., a memory resident in the system 100 or in some other system.

In one embodiment, processing unit 150 is configured to operate on the samples $\{I_{MLS}(k)\}$ to generate the image (or image sequence). In this embodiment, the processing unit 150 may include a microprocessor configured to execute software (i.e., program instructions), especially software for executing an image reconstruction algorithm. In one embodiment, system 100 is configured to transmit the compensated samples to some other system through a communication channel. (In embodiments where the spatial patterns are randomly-generated, system 100 may also transmit the random seed(s) used to generate the spatial patterns.) That other system may operate on the samples to reconstruct the image (or image sequence). System 100 may have one or more interfaces configured for sending (and perhaps also receiving) data through one or more communication channels, e.g., channels such as wireless channels, wired channels, fiber optic channels, acoustic channels, laser-based channels, etc.

In some embodiments, processing unit 150 is configured to use any of a variety of algorithms and/or any of a variety of transformations to perform image (or image sequence) reconstruction. System 100 may allow a user to choose a desired algorithm and/or a desired transformation for performing the image (or image sequence) reconstruction.

In some embodiments, the system 100 is configured to acquire a set $Z_M$ of samples from the ADC 140 so that the sample set $Z_M$ corresponds to M of the spatial patterns applied to the light modulation unit 110, where M is a positive integer. The number M is selected so that the sample set $Z_M$ is useable to reconstruct an n-pixel image or n-pixel image sequence that represents the incident light stream, where n is a positive integer less than or equal to the number N of light modulating elements in the light modulation unit 110. System 100 may be configured so that the number M is smaller than n. Thus, system 100 may operate as a compressive sensing device. (The number of "pixels" in an image sequence is the number of images in the image sequence times the number of pixels per image, or equivalently, the sum of the pixel counts of the images in the image sequence.)

In various embodiments, the compression ratio M/n may take any of a wide variety of values. For example, in different sets of embodiments, M/n may be, respectively, in the range [0.9,0.8], in the range [0.8,0.7], in the range [0.7,0.6], in the range [0.6,0.5], in the range [0.5,0.4], in the range [0.4,0.3], in the range [0.3,0.2], in the range [0.2,0.1], in the range [0.1, 0.05], in the range [0.05,0.01], in the range [0.001,0.01].

As noted above, the image reconstructed from the sample subset $Z_M$ may be an n-pixel image with n≤N. The spatial patterns may be designed to support a value of n less than N, e.g., by forcing the array of light modulating elements to operate at a lower effective resolution than the physical resolution N. For example, the spatial patterns may be designed to force each 2×2 cell of light modulating elements to act in unison. At any given time, the modulation state of the four elements in a 2×2 cell will agree. Thus, the effective resolution of the array of light modulating elements is reduced to N/4. This principle generalizes to any cell size, to cells of any shape, and to collections of cells with non-uniform cell size and/or cell shape. For example, a collection of cells of size $k_H \times k_v$, where $k_H$ and $k_v$ are positive integers, would give an effective resolution equal to $N/(k_H k_v)$. In one alternative embodiment, cells near the center of the array may have smaller sizes than cells near the periphery of the array.

Another way the spatial patterns may be arranged to support the reconstruction of an n-pixel image with n less than N is to allow the spatial patterns to vary only within a subset of the array of light modulating elements. In this mode of operation, the spatial patterns are null (take the value zero) outside the subset. (Control unit 120 may be configured to implement this restriction of the spatial patterns.) Light modulating elements corresponding to positions outside of the subset do not send any light (or send only the minimum amount of light attainable) to the light sensing device. Thus, the reconstructed image is restricted to the subset. In some embodiments, each spatial pattern (e.g., of a measurement pattern sequence) may be multiplied element-wise by a binary mask that takes the one value only in the allowed subset, and the resulting product pattern may be supplied to the light modulation unit. In some embodiments, the subset is a contiguous region of the array of light modulating elements, e.g., a rectangle or a circular disk or a hexagon. In some embodiments, the size and/or position of the region may vary (e.g., dynamically). The position of the region may vary in order to track a moving object. The size of the region may vary in order to dynamically control the rate of image acquisition or frame rate. In some embodiments, the size of the region may be determined by user input. For example, system 100 may provide an input interface (GUI and/or mechanical control device) through which the user may vary the size of the region over a continuous range of values (or alternatively, a discrete set of values), thereby implementing a digital zoom function. Furthermore, in some embodiments, the position of the region within the field of view may be controlled by user input.

In one embodiment, system 100 may include a light transmitter configured to generate a light beam (e.g., a laser beam), to modulate the light beam with a data signal and to transmit the modulated light beam into space or onto an optical fiber. System 100 may also include a light receiver configured to receive a modulated light beam from space or from an optical fiber, and to recover a data stream from the received modulated light beam.

In one embodiment, system 100 may be configured as a low-cost sensor system having minimal processing resources, e.g., processing resources insufficient to perform image (or image sequence) reconstruction in user-acceptable time. In this embodiment, the system 100 may store and/or transmit the samples $\{I_{MLS}(k)\}$ so that another agent, more plentifully endowed with processing resources, may perform the image (or image sequence) reconstruction based on the samples.

Figure 2C:
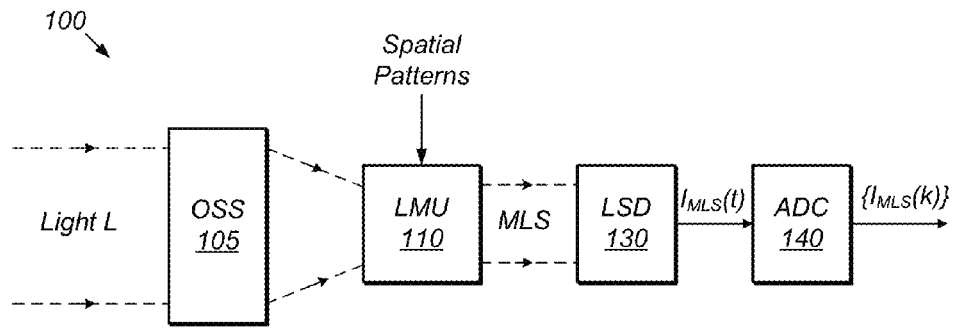
FIG. 2C illustrates an embodiment of system 100 that includes an optical subsystem 105 to focus received light L onto the light modulation unit 110.
Figure 2D:
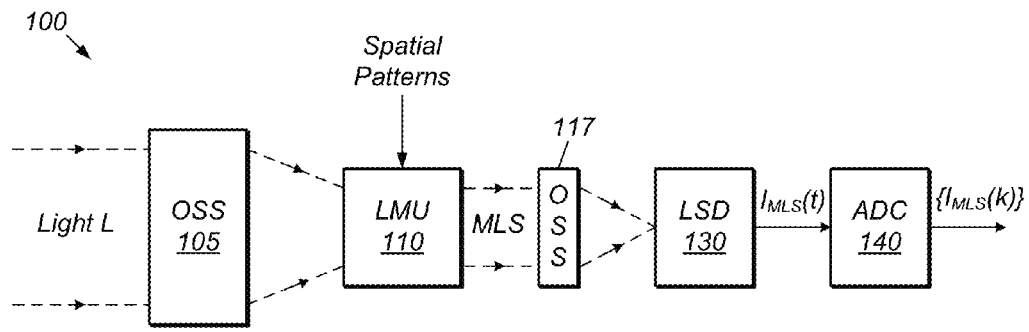
FIG. 2D illustrates an embodiment of system 100 that includes an optical subsystem 117 to direct or focus or concentrate the modulated light stream MLS onto the light sensing device 130.

In some embodiments, system 100 may include an optical subsystem 105 that is configured to modify or condition the light stream L before it arrives at the light modulation unit 110, e.g., as shown in FIG. 2C. For example, the optical subsystem 105 may be configured to receive the light stream L from the environment and to focus the light stream onto a modulating plane of the light modulation unit 110. The optical subsystem 105 may include a camera lens (or a set of lenses). The lens (or set of lenses) may be adjustable to accommodate a range of distances to external objects being imaged/sensed/captured. The optical subsystem 105 may allow manual and/or digital control of one or more parameters such as focus, zoom, shutter speed and f-stop.

In some embodiments, system 100 may include an optical subsystem 117 to direct the modulated light stream MLS onto a light sensing surface (or surfaces) of the light sensing device 130.

In some embodiments, the optical subsystem 117 may include one or more lenses, and/or, one or more mirrors.

In some embodiments, the optical subsystem 117 is configured to focus the modulated light stream onto the light sensing surface (or surfaces). The term "focus" implies an attempt to achieve the condition that rays (photons) diverging from a point on an object plane converge to a point (or an acceptably small spot) on an image plane. The term "focus" also typically implies continuity between the object plane point and the image plane point (or image plane spot); points close together on the object plane map respectively to points (or spots) close together on the image plane. In at least some of the system embodiments that include an array of light sensing elements, it may be desirable for the modulated light stream MLS to be focused onto the light sensing array so that there is continuity between points on the light modulation unit LMU and points (or spots) on the light sensing array.

In some embodiments, the optical subsystem 117 may be configured to direct the modulated light stream MLS onto the light sensing surface (or surfaces) of the light sensing device 130 in a non-focusing fashion. For example, in a system embodiment that includes only one photodiode, it may not be so important to achieve the "in focus" condition at the light sensing surface of the photodiode since positional information of photons arriving at that light sensing surface will be immediately lost.

In one embodiment, the optical subsystem 117 may be configured to receive the modulated light stream and to concentrate the modulated light stream into an area (e.g., a small area) on a light sensing surface of the light sensing device 130. Thus, the diameter of the modulated light stream may be reduced (possibly, radically reduced) in its transit from the optical subsystem 117 to the light sensing surface (or surfaces) of the light sensing device 130. For example, in some embodiments, the diameter may be reduced by a factor of more than 1.5 to 1. In other embodiments, the diameter may be reduced by a factor of more than 2 to 1. In yet other embodiments, the diameter may be reduced by a factor of more than 10 to 1. In yet other embodiments, the diameter may be reduced by factor of more than 100 to 1. In yet other embodiments, the diameter may be reduced by factor of more than 400 to 1. In one embodiment, the diameter is reduced so that the modulated light stream is concentrated onto the light sensing surface of a single light sensing element (e.g., a single photodiode).

In some embodiments, this feature of concentrating the modulated light stream onto the light sensing surface (or surfaces) of the light sensing device allows the light sensing device to sense at any given time the sum (or surface integral) of the intensities of the modulated light portions within the modulated light stream. (Each time slice of the modulated light stream comprises a spatial ensemble of modulated light portions due to the modulation unit's action of applying the corresponding spatial pattern to the light stream.)

In some embodiments, the modulated light stream MLS may be directed onto the light sensing surface of the light sensing device 130 without concentration, i.e., without decrease in diameter of the modulated light stream, e.g., by use of photodiode having a large light sensing surface, large enough to contain the cross section of the modulated light stream without the modulated light stream being concentrated.

Figure 2E:
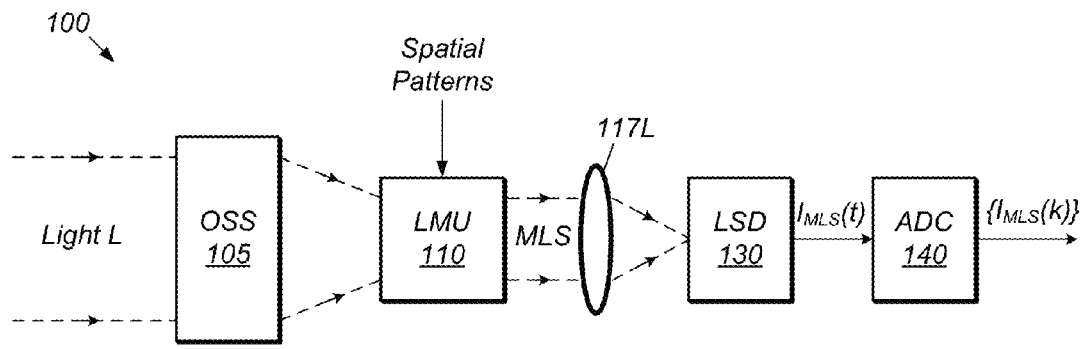
FIG. 2E illustrates an embodiment where the optical subsystem 117 is realized by a lens 117L.

In some embodiments, the optical subsystem 117 may include one or more lenses. FIG. 2E shows an embodiment where optical subsystem 117 is realized by a lens 117L, e.g., a biconvex lens or a condenser lens.

In some embodiments, the optical subsystem 117 may include one or more mirrors. In one embodiment, the optical subsystem 117 includes a parabolic mirror (or spherical mirror) to concentrate the modulated light stream onto a neighborhood (e.g., a small neighborhood) of the parabolic focal point. In this embodiment, the light sensing surface of the light sensing device may be positioned at the focal point.

In some embodiments, system 100 may include an optical mechanism (e.g., an optical mechanism including one or more prisms and/or one or more diffraction gratings) for splitting or separating the modulated light stream MLS into two or more separate streams (perhaps numerous streams), where each of the streams is confined to a different wavelength range. The separate streams may each be sensed by a separate light sensing device. (In some embodiments, the number of wavelength ranges may be, e.g., greater than 8, or greater than 16, or greater than 64, or greater than 256, or greater than 1024.) Furthermore, each separate stream may be directed (e.g., focused or concentrated) onto the corresponding light sensing device as described above in connection with optical subsystem 117. The samples captured from each light sensing device may be used to reconstruct a corresponding image (or image sequence) for the corresponding wavelength range. In one embodiment, the modulated light stream is separated into red, green and blue streams to support color (R,G,B) measurements. In another embodiment, the modulated light stream may be separated into IR, red, green, blue and UV streams to support five-channel multi-spectral imaging: (IR, R, G, B, UV). In some embodiments, the modulated light stream may be separated into a number of sub-bands (e.g., adjacent sub-bands) within the IR band to support multi-spectral or hyper-spectral IR imaging. In some embodiments, the number of IR sub-bands may be, e.g., greater than 8, or greater than 16, or greater than 64, or greater than 256, or greater than 1024. In some embodiments, the modulated light stream may experience two or more stages of spectral separation. For example, in a first stage the modulated light stream may be separated into an IR stream confined to the IR band and one or more additional streams confined to other bands. In a second stage, the IR stream may be separated into a number of sub-bands (e.g., numerous sub-bands) (e.g., adjacent sub-bands) within the IR band to support multispectral or hyper-spectral IR imaging.

In some embodiments, system 100 may include an optical mechanism (e.g., a mechanism including one or more beam splitters) for splitting or separating the modulated light stream MLS into two or more separate streams, e.g., where each of the streams have the same (or approximately the same) spectral characteristics or wavelength range. The separate streams may then pass through respective bandpass filters to obtain corresponding modified streams, where each modified stream is restricted to a corresponding band of wavelengths. Each of the modified streams may be sensed by a separate light sensing device. (In some embodiments, the number of wavelength bands may be, e.g., greater than 8, or greater than 16, or greater than 64, or greater than 256, or greater than 1024.) Furthermore, each of the modified streams may be directed (e.g., focused or concentrated) onto the corresponding light sensing device as described above in connection with optical subsystem 117. The samples captured from each light sensing device may be used to reconstruct a corresponding image (or image sequence) for the corresponding wavelength band. In one embodiment, the modulated light stream is separated into three streams which are then filtered, respectively, with a red-pass filter, a green-pass filter and a blue-pass filter. The resulting red, green and blue streams are then respectively detected by three light sensing devices to support color (R,G,B) acquisition. In another similar embodiment, five streams are generated, filtered with five respective filters, and then measured with five respective light sensing devices to support (IR, R, G, B, UV) multi-spectral acquisition. In yet another embodiment, the modulated light stream of a given band may be separated into a number of (e.g., numerous) sub-bands to support multi-spectral or hyper-spectral imaging.

In some embodiments, system 100 may include an optical mechanism for splitting or separating the modulated light stream MLS into two or more separate streams. The separate streams may be directed to (e.g., concentrated onto) respective light sensing devices. The light sensing devices may be configured to be sensitive in different wavelength ranges, e.g., by virtue of their different material properties. Samples captured from each light sensing device may be used to reconstruct a corresponding image (or image sequence) for the corresponding wavelength range.

Figure 2F:
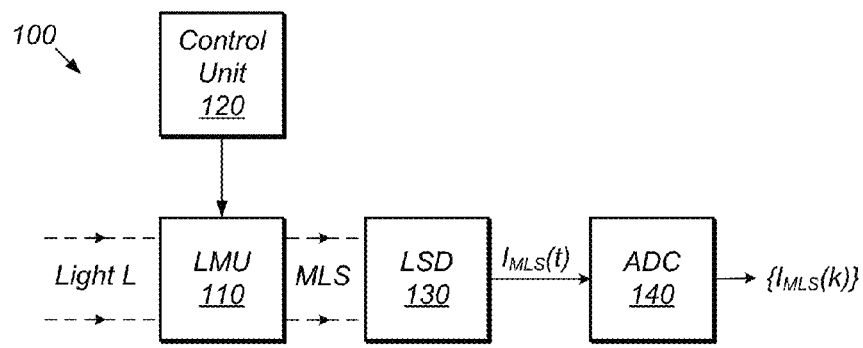
FIG. 2F illustrates an embodiment of system 100 that includes a control unit that is configured to supply a series of spatial patterns to the light modulation unit 110.

In some embodiments, system 100 may include a control unit 120 configured to supply the spatial patterns to the light modulation unit 110, as shown in FIG. 2F. The control unit may itself generate the patterns or may receive the patterns from some other agent. The control unit 120 and the ADC 140 may be controlled by a common clock signal so that ADC 140 can coordinate (synchronize) its action of capturing the samples $\{I_{MLS}(k)\}$ with the control unit's action of supplying spatial patterns to the light modulation unit 110. (System 100 may include clock generation circuitry.)

In some embodiments, the control unit 120 may supply the spatial patterns to the light modulation unit in a periodic fashion.

The control unit 120 may be a digital circuit or a combination of digital circuits. For example, the control unit may include a microprocessor (or system of interconnected of microprocessors), a programmable hardware element such as a field-programmable gate array (FPGA), an application specific integrated circuit (ASIC), or any combination such elements.

In some embodiments, the control unit 120 may include a random number generator (RNG) or a set of random number generators to generate the spatial patterns or some subset of the spatial patterns.

In some embodiments, system 100 is battery powered. In some embodiments, the system 100 includes a set of one or more solar cells and associated circuitry to derive power from sunlight.

In some embodiments, system 100 includes its own light source for illuminating the environment or a target portion of the environment.

In some embodiments, system 100 may include a display (or an interface configured for coupling to a display) for displaying reconstructed images or image sequences, e.g., video sequences.

In some embodiments, system 100 may include one or more input devices (and/or, one or more interfaces for input devices), e.g., any combination or subset of the following devices: a set of buttons and/or knobs, a keyboard, a keypad, a mouse, a touch-sensitive pad such as a trackpad, a touch-sensitive display screen, one or more microphones, one or more temperature sensors, one or more chemical sensors, one or more pressure sensors, one or more accelerometers, one or more orientation sensors (e.g., a three-axis gyroscopic sensor), one or more proximity sensors, one or more antennas, etc.

Regarding the spatial patterns that are used to modulate the light stream L, it should be understood that there are a wide variety of possibilities. In some embodiments, the control unit 120 may be programmable so that any desired set of spatial patterns may be used.

In some embodiments, the spatial patterns are binary valued. Such an embodiment may be used, e.g., when the light modulating elements are two-state devices. In some embodiments, the spatial patterns are n-state valued, where each element of each pattern takes one of n states, where n is an integer greater than two. (Such an embodiment may be used, e.g., when the light modulating elements are each able to achieve n or more modulation states). In some embodiments, the spatial patterns are real valued, e.g., when each of the light modulating elements admits a continuous range of modulation. (It is noted that even a two-state modulating element may be made to effectively apply a continuous range of modulation by duty cycling the two states during modulation intervals.)

The spatial patterns may belong to a set of measurement vectors that is incoherent with a set of vectors in which the image is approximately sparse ("the sparsity vector set"). (See "Sparse Signal Detection from Incoherent Projections", Proc. Int. Conf. Acoustics, Speech Signal Processing—ICASSP, May 2006, Duarte et al.) Given two sets of vectors $A=\{a_i\}$ and $B=\{b_i\}$ in the same N-dimensional space, A and B are said to be incoherent if their coherence measure $\mu(A,B)$ is sufficiently small. Assuming that the vectors $\{a_i\}$ and the vectors $\{b_i\}$ have unit $L^2$ norm, the coherence measure is defined as:

$$\mu(A, B) = \max_{i,j} |\langle a_i, b_j \rangle|.$$

The number of compressive sensing measurements (i.e., samples of the sequence $\{I_{MLS}(k)\}$ needed to reconstruct an N-pixel image that accurately represents the scene being captured is a strictly increasing function of the coherence between the measurement vector set and the sparsity vector set. Thus, better compression can be achieved with smaller values of the coherence. (The measurement vector set may also be referred to herein as the "measurement pattern set". Likewise, the sparsity vector set may also be referred to herein as the "sparsity pattern set".)

In some embodiments, the measurement vector set may be based on a code. Any of various codes from information theory may be used, e.g., codes such as exponentiated Kerdock codes, exponentiated Delsarte-Goethals codes, run-length limited codes, LDPC codes, Reed Solomon codes and Reed Muller codes.

In some embodiments, the measurement vector set corresponds to a randomized or permuted basis, where the basis may be, for example, the Discrete Cosine Transform (DCT) basis or Hadamard basis.

In some embodiments, the spatial patterns may be random or pseudo-random patterns, e.g., generated according to a random number generation (RNG) algorithm using one or more seeds. In some embodiments, the elements of each pattern are generated by a series of Bernoulli trials, where each trial has a probability p of giving the value one and probability 1-p of giving the value zero. (For example, in one embodiment p=½.) In some embodiments, the elements of each pattern are generated by a series of draws from a Gaussian random variable.)

The system 100 may be configured to operate in a compressive fashion, where the number of the samples $\{I_{MLS}(k)\}$ captured by the system 100 is less than (e.g., much less than) the number of pixels in the image (or image sequence) to be reconstructed from the samples. In many applications, this compressive realization is very desirable because it saves on power consumption, memory utilization and transmission bandwidth consumption. However, non-compressive realizations are contemplated as well.

In some embodiments, the system 100 is configured as a camera or imager that captures information representing an image (or a series of images) from the external environment, e.g., an image (or a series of images) of some external object or scene. The camera system may take different forms in different application domains, e.g., domains such as visible light photography, infrared photography, ultraviolet photography, high-speed photography, low-light photography, underwater photography, multi-spectral imaging, hyper-spectral imaging, etc. In some embodiments, system 100 is configured to operate in conjunction with (or as part of) another system, e.g., in conjunction with (or as part of) a microscope, a telescope, a robot, a security system, a surveillance system, a fire sensor, a node in a distributed sensor network, etc.

In some embodiments, system 100 is configured as a spectrometer.

In some embodiments, system 100 is configured as a multi-spectral or hyper-spectral imager.

In some embodiments, system 100 may also be configured to operate as a projector. Thus, system 100 may include a light source, e.g., a light source located at or near a focal point of optical subsystem 117. In projection mode, the light modulation unit 110 may be supplied with an image (or a sequence of images), e.g., by control unit 120. The light modulation unit may receive a light beam generated by the light source, and modulate the light beam with the image (or sequence of images) to obtain a modulated light beam. The modulated light beam exits the system 100 and is displayed on a display surface (e.g., an external screen).

In one embodiment, the light modulation unit 110 may receive the light beam from the light source and modulate the light beam with a time sequence of spatial patterns (from a measurement pattern set). The resulting modulated light beam exits the system 100 and is used to illuminate the external scene. Light reflected from the external scene in response to the modulated light beam is measured by a light sensing device (e.g., a photodiode). The samples captured by the light sensing device comprise compressive measurements of external scene. Those compressive measurements may be used to reconstruct an image or image sequence as variously described above.

In some embodiments, system 100 includes an interface for communicating with a host computer. The host computer may send control information and/or program code to the system 100 via the interface. Furthermore, the host computer may receive status information and/or compressive sensing measurements from system 100 via the interface.

Figure 3A:
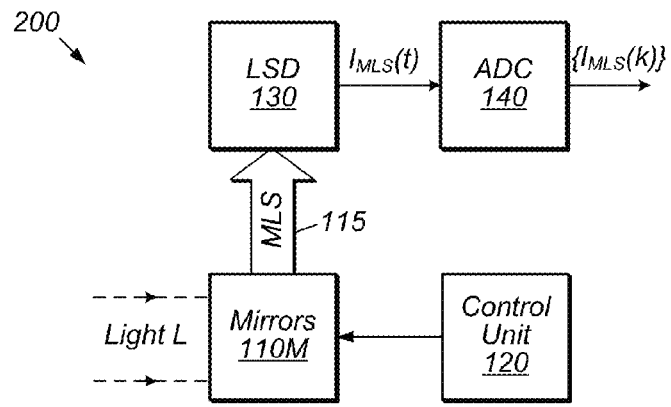
FIG. 3A illustrates system 200, where the light modulation unit 110 is realized by a plurality of mirrors (collectively referenced by label 110M).

In one realization 200 of system 100, the light modulation unit 110 may be realized by a plurality of mirrors, e.g., as shown in FIG. 3A. (The mirrors are collectively indicated by the label 110M.) The mirrors 110M are configured to receive corresponding portions of the light L received from the environment, albeit not necessarily directly from the environment. (There may be one or more optical elements, e.g., one or more lenses along the input path to the mirrors 110M.) Each of the mirrors is configured to controllably switch between at least two orientation states. In addition, each of the mirrors is configured to (a) reflect the corresponding portion of the light onto a sensing path 115 when the mirror is in a first of the two orientation states and (b) reflect the corresponding portion of the light away from the sensing path when the mirror is in a second of the two orientation states.

In some embodiments, the mirrors 110M are arranged in an array, e.g., a two-dimensional array or a one-dimensional array. Any of various array geometries are contemplated. For example, in different embodiments, the array may be a square array, a rectangular array, a hexagonal array, etc. In some embodiments, the mirrors are arranged in a spatially-random fashion.

The mirrors 110M may be part of a digital micromirror device (DMD). For example, in some embodiments, one of the DMDs manufactured by Texas Instruments may be used.

The control unit 120 may be configured to drive the orientation states of the mirrors through the series of spatial patterns, where each of the patterns of the series specifies an orientation state for each of the mirrors.

The light sensing device 130 may be configured to receive the light portions reflected at any given time onto the sensing path 115 by the subset of mirrors in the first orientation state and to generate an analog electrical signal $I_{MLS}(t)$ representing a cumulative intensity of the received light portions as function of time. As the mirrors are driven through the series of spatial patterns, the subset of mirrors in the first orientation state will vary from one spatial pattern to the next. Thus, the cumulative intensity of light portions reflected onto the sensing path 115 and arriving at the light sensing device will vary as a function time. Note that the term "cumulative" is meant to suggest a summation (spatial integration) over the light portions arriving at the light sensing device at any given time. This summation may be implemented, at least in part, optically (e.g., by means of a lens and/or mirror that concentrates or focuses the light portions onto a concentrated area as described above).

Figure 3B:
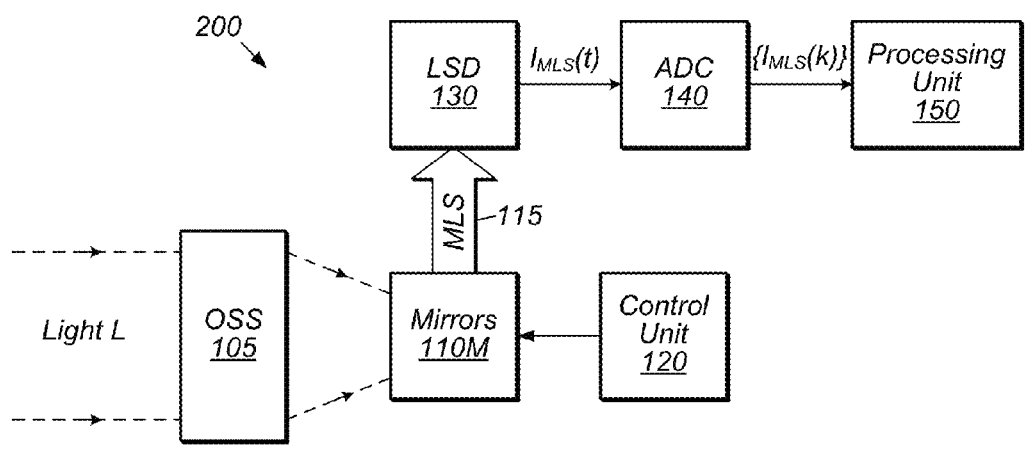
FIG. 3B shows an embodiment of system 200 that includes the processing unit 150.

System realization 200 may include any subset of the features, embodiments and elements discussed above with respect to system 100. For example, system realization 200 may include the optical subsystem 105 to operate on the incoming light L before it arrives at the mirrors 110M, e.g., as shown in FIG. 3B.

Figure 4:
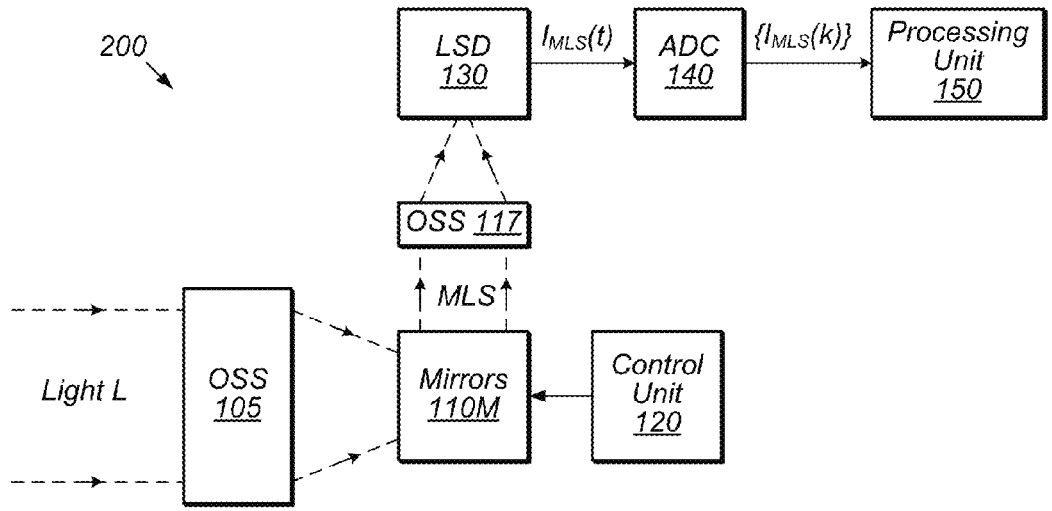
FIG. 4 shows an embodiment of system 200 that includes the optical subsystem 117 to direct or focus or concentrate the modulated light stream MLS onto the light sensing device 130.
Figure 5A:
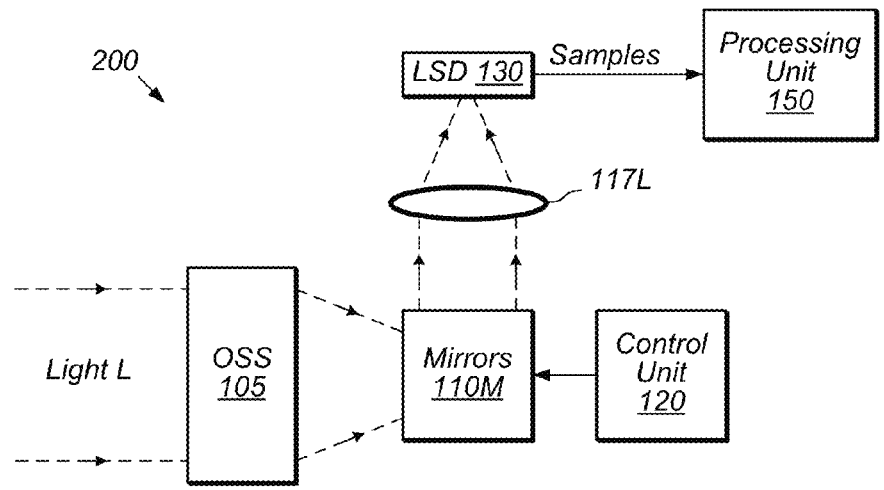
FIG. 5A shows an embodiment of system 200 where the optical subsystem 117 is realized by the lens 117L.

In some embodiments, system realization 200 may include the optical subsystem 117 along the sensing path as shown in FIG. 4. The optical subsystem 117 receives the light portions reflected onto the sensing path 115 and directs (e.g., focuses or concentrates) the received light portions onto a light sensing surface (or surfaces) of the light sensing device 130. In one embodiment, the optical subsystem 117 may include a lens 117L, e.g., as shown in FIG. 5A.

Figure 5B:
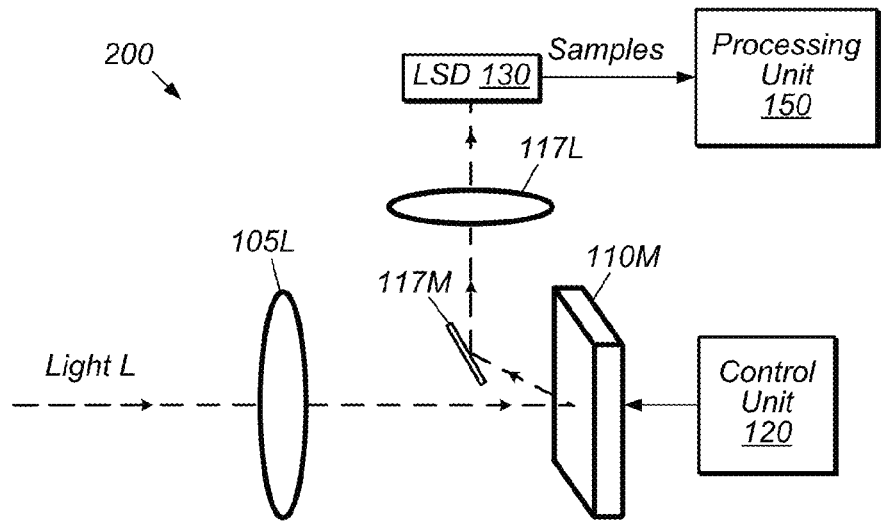
FIG. 5B shows an embodiment of system 200 where the optical subsystem 117 is realized by a mirror 117M and lens 117L in series.

In some embodiments, the optical subsystem 117 may include one or more mirrors, e.g., a mirror 117M as shown in FIG. 5B. Thus, the sensing path may be a bent path having more than one segment. FIG. 5B also shows one possible embodiment of optical subsystem 105, as a lens 105L.

Figure 5C:
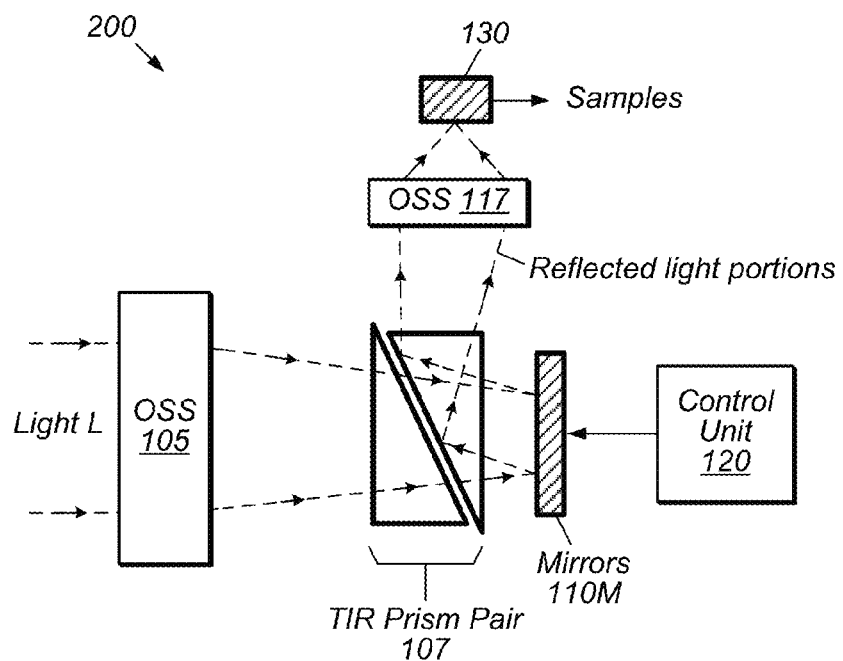
FIG. 5C shows another embodiment of system 200 that includes a TIR prism pair 107. (TIR is an acronym for Total Internal Reflection.)

In some embodiments, there may be one or more optical elements intervening between the optical subsystem 105 and the mirrors 110M. For example, as shown in FIG. 5C, a TIR prism pair 107 may be positioned between the optical subsystem 105 and the mirrors 110M. (TIR is an acronym for "total internal reflection".) Light from optical subsystem 105 is transmitted through the TIR prism pair and then interacts with the mirrors 110M. After having interacted with the mirrors 110M, light portions from mirrors in the first orientation state are reflected by a second prism of the pair onto the sensing path 115. Light portions from mirrors in the second orientation state may be reflected away from the sensing path.

Figure 6:
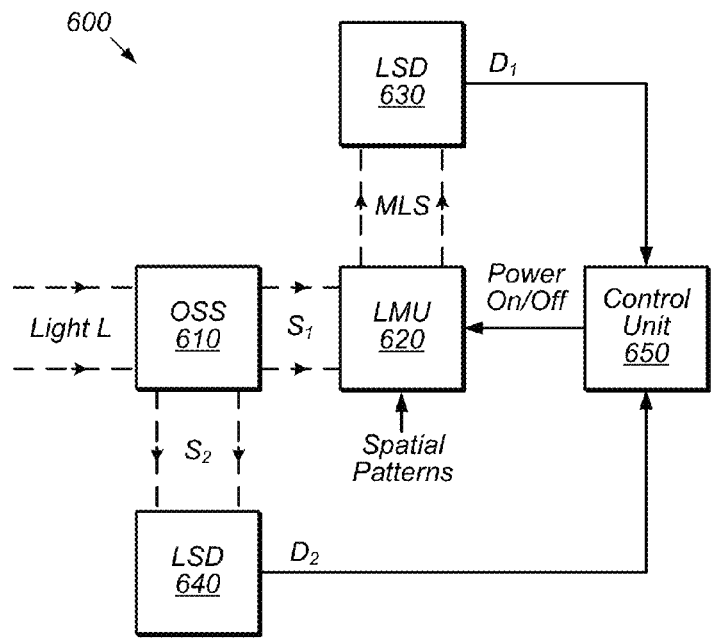
FIG. 6 illustrates one embodiment of a system 600 that operates in a low power mode until a light variation event is detected, whereupon it turns on power to the light modulation unit 620.

Separating Light Before Modulation to Detect Light Variation when the Modulator is Powered Off In one set of embodiments, a system 600 may be configured as illustrated in FIG. 6. System 600 may include an optical subsystem 610, a light modulation unit 620, a light sensing device 630, a light sensing device 640 and a control unit 650. (Furthermore, system 600 may include any subset of the features, embodiments and elements discussed above with respect to system 100 and system realization 200 and discussed below with respect to system 1700.) System 600 may be configured to compressively acquire image information from a received stream of light. However, in order to save power, the light modulation unit 620 may be maintained in a powered-off state until the occurrence of a light variation event. The light variation event is indicative of the potential presence of an object of interest in the field of view or scene under observation. Furthermore, after turning on power to the light modulation unit, power may be saved by selectively, not continuously, performing image reconstruction and/or transmission of the compressively-acquired information. For example, the data stream acquired by the light sensing device 630 may be monitored to detect object motion and/or the occurrence of a signal of interest in the field of view. The reconstruction and/or transmission processes may be invoked in response to such conditions. The reconstruction algorithm may be computationally intensive. Thus, the system may save a considerable amount of power, e.g., battery life, by running the reconstruction algorithm selectively, not continuously. Similarly, the system may save power by using the transmitter selectively (when needed), not continuously. Furthermore, the system may save power by transmitting compressively-acquired measurements to a remote computer and invoking execution of the reconstruction algorithm on the remote computer instead of executing the reconstruction algorithm itself.

In some embodiments, the system 600 may be configured as a surveillance system or security monitoring system.

The optical subsystem 610 may be configured to receive an incident light stream L and to separate the incident light stream into a light stream $S_1$ and a light stream $S_2$. The light stream $S_1$ is supplied to the light modulation unit 620, and the light stream $S_2$ is supplied to the light sensing device 640. The separation may be performed in any of a wide variety of ways, using any of a wide variety of optical components or combination of optical components. In some embodiments, the separation is performed so that each of the light streams $S_1$ and $S_2$ has the same field of view into the external environment. For example, the separation may be performed so that each ray in the incident light stream is split into two parts, one part entering the light stream $S_1$ and the other part entering the light stream $S_2$.

In some embodiments, the optical subsystem 610 may separate the incident light stream so that the light streams $S_1$ and $S_2$ are spectrally similar to the incident light stream L but of lower power than the incident light stream. (Two light streams are said to be spectrally similar when the wavelength spectrum of one is a scalar multiple of the wavelength spectrum of the other.)

In some embodiments, the optical subsystem 610 may separate the incident light stream so that the light stream $S_1$ and/or the light stream $S_2$ is (are) spectrally different from incident light stream L. For example, the light stream $S_2$ may be restricted to the IR band while the incident light stream L is a broadband stream including visible light as well as IR light.

In some embodiments, the optical subsystem 610 may separate the incident light stream so that the light streams $S_1$ and $S_2$ are spectrally different from each other. In some embodiments, the optical subsystem 610 may separate the incident light stream so that the light streams $S_1$ and $S_2$ are restrictions of the incident light stream L to different wavelength bands.

In some embodiments, the optical subsystem 610 may include one or more optical devices such as beam splitters, prisms, TIR prisms, diffraction gratings, mirrors (e.g., partially transmitting mirrors), etc.

In some embodiments, the optical subsystem 610 may be configured in any of the various ways described in connection with "optical subsystem 1310" of U.S. patent application Ser. No. 13/193,553, filed on Jul. 28, 2011, entitled "Determining Light Level Variation in Compressive Imaging by Injecting Calibration Patterns into Pattern Sequence", which is hereby incorporated by reference in its entirety.

The light modulation unit 620 may include a plurality of light modulating elements (e.g., as variously described above in connection with light modulation unit 110). In some embodiments, the light modulation unit 620 includes a plurality of light reflecting elements whose orientations are independently controllable, e.g., as variously described above in connection with mirrors 110M. The light modulation unit 620 may be, e.g., a digital micromirror device (DMD). When the light modulation unit is powered on (i.e., is in the power-on state), each of the light reflecting elements is configured to controllably switch between two active orientation states. Furthermore, when it is powered on, the light modulation unit is configured to modulate the light stream $S_1$ with a time sequence of spatial patterns to obtain a modulated light stream MLS.

The light sensing device 630 may be configured to receive the modulated light stream MLS and to generate a data stream $D_1$ in response to the modulated light stream when the light modulation unit 620 is powered on. In some embodiments, the light sensing device 630 may include only one light sensing element and an analog-to-digital converter, e.g., as variously described above. In other embodiments, the light sensing device 630 may include a plurality (or an array) of light sensing elements and one or more analog-to-digital converters, e.g., as variously described above. In some embodiments, the light sensing device 630 may include a focal plane array (FPA).

One or more devices (e.g., optical devices) may intervene on the optical path between the light modulation unit 620 and the light sensing device 630, to focus, direct or concentrate the modulated light stream MLS onto the light-sensing surface(s) of the light sensing device 630, e.g., as variously described above.

The light sensing device 640 may be configured to receive the light stream $S_2$ and to generate a data stream $D_2$ in response to the light stream $S_2$ at least when the light modulation unit 620 is powered off (i.e., is in the powered-off state). In some embodiments, the light sensing device 640 may include only one light sensing element (such as a photodiode) and an analog-to-digital converter (e.g., as variously described above). In other embodiments, the light sensing device 640 includes a plurality (or array) of light sensing elements and one or more analog-to-digital converters. For example, in one embodiment, the light sensing device 640 may include a focal plane array (FPA).

One or more devices (e.g., optical devices) may intervene on the optical path between the optical subsystem 610 and the light sensing device 640 to focus, direct or concentrate the light stream $S_2$ onto the light-sensing surface(s) of the light sensing device 640, e.g., as variously described above.

The control unit 650 may be configured to monitor the data stream $D_2$ when the light modulation unit is powered off in order to detect a light variation event in the data stream $D_2$. The light variation event indicates a variation of light in the light stream $S_2$, e.g., a temporal variation having sufficient strength and/or a variation having certain spatial and/or spectral properties. ("Sufficiently strong" means, e.g., that the magnitude of the light variation is greater than a predetermined threshold.) The control unit 650 may be further configured to turn on power to the light modulation unit 620 in response to determining that a trigger condition is satisfied. The trigger condition may include the detection of the light variation event. (In some embodiments, the trigger condition may involve one or more other conditions in addition to the detection of the light variation event. In other embodiments, the trigger condition is the same thing as the detection of the light variation event.) By maintaining the light modulation unit in a power-off state until the occurrence of a light variation event, system 600 conserves power when there is likely nothing of interest occurring in the scene under observation.

The control unit 650 may be realized in any of various forms. For example, the control unit may include a microprocessor (or system of interconnected microprocessors), one or more programmable hardware elements such as field-programmable gate arrays (FPGAs), custom-designed digital circuitry such as one or more application specific integrated circuits (ASICs), or any combination such elements.

In some embodiments, the control unit 650 may be configured to inject a sequence of measurement patterns into the time sequence of spatial patterns after turning on power to the light modulation unit, and to execute a reconstruction algorithm on a subset of the data stream $D_1$ (i.e., a subset that corresponds to the sequence of measurement patterns) in order to obtain an image or image sequence. By saying that the sequence of measurement patterns is "injected" into the time sequence of spatial patterns, we mean to imply that the time sequence of spatial patterns is free to include spatial patterns other than the measurement patterns. For example, the time sequence of spatial patterns may include calibration patterns and/or bright-spot search patterns in addition to the measurement patterns. Thus, it is not necessary that the time sequence of spatial patterns be entirely composed of measurement patterns. The reconstructed image or image sequence represents the scene under observation. The measurement patterns may be configured as variously described above. (See the above discussion of the "measurement vector set".)

Figure 7:
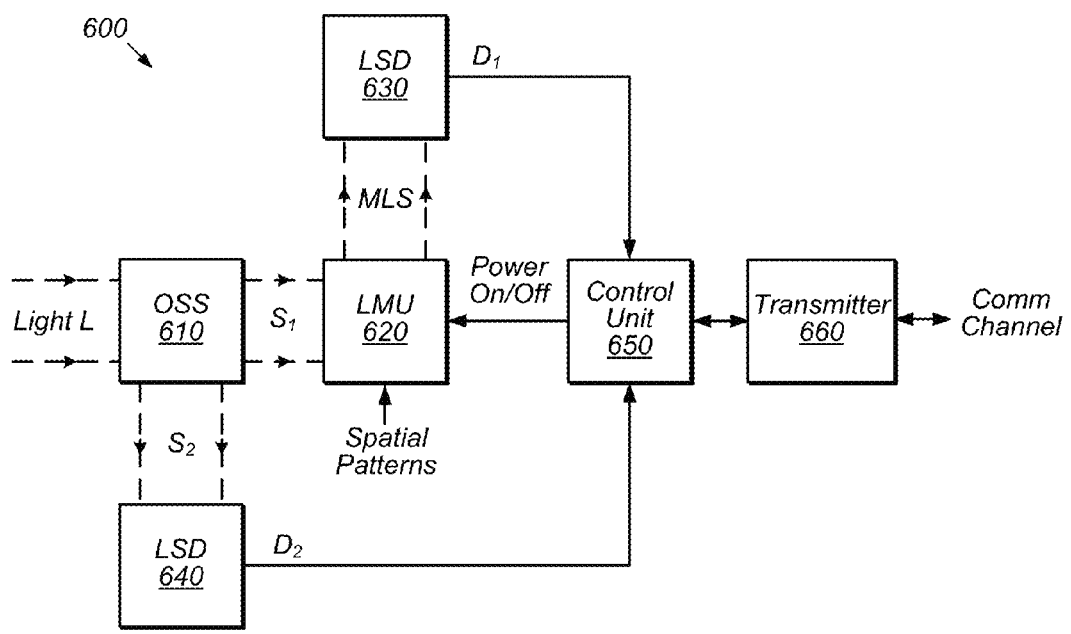
FIG. 7 illustrates an embodiment of system 600 that includes a transmitter 660.
Figure 7B:
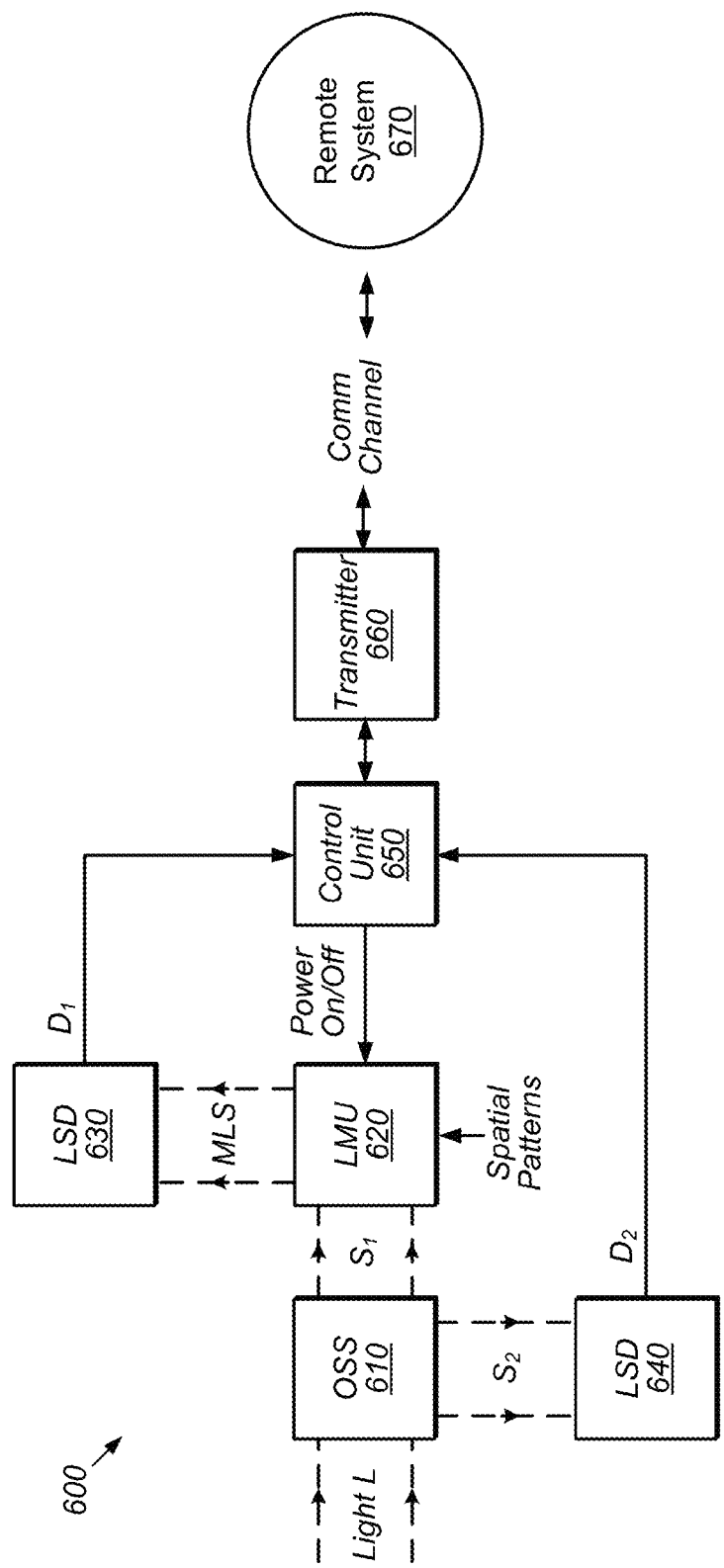
FIG. 7B illustrates an embodiment where system 600 transmits compressively-acquired measurements to a remote system for remote image (or image sequence) reconstruction.

In some embodiments, the system 600 may also include a transmitter 660, e.g., as shown in FIG. 7. The control unit 650 may be configured to inject a sequence of measurement patterns into the time sequence of spatial patterns after turning on power to the light modulation unit 620, and to direct the transmitter 660 to transmit a subset of the data stream $D_1$ onto a transmission channel, i.e., a subset of the data stream $D_1$ that corresponds to the sequence of measurement patterns. (The samples forming the subset are acquired in response to the application of the sequence of measurement patterns to the light stream $S_1$ by the light modulation unit 620.)

In some embodiments, the transmitter 660 may be configured to transmit the subset of the data stream $D_1$ (or the entirety of the data stream $D_1$) to a remote system 670. The remote system may be equipped with processing resources (e.g., one or more processors configured to execute program instructions) to perform image (or image sequence) reconstruction based on the subset. Thus, system 600 may save power by not performing the reconstruction itself.

In different embodiments, the transmitter 660 may be configured for transmission over respectively different kinds of communication channel. For example, in some embodiments, the transmitter transmits electromagnetic signals (e.g., radio signals or optical signals) through a wireless or wired channel. In one embodiment, the transmitter transmits electromagnetic signals through an electrical cable. In another embodiment, the transmitter transmits electromagnetic waves through free space (e.g., the atmosphere). In yet another embodiment, the transmitter transmits through free space or through an optical fiber using modulated light signals or modulated laser signals. In yet another embodiment, the transmitter transmits acoustic signals through an acoustic medium, e.g., a body of water. The transmitter may be any type of transmitter known in the art of telecommunications.

In some embodiments, system 600 also includes a receiver as well as a transmitter to permit two-way communication with one or more other parties.

In some embodiments, the light sensing device 640 may include a single light sensing element and an analog-to-digital converter (ADC), e.g., as variously described above in connection with light sensing device 130 and ADC 140. The light sensing element is configured to generate an analog electrical signal representing intensity of the light stream $S_2$ as a function of time. The ADC is configured to capture a sequence of samples of the analog electrical signal. (Each sample represents the intensity of the light stream $S_2$ at a corresponding time.) The data stream $D_2$ may include the sequence of samples. The control unit 650 may monitor the sequence of samples (or, one or more time derivatives of the sequence of samples) to detect the light variation event. For example, the control unit may apply a low pass filter to the sequence of samples (to attenuate high-frequency noise) and then compute a time derivative of the filtered signal. When the absolute value (or the square) of the time derivative exceeds a detection threshold, the control unit may declare that the light variation event has occurred.

In some embodiments, the light variation event is interpreted as a variation in the total intensity of the light stream $S_2$.

In some embodiments, the light sensing device 640 may be configured in any of the various ways described in connection with "light sensing device 1320" of U.S. patent application Ser. No. 13/193,553, filed on Jul. 28, 2011, entitled "Determining Light Level Variation in Compressive Imaging by Injecting Calibration Patterns into Pattern Sequence". See especially FIGS. 13A through 17B and the corresponding textual description in that patent application.

In some embodiments, the light sensing device 640 includes a light sensing element and analog electrical circuitry. The light sensing element is configured to generate an analog electrical signal representing intensity of the light stream $S_2$ as a function of time. The analog electrical circuitry operates on the analog electrical signal and performs the function of motion detection. The analog electrical circuitry may generate a decision signal that represents at any given time whether or not the motion is present in the field of view represented by the light stream $S_2$.

In some embodiments, the light sensing device 640 may include a plurality (e.g., an array) of light sensing elements, each configured to receive a corresponding spatial portion of the light stream $S_2$. (For example, the plurality of light sensing elements may be arranged to cover a cross section of the light stream $S_2$. Each light sensing element thus receives the portion of the light stream $S_2$ that impinges upon its surface.) For each of the light sensing elements, the light sensing device 640 may be configured to capture a corresponding sequence of samples representing intensity over time of the corresponding spatial portion of the light stream $S_2$. The data stream $D_2$ may include these sequences of samples.

In one embodiment, the light sensing device 640 may include an M×N array of light sensing elements, where M is a positive integer, N is a positive integer and the product MN is greater than or equal to two. Each of the MN light sensing elements captures samples for a corresponding region of the light stream $S_2$. For example, in the case M=N=2, each light sensing element may capture samples for a corresponding quadrant of the light stream $S_2$.

In one embodiment, the control unit 650 may detect the light variation event by: (a) computing a weighted combination of the sequences of intensity samples (captured from the respective light sensing elements) to obtain a composite signal, and (b) comparing the absolute value of the time derivative of the composite signal to a detection threshold. For example, the sample sequence(s) corresponding to one half of the field of view may be weighted positively while the sample sequence(s) corresponding to other half may be weighted negatively. As another example, the field of view may be divided into four quadrants. (In this example, the light sensing device 640 includes at least four light sensing elements.) Sample sequences from the northeast and southwest quadrants may be weighted positively while sample sequences from the northwest and southeast quadrants may be weighted negatively.

In another embodiment, the control unit 650 may detect the light variation event by: computing a time derivative (or a smoothed time derivative) of each of the sample sequences to obtain a corresponding time derivative signal, and determine if the absolute value (or square) of at least one of the time derivative signals exceeds a predetermined threshold.

In yet another embodiment, the data stream $D_2$ may include a sequence of frames, with each frame including a sample from each of the light sensing elements of the light sensing device 640. The control unit 650 may monitor the data stream $D_2$ by analyzing the sequence of frames. For example, the control unit 650 may detect the light variation event by computing motion vectors between successive frames of the frame sequence in a manner that is used in the MPEG video encoding algorithm. An average magnitude (or a statistic) of the motion vectors may be compared to a threshold. The light variation event may be declared when the threshold is exceeded.

In some embodiments, the light sensing device 640 may be configured as variously described in U.S. patent application Ser. No. 13/197,304, filed on Aug. 3, 2011, entitled "Decreasing Image Acquisition Time for Compressive Imaging Devices", which is hereby incorporated by reference in its entirety. For example, light sensing device 640 may include the "light sensing device 630" and the "sampling subsystem 640" described in that patent application.

In some embodiments, the light sensing device 640 may include a plurality (e.g., an array) of light sensing elements, each configured to receive a corresponding spectral portion of the light stream $S_2$. Furthermore, for each of the light sensing elements, the light sensing device 640 may be configured to capture a corresponding sequence of intensity samples representing intensity over time of the corresponding spectral portion of the light stream $S_2$. The data stream $D_2$ may include these sequences of samples.

One or more optical devices may intervene along the optical path between the optical subsystem 610 and the light sensing device 640 in order to spatially separate the light stream $S_2$ into a set or continuous distribution of wavelength components so that different members of the set or different portions of the continuous distribution impinge upon corresponding ones of the light sensing elements. The one or more optical devices may include devices such as diffraction gratings, prisms, optical filters, mirrors, etc. In one embodiment, the one or more optical devices include a diffraction grating.

In one embodiment, the light sensing device 640 may include three light sensing elements for three-channel color measurement (e.g., RGB measurement), with each light sensing element capturing a corresponding one of the three colors. In another embodiment, the light sensing device 640 may include two or more light sensing elements corresponding to different subbands in the infrared band.

In one embodiment, the light sensing device 640 may be (or include) a spectrometer.

Figure 8:
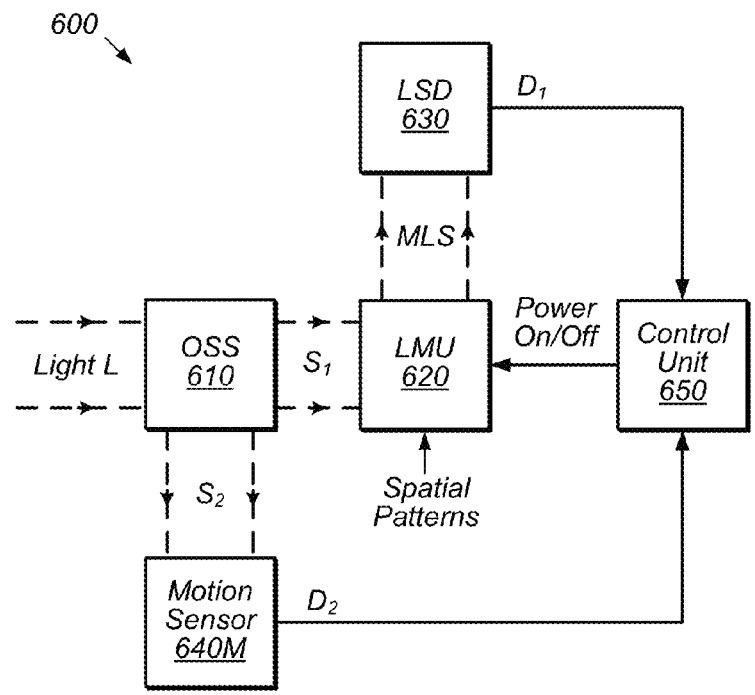
FIG. 8 illustrates an embodiment of system 600 where the light sensing device 640 is realized by a motion sensor.

In some embodiments, the light sensing device 640 may be (or include) a motion sensor 640M, e.g., as illustrated in FIG. 8. The motion sensor may be (or include) any of a wide variety of known devices for motion sensing or motion detection. The motion sensor is configured to generate the data stream $D_2$ in response to the light stream $S_2$. For example, the motion sensor may generate an analog electrical signal in response to the light stream $S_2$ and digitize the analog electrical signal in order to obtain a sequence of samples of the analog electrical signal. When an object enters into the field of view, the analog electrical signal and the data stream $D_2$ (the sequence of samples) exhibit a disturbance. The above-described light variation event may be interpreted as being this disturbance. The control unit may detect the disturbance by detecting the occurrence of a pulse of sufficient amplitude in the analog electrical signal or in the data stream $D_2$. In one embodiment, the control unit 650 may detect the disturbance by comparing the absolute value of the sampled signal (the sequence of samples) or its time derivative to a threshold. The light variation event occurs when the threshold is exceeded. (Computational algorithms for detecting motion-induced disturbances in the signal(s) generated by motion sensors are well known in the prior art, and thus, need not be elaborated here.)

In some embodiments, the motion sensor 640M may include built-in circuitry for detecting the disturbance. In these embodiments, the built-in circuitry may assert a signal in response to the detection of the disturbance and inject the signal into the data stream $D_2$. The control unit 650 recognizes that the disturbance has been detected when it receives the signal from the data stream $D_2$.

Objects of interest may be known to emit light (electromagnetic energy) in a particular wavelength band. Thus, in some embodiments, the motion sensor 640M may be sensitive to light in that wavelength band. For example, in one embodiment, the motion sensor may include a passive infrared sensor. Various objects of interest (human beings, automobiles, aircraft, buildings, etc.) are known to emit infrared radiation. Thus, the entrance of such an object into the field of view will be accompanied by a disturbance (e.g., a step) in the infrared band.

Figure 9:
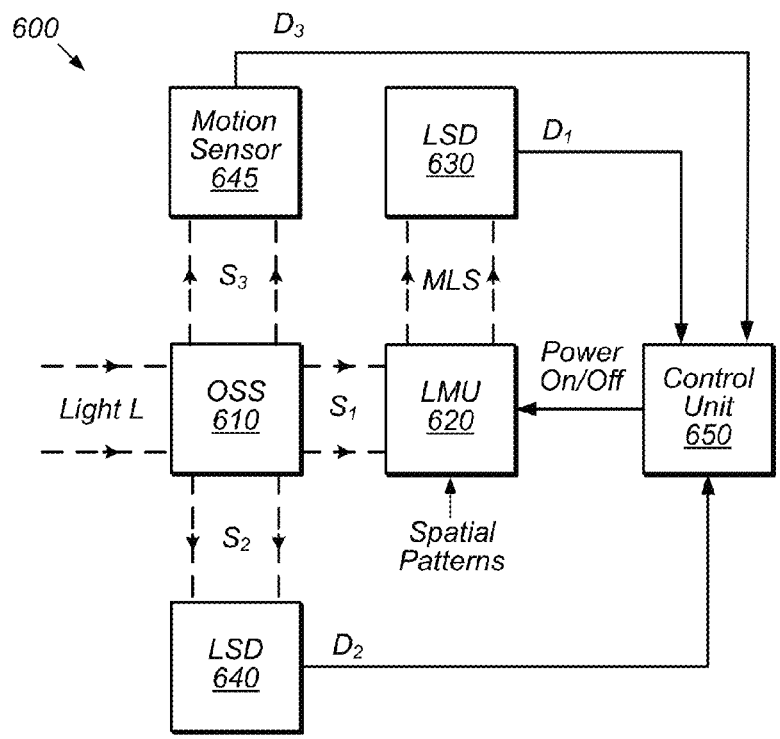
FIG. 9 illustrates an embodiment of system 600 that includes a motion sensor in addition to the light sensing devices 630 and 640.

In some embodiments, system 600 may include a motion sensor 645 in addition to the light sensing device 640, e.g., as shown in FIG. 9. In these embodiments, the optical subsystem 610 may be configured to separate the incident light stream L into three output streams including the light stream $S_1$, the light stream $S_2$ and the light stream $S_3$. As described above, the light stream $S_1$ is provided to the light modulation unit 620, and the light stream $S_2$ is provided to the light sensing device 640. The light stream $S_3$ is provided to the motion sensor 645. The motion sensor 645 is configured to receive the light stream $S_3$ and generate a sequence of samples $D_3$ in response to the light stream $S_3$ (e.g., similar to what is described above in connection with motion sensor 640M). The control unit 650 may be configured to monitor the sequence of samples $D_3$, e.g., to detect a motion-induced disturbance in the sequence of samples. The above-described trigger condition (used to turn on power to the light modulation unit 620) may include the condition of detecting this motion-induced disturbance and the condition of detecting the light variation event. By combining the two detection conditions, the system 600 may be more immune to false alarms. (A false alarm is the situation where the system decides to turn on power to the light modulation unit when there is actually no object of interest in the field of view.)

The optical subsystem 610 may separate the incident light stream L into three output streams ($S_1$, $S_2$ and $S_3$) in any of various ways, using any combination of optical devices. The streams $S_1$, $S_2$ and $S_3$ may be spectrally similar or dissimilar to the incident light stream L. Furthermore, the streams $S_1$, $S_2$ and $S_3$ may be spectrally similar or dissimilar to each other. For example, in one embodiment, the streams $S_2$ and $S_2$ are restricted to the infrared band, while stream $S_1$ includes light in the visible spectrum.

In some embodiments, the light sensing device 630 may include a single light sensing element and an analog-to-digital converter (ADC), e.g., as described above in connection with light sensing device 130 and ADC 140. The light sensing element may be configured to generate an analog electrical signal representing intensity of the modulated light stream MLS as a function of time. For example, the light sensing element may be a photodiode. The ADC is configured to capture a sequence of samples of the analog electrical signal. (Each sample represents the intensity of the modulated light stream at a corresponding time.) The data stream $D_1$ may include this sequence of samples.

In some embodiments, the light sensing device 630 may include a plurality (e.g., an array) of light sensing elements, each configured to receive a corresponding spatial portion of the modulated light stream MLS. For each of the light sensing elements, the light sensing device 630 is configured to capture a corresponding sequence of intensity samples representing intensity over time of the corresponding spatial portion. The data stream $D_1$ may include these sequences of intensity samples captured from the light sensing elements. When image reconstruction is performed on the data stream $D_1$, the sample sequence captured from each light sensing element may be used to reconstruct a corresponding subimage that is representative of a corresponding subregion of the scene under observation. A complete image, representing the whole of the scene under observation, may be generated by joining together (concatenating) the subimages. For more information on how to reconstruct an image (or sequence of images) from a data stream obtained from a set of parallel light sensing elements, please see U.S. patent application Ser. No. 13/197, 304, filed on Aug. 3, 2011, entitled "Decreasing Image Acquisition Time for Compressive Imaging Devices".

In some embodiments, the light sensing device 630 may be configured as variously described in U.S. patent application Ser. No. 13/197,304. For example, light sensing device 630 may include the "light sensing device 630" and the "sampling subsystem 640" described in that patent application.

In some embodiments, the light sensing device 630 may include a plurality of light sensing elements, each configured to receive a corresponding spectral portion of the modulated light stream MLS. For each of the light sensing elements, the light sensing device 630 is configured to capture a corresponding sequence of intensity samples representing intensity over time of the corresponding spectral portion of the modulated light stream. The data stream $D_1$ may include these sequences of intensity samples captured from the light sensing elements. Thus, the data stream $D_1$ may be interpreted as a sequence of spectral intensity vectors. The elements of each vector may represent the intensity of corresponding wavelength components or wavelength bands in the modulated light stream MLS.

One or more optical devices may intervene along the optical path between the light modulation unit 620 and the light sensing device 630 in order to spatially separate the modulated light stream MLS into a set or continuous distribution of wavelength components so that different members of the set or different portions of the continuous distribution impinge upon corresponding ones of the light sensing elements. For example, the one or more optical devices may include devices such as diffraction gratings, prisms, optical filters, mirrors, etc.

In some embodiments, the light sensing device 630 may be (or include) a spectrometer.

In some embodiments, the control unit 650 may be configured to monitor the data stream $D_1$ in order to detect a spectral signature of interest in the modulated light stream MLS. For example, in a system targeted for the observation of vehicles, the control unit may monitor the data stream $D_1$ for spectral signatures characteristic of the exhaust gases generated by one or more kinds of vehicles. In a system targeted for the surveillance of human beings, the control unit may monitor the data stream for the presence of infrared emissions or certain characteristic patterns of IR emission. In a system targeted for chemical plume detection, the control unit may search the data stream for the presence of any of a predetermined set of spectral patterns corresponding to one or more chemical plumes of interest. In a system targeted for astronomical observation, the control unit may monitor the data stream for the presence of a spectral pattern of interest to the user, e.g., the emission spectra of certain elements or combinations of elements.

While monitoring the data stream $D_1$ for a spectral signature of interest, the control unit 650 may direct the light modulation unit 620 to apply one or more spatial patterns having all one values, i.e., spatial patterns where all the light reflecting elements are set to the orientation state that reflects light to the light sensing device 630. (In some embodiments, the spatial patterns may be patterns that take the one value within a subregion of the field of view and the zero value outside that subregion.) Alternatively, the control unit may direct the light modulation unit to apply spatial patterns from a measurement pattern set, i.e., a pattern set that is incoherent relative to the sparsity pattern set in which the signal is compressible (or sparse), thus enabling the reconstruction of a separate image for each spectral portion of the modulated light stream from the corresponding sequence of intensity samples.

In some embodiments, the spectral signature detection may be performed using a prior art detection algorithm.

In some embodiments, the control unit may be configured to execute a reconstruction algorithm in response to detecting the spectral signature of interest, e.g., as variously described above. The reconstruction algorithm may be configured to compute an image or image sequence (that represents the external scene) based on at least a subset of the data stream $D_1$. The "subset" of the data stream $D_1$ may be a subset starting at the time the spectral signature of interest is detected, or, a predetermined amount of time before the spectral signal detection. (The latter option may be implemented by buffering the data stream $D_1$ in memory, thus allowing access to past values of the data stream $D_1$.)

The control unit 650 may inject measurement patterns into the sequence of spatial patterns to be used by the light modulation unit 620 in response to detecting the spectral signature of interest. If the control unit has already been injecting measurement patterns while monitoring for the spectral signature of interest, it may continue to do so after detecting that spectral signature. The "subset" of the data stream $D_1$ used to perform the reconstruction is preferably a subset that corresponds to the measurement patterns (although not necessarily a contiguous subset in time since other kinds of patterns may be interspersed with the measurement patterns in the sequence of spatial patterns).

An image reconstructed by the control unit 650 may include a plurality of component images corresponding respectively to a plurality wavelength bands. Each component image is reconstructed from a subset of the intensity samples captured from a corresponding one of the light sensing elements, and represents a spectrally-limited view of the external scene, i.e., a view that is limited to the portion of the electromagnetic spectrum captured by the corresponding light sensing element. (Recall that each light sensing element receives a corresponding spectral portion of the modulated light stream.) For example, in the case where the modulated light stream is separated into red, green and blue components, and the light sensing device has three light sensing elements for respectively capturing those three components, the control unit may reconstruct a multi-spectral image having three component images, i.e., a red image based on samples from the red light sensing element, a green image based on samples from the green light sensing element, and a blue image based on samples from the blue light sensing element. This example naturally extends to any number of components and any set of wavelength bands. The multispectral image may have any number of components images, depending on the number of light sensing elements.

In some embodiments, the system 600 may also include a transmitter, e.g., as variously described above. The control unit 650 may be configured to direct the transmitter to transmit at least a subset of the data stream $D_1$ onto a communication channel. The subset may be as variously discussed above.

In some embodiments, the control unit 650 may be configured to search for a region within the field of view that contains a bright object (or an object that is bright than the general background) such as the sun or a reflection of the sun from a shiny surface in the field of view. The search may be performed after turning on power to the light modulation unit 620. The search may include injecting a sequence of search patterns into the sequence of spatial patterns, and selecting a next search pattern to be injected into the sequence of spatial patterns based on a portion of the data stream $D_1$ that corresponds to one or more previous ones of the search patterns that have already been injected into the sequence of spatial patterns. (For more information on how to conduct such a search, please refer to U.S. patent application Ser. No. 13/207,276, filed on Aug. 10, 2011, entitled "Dynamic Range Optimization in a Compressive Imaging System", which is hereby incorporated by reference in its entirety.) Once the region corresponding to the bright object has been determined, the control unit 650 may mask out (i.e., remove) the bright object by masking the spatial patterns supplied to the light modulation unit 620. In particular, each of the spatial patterns may be masked so that it is set to zero (or perhaps, attenuated) within the bright object region but unmodified outside the bright object region. Thus, portions of the modulated light stream MLS corresponding to the bright object region do not reach (or reach with attenuated intensity) the light sensing device 630 while portions of the modulated light stream corresponding to the exterior of the bright object region are modulated as they would have been without the masking. This masking process may be applied to a sequence of measurements patterns. The subset of the data stream $D_1$ corresponding to the masked measurement patterns may be used to reconstruct an image (or image sequence) corresponding to the exterior of the bright object region.

In one alternative embodiment, the control unit may mask out (i.e., remove) the set complement of the bright object region, again by masking the spatial patterns. In particular, each of the spatial patterns is set to zero (or perhaps, attenuated) outside the bright object region and unmodified inside the bright object region. Thus, portions of the modulated light stream outside the bright object region do not reach the light sensing device 630, while portions of the modulated light stream inside the bright object region are modulated as they would have been without the masking. This masking process may be applied to a sequence of measurements patterns. The subset of the data stream $D_1$ corresponding to the masked measurement patterns may be used to reconstruct an image (or image sequence) corresponding to the interior of the bright object region.

In some embodiments, system 600 may also include an audio sensor such as a microphone or an array of microphones. The control unit 650 may be configured to monitor the signal(s) generated by the audio sensor to detect an audio event of interest, e.g., an occurrence of an audio feature or signal of interest. In one embodiment, the control unit may detect an increase in audio power. In another embodiment, the control unit may detect an occurrence of an audio spectrum (or spectrogram) belonging to a signal class of interest, e.g., an audio spectrum (or spectrogram) characteristic of the human voice. The detection of the audio event may be used to further qualify the trigger condition. (Recall that the trigger condition determines whether to turn on power to the light modulation unit 620). For example, the control unit may require both the light variation event and the audio event occur in order to assert the trigger condition.

In some embodiments, the system 600 may include one or more sensors such as chemical sensors, pressure sensors, proximity sensors, radiation sensors, particle detectors (e.g., Geiger counters), smoke detectors and vibration sensors. The sensing signals generated by any combination of such sensors may be used to qualify the trigger condition.

In some embodiments, the system 600 may include a light source for illuminating the external scene. For example, the light source may be powered on in response to detection of the light variation event.

Figure 10:
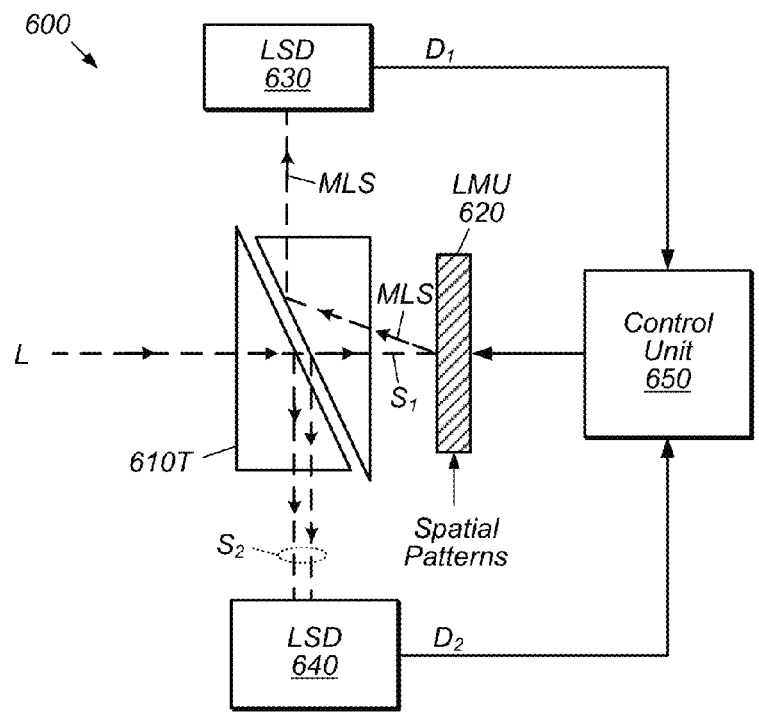
FIG. 10 illustrates an embodiment of system 600 where the optical subsystem 610 includes a TIR prism pair 610T.

In some embodiments, the optical subsystem 610 may be (or include) a TIR prism pair 610T, e.g., as shown in FIG. 10. (TIR is an acronym for "total internal reflection".) The TIR prism pair splits the incident light stream L into the light streams $S_1$ and $S_2$ at one or more of its internal faces, i.e., the faces where the two prisms come into close proximity. The light stream $S_1$ proceeds to the light modulation unit 620 where it experiences modulation with the time sequence of spatial patterns. The modulated light stream MLS returns to the TIR prism pair where it experiences total internal reflection at one of the internal faces. After total internal reflection, the modulated light stream exits the TIR prism pair onto an optical path leading to the light sensing device 630.

In other embodiments, the optical subsystem 610 may be (or include) a dual TIR prism.

For more information on how to use TIR prisms and dual TIR prisms in compressive imaging systems, please refer to U.S. patent application Ser. No. 13/207,900, filed on Aug. 11, 2011, entitled "TIR Prism to Separate Incident Light and Modulated Light in Compressive Imaging Device", which is hereby incorporated by reference in its entirety.

Figure 11:
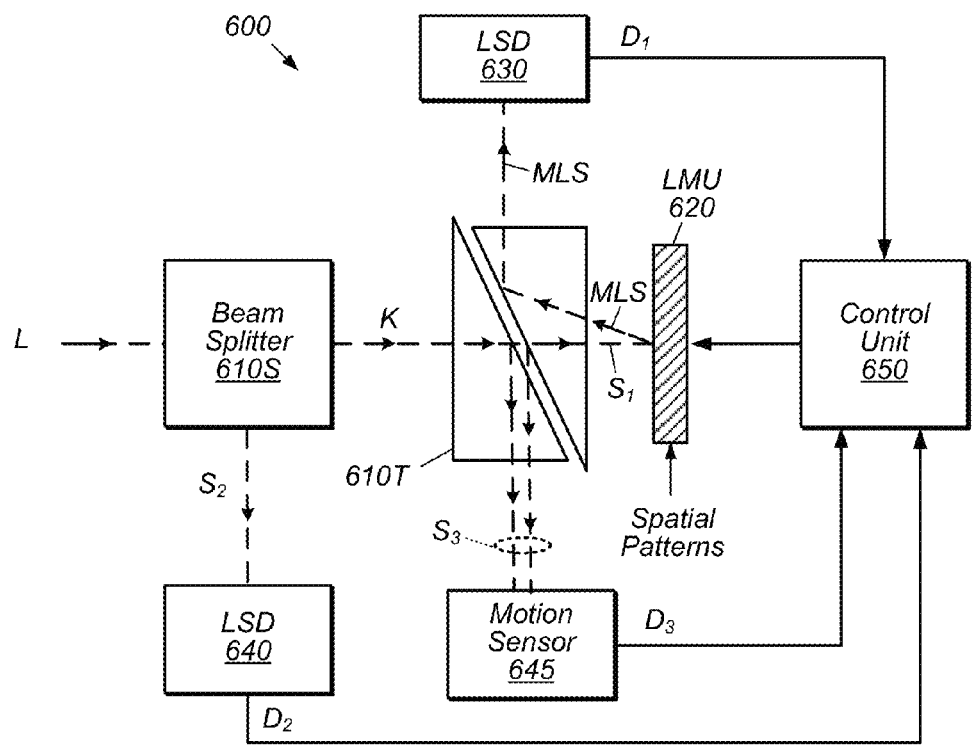
FIG. 11 illustrates an embodiment of system 600 where the optical subsystem 610 includes a beam splitter 610S and a TIR prism pair 610T.

In some embodiments, the system embodiment of FIG. 9 may be realized as shown in FIG. 11, where the optical subsystem 610 includes a beam splitter 610S and the TIR prism pair 610T. The beam splitter 610S splits in the incident light stream L into the light stream $S_2$ and an intermediate stream K. The TIR prism pair 610T splits the intermediate stream K into the light stream $S_1$ and the light stream $S_3$. The light stream $S_1$ proceeds to the light modulation unit 620 while the light stream $S_3$ proceeds to the motion sensor 645.

Figure 12:
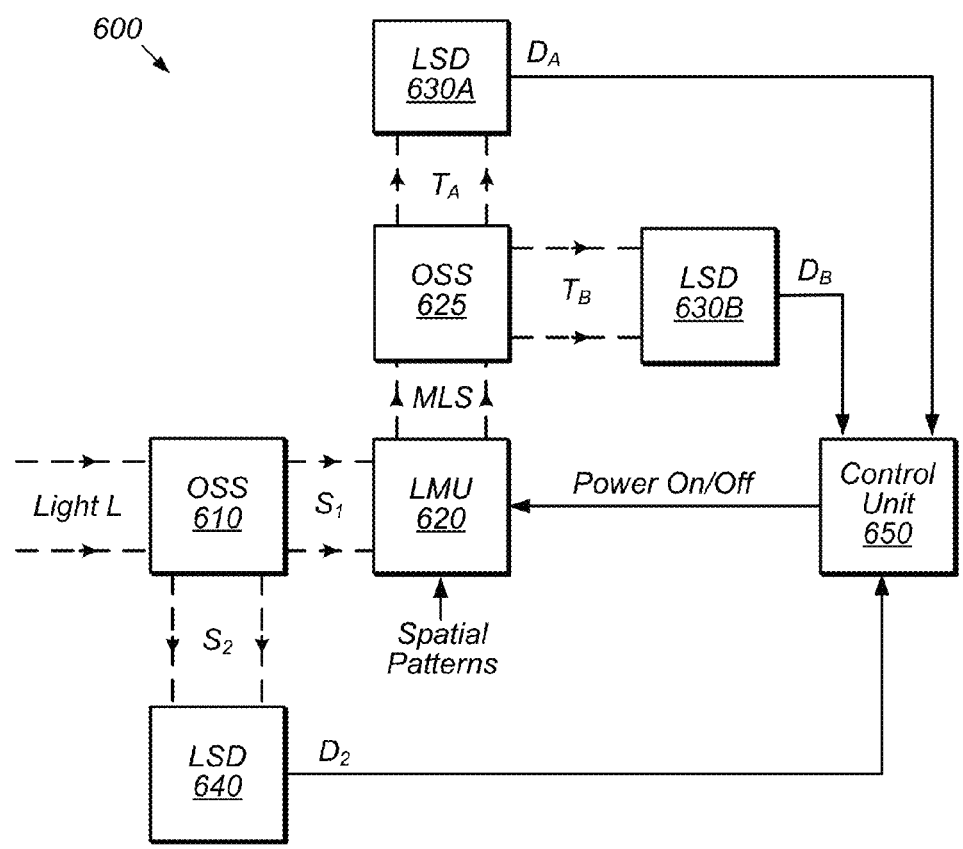
FIG. 12 illustrates an embodiment of system 600 including two light sensing devices downstream from the light modulation unit 620.

In some embodiments, the system 600 may be configured as shown in FIG. 12. In these embodiments, the modulated light stream MLS may be separated by an optical subsystem 625 into light stream $T_A$ and $T_B$. The light stream $T_A$ is supplied to a light sensing device 630A; and the light stream $T_B$ is supplied to a light sensing device 630B. Light sensing device 630A generates a data stream $D_A$ in response to the light stream $T_A$, e.g., as variously described above in connection with light sensing device 630. Similarly, light sensing device 630B generates a data stream $D_B$ in response to the light stream $T_B$, e.g., as variously described above in connection with light sensing device 630. The control unit 650 may monitor the data stream $D_2$ and determine when to turn on power to the light modulation unit 620. The control unit 650 may also monitor the data stream $D_A$ and/or the data stream $D_B$ in order to decide when to invoke reconstruction on the data stream $D_A$ and/or the data stream $D_B$, or when to invoke transmission of the data stream $D_A$ and/or the data stream $D_B$.

In some embodiments, light sensing device 630A may include one or more light sensing elements, each configured to convert a corresponding spatial portion of the light stream $T_A$ into a corresponding sequence of intensity samples; and light sensing device 630B may include one or more light sensing elements, each configured to convert a corresponding spectral portion of the light stream $T_B$ into a corresponding sequence of intensity samples.

Event Detection Using a Compressive-Sensing Hyperspectral-Imaging Architecture

Figure 13:
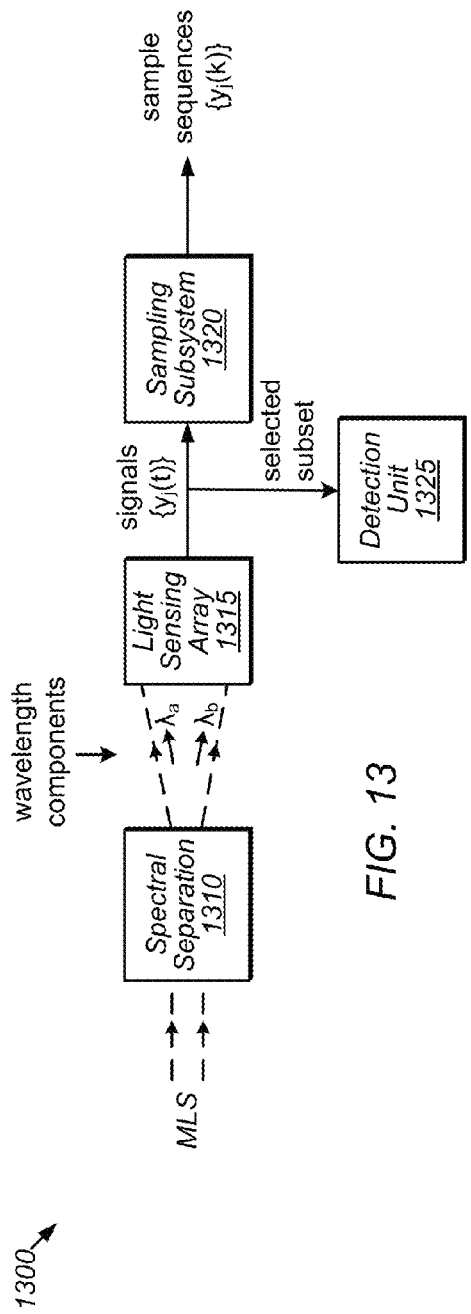
FIG. 13 illustrates one embodiment of a system 1300 for detecting spectral events using compressively-acquired signal information from a selected subset of the spectral channels sensed by a light sensing array.

In one set of embodiments, a compressive imaging system 1300 may be configured as shown in FIG. 13. The system may be configured to detect events occurring within a field of view, e.g., momentary events such as explosions, gun discharges, chemical reactions, launches of rockets, missiles, rocket-propelled grenades, etc. In addition, the system may determine the spatial locations of the events within the field of view, and highlight those locations in an image sequence (e.g., a video sequence) representing the field of view so a user can perceive the event in its visual context.

The system 1300 may include a spectral separation subsystem 1310, an array 1315 of light sensing elements, a sampling subsystem 1320 and a detection unit 1325. (Furthermore, the system 1300 may include any subset of the features, embodiments and elements discussed above with respect to system 100, system realization 200 and FIGS. 6-12, and discussed below with respect to method 1700, system 1800, system 2400, system 2800 and system 2900.)

The spectral separation subsystem 1310 may be configured to receive a modulated light stream (MLS), where the modulated light stream is generated by modulating an incident light stream with a temporal sequence of spatial patterns, e.g., measurement patterns as variously described above. The modulation may be performed using a light modulation unit as variously described above. The spectral separation subsystem may be further configured to separate the modulated light stream into a plurality of wavelength components, e.g., so that different wavelengths components have different spatial positions. (FIG. 13 highlights two of the wavelength components, i.e., wavelength components $\lambda_a$ and $\lambda_b$, not to suggest a limitation on the number of wavelength components, but to illustrate the principle that different wavelength components have different spatial positions within the beam(s) outputted from the spectral separation subsystem.) In some embodiments, the spectral separation subsystem may include one or more diffraction gratings, or one or more prisms, or one or more spectral filters, or any combination of the foregoing types of element.

In some embodiments, the "plurality of wavelengths components" produced by the spectral separation subsystem comprise a continuous distribution of wavelength components. In other words, the wavelength components are spread out spatially in a continuous fashion. In other embodiments, the plurality of wavelength components may comprise a set of discrete wavelength bands, e.g., such as might result from filtering the modulated light stream with a series of spectral filters.

The light sensing elements of the array 1315 may be configured to receive respective subsets of the wavelength components and to generate respective signals (e.g., analog signals). Each of the signals represents intensity of the respective subset of the wavelength components as a function of time. In other words, each light sensing element produces a signal representing the instantaneous intensity of the wavelength components impinging upon its sensing surface. The light sensing elements may be realized as variously described above, e.g., in connection with system 100 and system realization 200. For example, the light sensing elements may be photodiodes.

In some embodiments, the light sensing array 1315 may be a one-dimensional array, e.g., a linear array, or alternatively, a non-uniformly spaced array. In other embodiments, the array may be a two-dimensional array. In some embodiments, the light sensing elements of the array 1315 may be implemented as part of a single integrated circuit. Alternatively, the array 1315 may be formed from a plurality of separately packaged devices.

The sampling subsystem 1320 may be configured to sample the signals in order to obtain respective sample sequences. (The sample sequences may be stored into a memory of system 1300.) The sampling subsystem may include a plurality of analog-to-digital converters (ADCs), e.g., the same number of ADCs as light sensing elements in the array 1315. However, in some embodiments, the sampling subsystem may include fewer ADCs by employing time multiplexing. For example, two or more of the signals may be sampled by a single ADC by employing a multiplexer to rapidly alternate (or cycle among) the two or more signals.

Figure 14:
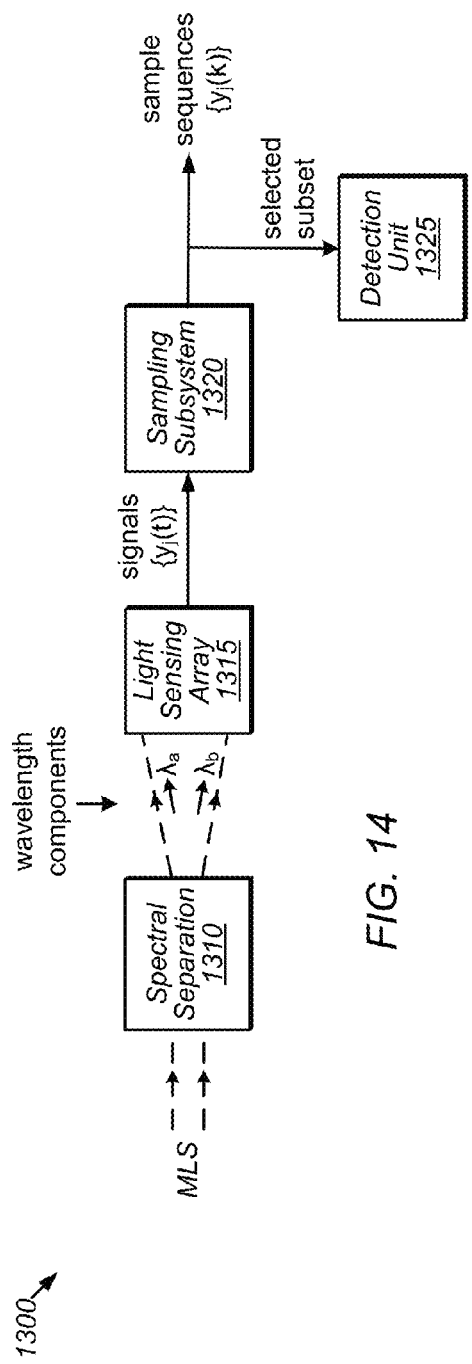
FIG. 14 illustrates an embodiment of system 1300 where the detection unit operates in the digital domain on digitized sample streams.

The detection unit 1325 may be configured to monitor a selected subset of the signals to detect an event occurring within a field of view corresponding to the incident light stream. (The selected subset may be programmable, e.g., by a host computer external to the system 1300, and/or, via a user interface provided as part of the system 1300.) By saying that the detection unit monitors a selected subset of "the signals", we do not mean to suggest that the detection unit must in all cases operate directly on analog outputs from the array 1315 as shown in FIG. 13. It is also possible that the detection unit may operate on a selected subset of the sample sequences, as shown in FIG. 14. Both realizations are to be interpreted as falling within the scope of meaning of the phrase "monitoring a selected subset of the signals" produced by the light sensing array 1315.

The action of detecting the event may include determining when the selected subset of signals satisfy a pre-determined signal condition. The nature of the pre-determined signal condition may be different in different embodiments. In some embodiments, the pre-determined signal condition is the condition that the signals of the selected subset simultaneously exceed respective programmable thresholds:

$$y_{f(i)}(t) > T_i, i=0,1,2,\ldots,N_{SS}-1,$$

where $\{y_j(t): j=1, 2, \ldots, N_{LSE}\}$ denotes the signals generated respectively by the light sensing elements of the array 1315, where $N_{LSE}$ denotes the number of light sensing elements, where f denotes a selection function that identifies the signals belonging to the selected subset, where f(i) represents the index of the $i^{th}$ signal of the selected subset, where $N_{SS}$ is the number of signals in the selected subset, where $T_i$ is the $i^{th}$ threshold. The detection unit 1325 may include a plurality of analog comparator circuits configured to compare respective signals of the selected subset to respective programmable thresholds. Alternatively, the detection unit may include a plurality of digital comparator circuits. Each of the digital comparator circuits may be configured to compare a respective one of the sample sequences of the selected subset to a respective programmable threshold.

In some embodiments, the detection unit may include a plurality of digital circuits, where each of the digital circuits is configured to compare a rate of change of a respective one of the sample sequences of the selected subset to a respective programmable threshold:

$$d\{y_{f(i)}(t)\}/dt > R_i, i=0,1,2,\ldots,N_{SS}-1.$$

Alternatively, the detection unit may include a plurality of analog circuits, where each of the analog circuits is configured to compare a rate of change of a respective one of the signals of the selected subset to a respective programmable rate threshold.

In some embodiments, the pre-determined signal condition is the logical AND of a first condition and a second condition, where the first condition is that the signals of the selected subset simultaneously exceed respective programmable value thresholds, and the second condition is that rates of change of the respective signals of the selected subset simultaneously exceed respective programmable rate thresholds.

In some embodiments, the pre-determined signal condition is the condition that the signals of the selected subset have respective values that conform to a pre-determined spectral signature. For example, the detection unit may monitor the vector signal $<y_{f(i)}(t): i=0,1,\ldots,N_{SS}>$ to determine when the vector signal conforms to (i.e., matches) a predetermined spectral signature vector $S=<s_i: i=0, 1, \ldots, N_{SS}>$. The spectral signature vector may be programmable. In some embodiments, the detection unit may monitor the vector signal to determine when vector signal matches any spectral signature in a predetermined set of spectral signals, e.g., spectral signatures of different types of explosions, chemical reactions, firearm discharges, etc.

Figures 15A, 15B:
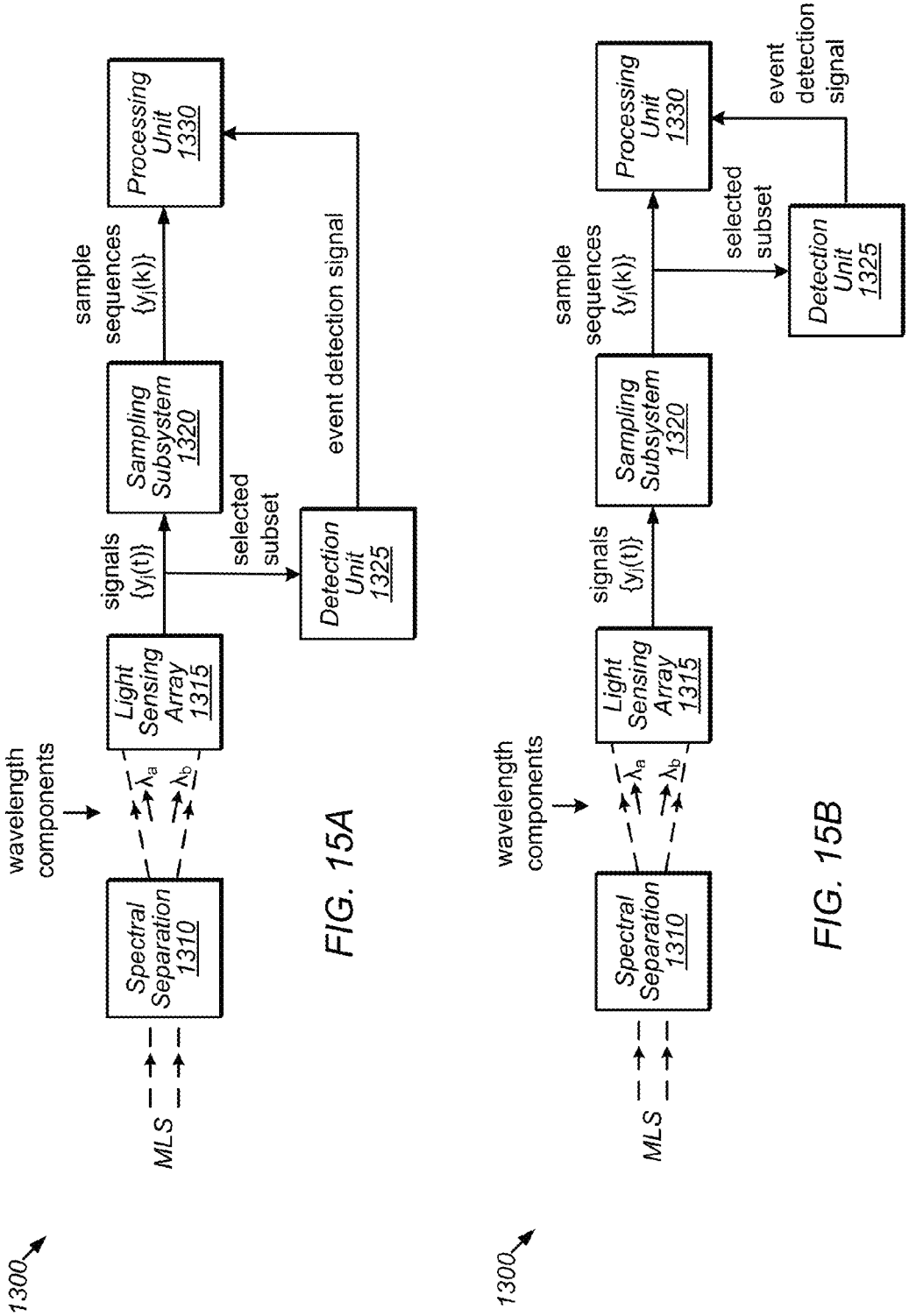
FIGS. 15A and 15B illustrates embodiments of system 1300 including a processing unit for performing operations such as image reconstruction, determination of event locations, etc.
Figure 16:
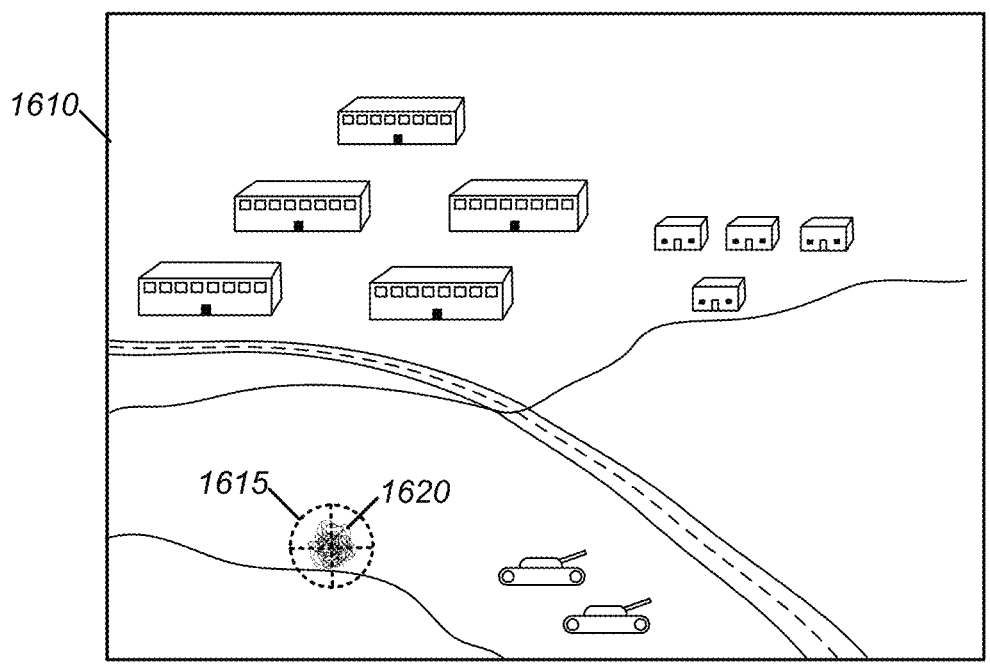
FIG. 16 illustrates an example of a reconstructed image integrated with a visual indication of the location of event occurring in the field of view.

In some embodiments, the system 1300 may also include a processing unit 1330, e.g., as shown in FIG. 15A or FIG. 15B. The processing unit may be realized by one or more processors executing program instructions, by custom-designed digital circuitry such as one or more ASICs, by one or more programmable hardware elements such as FPGAs, or by any combination of foregoing types of processing element.

The processing unit 1330 may be configured to receive the samples sequences produced by the sampling subsystem 1320 and to reconstruct a temporal sequence (e.g., a video sequence) of images based on the sample sequences. Each image of the temporal sequence of images may be reconstructed based on a corresponding window of samples. (The sample windows may be overlapped in time, e.g., as variously described in U.S. patent application Ser. No. 13/534,414. In other words, each sample window may overlap the previous sample window by a certain amount.) The processing unit may direct the temporal sequence of images to be displayed, e.g., by invoking a display process that transfers the temporal sequences of images to a display device.

The temporal sequence of images may be generated in different ways in different embodiments. In some embodiments, the sample sequences may be added together to obtain a composite sequence, and the images of the temporal sequence may be reconstructed based on corresponding overlapping windows of samples from the composite sequence. The process of adding the sample sequences may be modeled by the expression:

$$s(k) = \sum_{j=0}^{N_{LSE}} y_j(k),$$

where k is a discrete time index. In one embodiment, the sample sequences may be added with weighting. In other words, the composite sequence may be a linear combination of the sample sequences.

In one alternative embodiment, the sample sequences may be partitioned into three groups, with each group corresponding to a distinct band of wavelengths. For example, the three groups may correspond respectively to a short wavelength band, a medium wavelength band and a long wavelength band. The sample sequences in each group may be summed to obtain a corresponding sum sequence. Thus, three sum sequences $s_S(k)$, $s_M(k)$ and $s_L(k)$ are generated. In each frame time, a color image may be generated by reconstructing a blue sub-image from a window of samples of the sum sequence $s_S(k)$, reconstructing a green sub-image from a window of samples of the sum sequence $s_M(k)$, and reconstructing a red sub-image from a window of samples of the sum sequence $s_L(k)$. The resulting sequence of color images may be displayed using a color display.

In some embodiments, the processing unit 1330 may be configured to reconstruct a first image and a second image in response to the detection of the event. (The processing unit 1330 may receive an event detection signal from the detection unit when the event has been detected.) The first image is reconstructed based on a first window of samples, and the second image is reconstructed based on a second window of samples. Each window of samples is taken from (or derived from) the sample sequences corresponding to the selected subset. However, the second window is advanced in time relative to the first window. The first window may correspond to a first time interval prior to the event, e.g., a time interval ending just prior to the event. The second window may correspond to a second time interval that at least partially includes the event. The first window and the second window may overlap in time (e.g., as variously described in U.S. patent application Ser. No. 13/534,414). In some embodiments, the first window and the second window overlap in time by a high percentage. For example, the second window may have the same number of samples as the first window but be shifted forward in time by an amount Δt which ensures that the second window includes a substantial portion of the event duration. (The processing unit may derive a measure of the event duration by measuring the duration of assertion of the event detection signal.) In some embodiments, the reconstructed first image may be used as a warm start for the reconstruction of the second image, e.g., as variously described in U.S. patent application Ser. No. 13/534,414.

In some embodiments, the processing unit 1330 is further configured to determine spatial localization information based on a difference between the first image and the second image: $\Delta I = I_2 - I_1$. The spatial localization information indicates where the event has occurred in the field of view. The computation of the difference image may serve to remove the common background that is shared by the first and second images, leaving energy corresponding to the event. Thus, most of the pixels in the difference image may be close to zero except for the pixels corresponding to the event. In one embodiment, the spatial localization information may be determined by computing a centroid and spatial radius of the pixels in the difference image. The spatial radius may be computed by averaging the distance (or the squared distance) between each pixel position ($j_x$, $j_y$) and the centroid. The distance value for each pixel may be weighted by the value of the pixel. In another embodiment, the processing unit may apply a threshold to the pixel amplitudes of the difference image, and then compute a minimal bounding box (or circle or other geometric shape) that contains the pixels which exceeded the threshold. After determining the spatial localization information, the processing unit may inject (e.g., overlay, blend or superimpose) a visual representation of the spatial localization information into at least a subset of the images of said temporal sequence of images, e.g., as shown in image 1610 of FIG. 16. A circle 1615 with cross hairs (or some other type of visual indication) may be injected into the image to indicate the location and approximate extent of the event 1620 (e.g., an explosion, discharge, gun blast, rocket launch or missile launch). In one embodiment, the visual representation may be injected into images of the temporal sequence starting at the time of the event detection, or perhaps slightly before the event detection time.

The spatial localization information may include a location of occurrence of the event within the field of view. Furthermore, the spatial localization information may include a sub-region (e.g., a disk or ellipse or rectangle or convex polygon) that spatially bounds or contains the event within the field of view.

In some embodiments, the system 1300 may be realized as a camera. The camera may be mounted on a platform that allows angular (e.g., azimuth and elevation) adjustments. Furthermore, the optical input path (whereby the incident light stream enters the camera and is supplied to the light modulation unit) may include a camera lens subsystem that has a range of optical zoom. The processing unit 1330 may be configured to direct one or more actuators to adjust a pointing direction and/or extent of optical zoom of the camera based on the spatial localization information. For example, it may be desirable to reorient the camera so that the event location is centered in the field of view, and/or, so that the spatial region associated with the event occupies a higher percentage of the field of view.

In some embodiments, the processing unit 1330 may be configured to reconstruct an image $I_E$ in response to the detection of the event. The image $I_E$ may be reconstructed based on a window $W_E$ of samples taken (or derived) from the sample sequences corresponding to the selected subset. The window $W_E$ corresponds to a time interval that at least partially includes the event, e.g., includes the entirety of the event or an initial portion of the event. The processing unit 1330 may determine spatial localization information based on the image $I_E$. (The spatial localization information indicates where the event has occurred in the field of view.) For example, the processing unit 1330 may apply a threshold to the pixels of the image $I_E$, and then compute a centroid and radius of the surviving pixels (i.e., the pixels that exceeded the threshold). Instead of a centroid and radius, the processing unit may alternatively compute a minimal bounding box containing the event. Under the assumption that the pixels corresponding to the event are brighter than the pixels of the background, the application of the threshold may eliminate most of the background, leaving pixels corresponding to the event. After having determined the spatial localization information, the processing unit may inject a visual representation of the spatial localization information into at least a subset of the images of said temporal sequence of images, e.g., as described above.

In some embodiments, the processing unit 1330 may be configured to perform a search process in response to the detection of the event. The search process may operate on one or more of the sample sequences belonging to the selected subset, and during the occurrence of the event, in order to identify a spatial subregion within the field of view that contains the event. The search process may include: injecting search patterns into the temporal sequence of spatial patterns; and analyzing the samples of the one or more sample sequences in response to the injection of the search patterns. The search process is adaptive in the sense that the analysis of previous samples guides the selection of new search patterns to inject into the temporal sequence of spatial patterns. (For example, if a first search pattern corresponding to a first spatial region in the field of view produces a sample with high intensity value, additional search patterns corresponding to non-overlapping subregions of the first region may be injected into the sequence of spatial patterns, to explore within the first region.) The search process may be conducted according to any of the various methods described in U.S. patent application Ser. Nos. 13/631,626 and 13/207,276. After having identified the spatial subregion containing the event, the processing unit 1330 may inject a visual representation of the spatial subregion into at least a subset of the images of said temporal sequence of images, e.g., as described above.

In some embodiments, the search process includes a hierarchical search based on a quadtree, e.g., as described in U.S. patent application Ser. No. 13/631,626. The quadtree corresponds to a recursive partitioning of the field of view (i.e., the array of light modulating elements) into rectangular subsets.

In one set of embodiments, a method 1700 may include the operations shown in FIG. 17. The method 1700 may be used to detect an event (such as an explosion, a gun discharge or chemical reaction) occurring within a field of view based on signal measurements made over a plurality of spectral channels. (The method 1700 may also include any subset of the features, elements and embodiments described above in connection with system 100, system realization 200, system 1300 and FIGS. 6-16, and described below in connection with system 1800, system 2400, system 2800 and system 2900.)

At 1710, a modulated light stream may be received. The modulated light stream may be generated by modulating an incident light stream with a temporal sequence of spatial patterns, e.g., as variously described above in connection with system 100, system realization 200 and system 1300.

At 1715, the modulated light stream may be separated into a plurality of wavelength components, e.g., as variously described above in connection with spectral separation subsystem 1310.

At 1720, subsets of the wavelength components may be converted into respective signals, e.g., as variously described above. Each of the signals represents intensity of the respective subset of the wavelength components as a function of time.

At 1725, the signals are sampled in order to obtain respective sample sequences, e.g., using the sampling subsystem 1320 described above. The sample sequences may be stored into a memory, e.g., to allow subsequent reconstruction of images.

At 1730, a selected subset of the signals are monitored to detect an event occurring within a field of view corresponding to the incident light stream. The action of detecting the event includes determining when the selected subset of signals satisfy a pre-determined signal condition. The selected subset may be programmable. Thus, in different contexts, different subsets of the signals may be used.

In some embodiments, the pre-determined signal condition is the condition that the signals of the selected subset simultaneously exceed respective programmable thresholds. In other embodiments, the pre-determined signal condition is the condition that rates of change of the respective signals of the selected subset exceed respective programmable thresholds. In yet other embodiments, the pre-determined signal condition is the condition that the signals of the selected subset have respective values that conform to a pre-determined spectral signature.

In some embodiments, the method 1700 may also include reconstructing a temporal sequence of images based on the sample sequences. In one embodiment, the temporal sequence of images may be reconstructed continuously, e.g., as along as the sample sequences are being generated. In another embodiment, the reconstruction of the temporal sequence of images is initiated in response to the detection of the event. The above-described storage of the sample sequences into the memory allows images corresponding to past history to be reconstructed if desired.

In some embodiments, the method 1700 also includes reconstructing a first image and a second image in response to the detection of the event. The first image is reconstructed based on a first window of samples, and the second image is reconstructed from a second window of samples. Each window of samples is taken (or derived) from the sample sequences corresponding to the selected subset. The first window corresponds to a first time interval prior to the event, and the second window corresponds to a second time interval that at least partially includes the event.

After having reconstructed the first image and the second image, the method 1700 may determine spatial localization information based on a difference between the first image and the second image (where the spatial localization information indicates where the event has occurred in the field of view), and inject a visual representation of the spatial localization information into at least a subset of the images of the temporal sequence of images.

In some embodiments, the method 1700 may also include reconstructing an image $I_E$ in response to the detection of the event. The reconstruction of the image $I_E$ is based on a window $W_E$ of samples taken (or derived) from the sample sequences corresponding to the selected subset. The window $W_E$ of samples corresponds to a time interval that at least partially includes the event. After having reconstructed the image $I_E$, spatial localization information may be determined based on the image $I_E$, e.g., as described above in connection with processing unit 1330. The spatial localization information indicates where the event has occurred in the field of view. Furthermore, a visual representation of the spatial localization information may be injected into at least a subset of the images of the temporal sequence of images.

In some embodiments, the method 1700 may include performing a search process in response to the detection of the event. The search process may operate on one or more of the sample sequences belonging to the selected subset and during the occurrence of the event, in order to identify a spatial subregion of the field of view that contains the event. The search process may include: injecting search patterns into the temporal sequence of spatial patterns; and analyzing the samples of the one or more sample sequences in response to the injection of the search patterns. In one embodiment, a visual representation of the spatial subregion may be injected into at least a subset of the images of said temporal sequence of images.

In some embodiments, the search process includes a hierarchical search based on a quadtree, where the quadtree corresponds to a recursive partitioning of the field of view into rectangular subsets.

In one embodiment, the spectral separation subsystem and the array of light sensing elements may be incorporated as part of a commercial off-the-shelf spectrometer.

Compressive-Sensing Hyperspectral Imaging System

Figure 18:
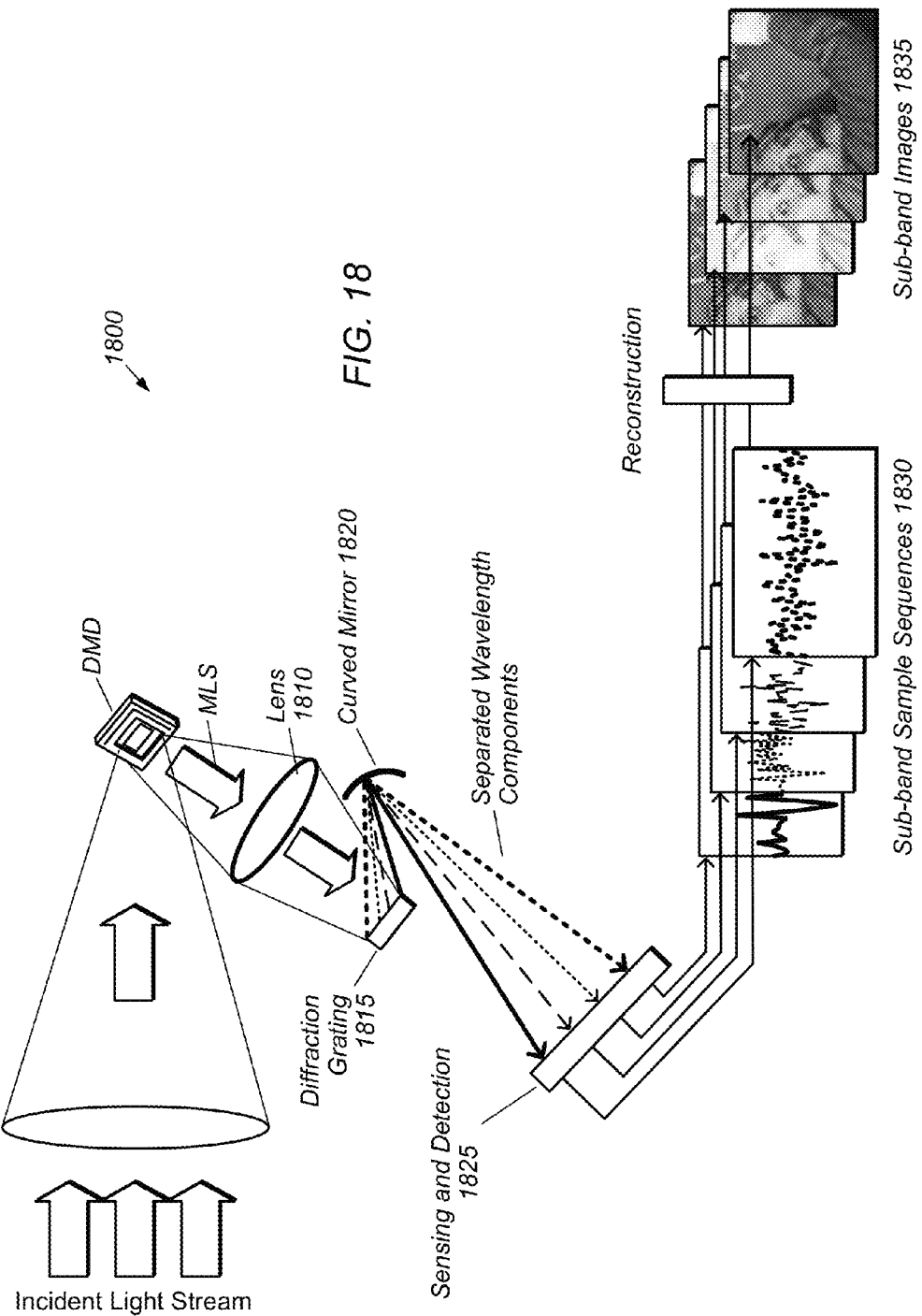
FIG. 18 illustrates one embodiment of a system 1800 for detecting spectral events, involving the use of a diffraction grating 1815 and a multi-channel sensing and detection unit 1825.
Figure 19:
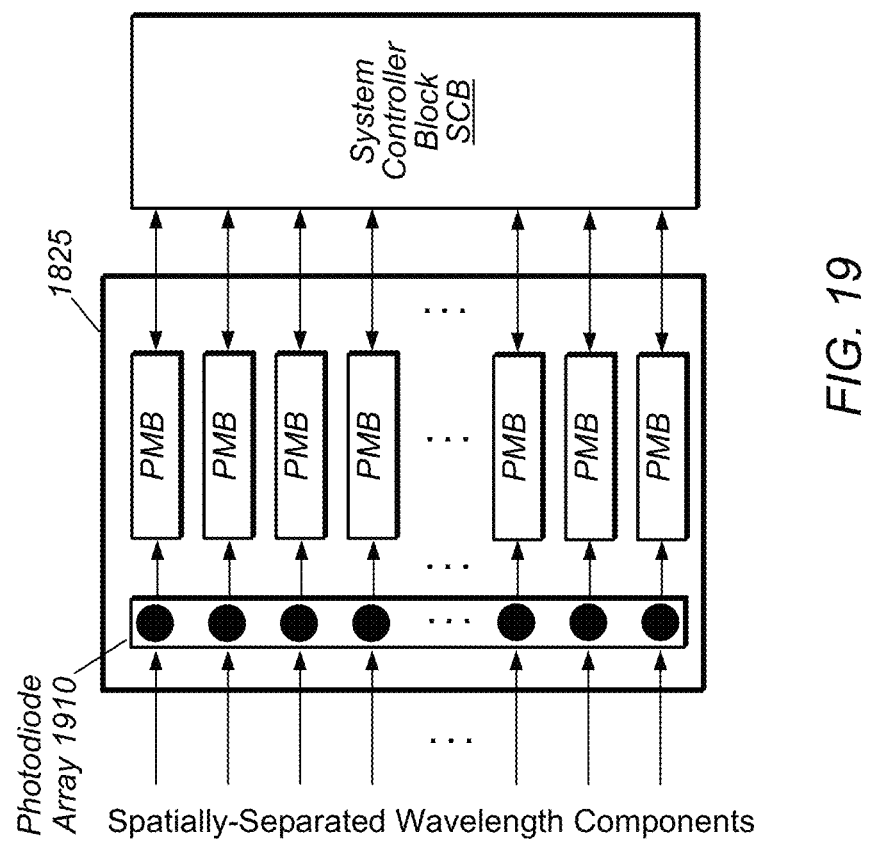
FIG. 19 illustrates one embodiment of the sensing and detection unit 1825, including an array of photodiodes and an array of photodiode monitoring blocks.

In one set of embodiments, a compressive sensing (CS) hyperspectral imaging system 1800 may be configured as shown in FIG. 18. The system 1800 may capture a stream of compressive measurements for each of a series of wavelength bands (spectral windows) covering a wavelength spectrum, e.g., the infrared spectrum, or the short-wave infrared spectrum, or the UV spectrum, or the visible spectrum, or a broad spectrum including both the SWIR spectrum and the visible spectrum, etc. For each wavelength band, the system may reconstruct a corresponding component image based on the corresponding stream of compressive measurements. The component image represents the field of view (the external scene) restricted to the corresponding wavelength band. The components images together form a hyperspectral data cube.

The system 1800 may include a digital micromirror device (DMD) that modulates an incident light stream with a temporal sequence of spatial patterns to obtain a modulated light stream MLS. The spatial patterns include measurements patterns, i.e., patterns that are incoherent relative to the sparsity pattern set being assumed for the incident light stream, as variously described above.

A lens 1810 may be used to image, focus or direct the modulated light stream onto a diffraction grating 1815. (The diffraction grating 1815 may be reflection grating or a transmission grating.) The diffraction grating spatially separates the wavelength components contained in the modulated light stream. While FIG. 18 highlights four of the wavelength components (using different types of line texture), the light stream outputted from the diffraction grating may include any number of wavelength components, e.g., an infinite continuum of wavelength components. The outputted light stream may be focused or imaged onto sensing and detection subsystem 1825, e.g., using a curved mirror 1820, or alternatively, using a second lens.

The subsystem 1825 includes an array of light sensing elements, each of which receives a corresponding sub-band of the wavelength components in the outputted light stream and generates a corresponding intensity signal that represents intensity as a function of time of the corresponding sub-band of wavelength components. The subsystem 1825 may also include an array of analog-to-digital converters (ADCs) configured to convert the sub-band intensity signals into respective sub-band sample sequences 1830 in parallel. Each of the sub-band sample sequences may be used to reconstruct a corresponding sub-band image (or sub-band image sequence). The set 1835 of sub-band images form a 3D representation of the external scene extending in two spatial dimensions and in the wavelength dimension. (The set of sub-band image sequences form a 4D representation of the external scene extending in two spatial dimensions and in the wavelength and time dimensions.)

In some embodiments, the system 1800 is configured to very quickly recognize a short-duration spectral signature, and then identify the spatial location of the source of the spectral signature within the field of view. To facilitate such recognition, the subsystem 1825 may include a detection unit, e.g., as variously described above in connection with system 1300.

Continuous High-Speed Spectral Signature (SS) Detection

In some embodiments, the sensing and detection subsystem 1825 may include an array 1910 of photodiodes and a plurality of photodiode monitoring blocks (PMBs). Each PMB may couple to a respective one of the photodiodes of the photodiode array. In some embodiments, the sensing and detection subsystem 1825 may be realized by a custom-designed ASIC.

Each PMB may include high-speed dedicated circuitry configured to continuously monitor the output of the respective photodiode in order to detect abrupt changes in light energy in the corresponding spectral window, i.e., the spectral window of wavelength components received by the respective photodiode. (The threshold levels used by the PMBs are also programmable.) Each PMB may monitor the output signal generated by the respective photodiode and compare the instantaneous amplitude (and/or the instantaneous rate of change of the amplitude) of the output signal to a respective threshold. When the threshold is exceeded, the PMB may send a detection signal to the system controller block (SCB). (The SCB may be implemented, e.g., by the above-described processing unit 1330.) The SCB may monitor the detection signals from a selected subset of the PMBs, e.g., PMBs corresponding to spectral windows of interest. When the detection signals indicate that all the spectral windows of interest have exceeded their respective thresholds, a spectral signature (SS) event is declared.

Figure 20:
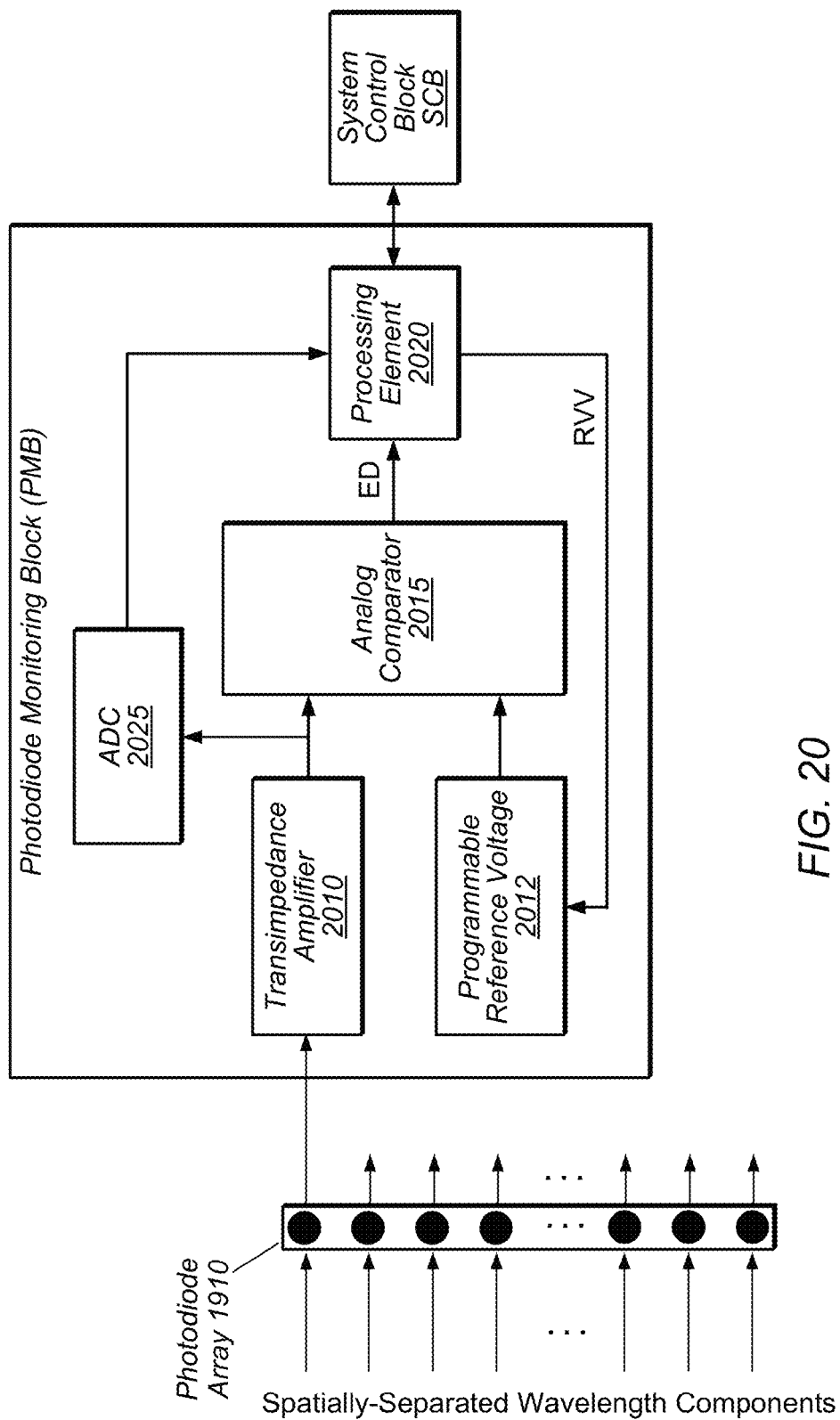
FIG. 20 illustrates one embodiment of the photodiode monitoring block (PMB), including an analog comparator circuit 2015.

FIG. 20 shows one embodiment of the photodiode monitoring block (PMB). A transimpedance amplifier (TIA) 2010 converts the current output of the respective photodiode into a voltage signal. The voltage signal is compared to a reference voltage 2012 by a high-speed analog comparator unit 2015, which asserts an event detection (ED) signal when the voltage signal exceeds the reference voltage. The reference voltage 2012 may be generated by a digital-to-analog converter (DAC) based on a reference voltage value RVV supplied by the processing element 2020. The comparator unit 2015 may include a filter to help remove false positives due to noise. The ED signal may be provided to the processing element 2020, and thence to the system controller block (SCB).

The PMB may also include an analog-to-digital converter (ADC) 2025 that digitizes the output voltage of the TIA 2010, and sends the resulting sample sequence to the processing element 2020 and/or the SCB, to support image reconstruction by the SCB (or image reconstruction by some agent external to the system 1800).

The processing element 2020 may receive the reference voltage value RVV from the SCB which, and forward it to the programmable reference voltage (PRV) block 2012. The PRV block may include a digital-to-analog converter that creates the analog reference voltage used by the comparator unit 2015.

Figure 21:
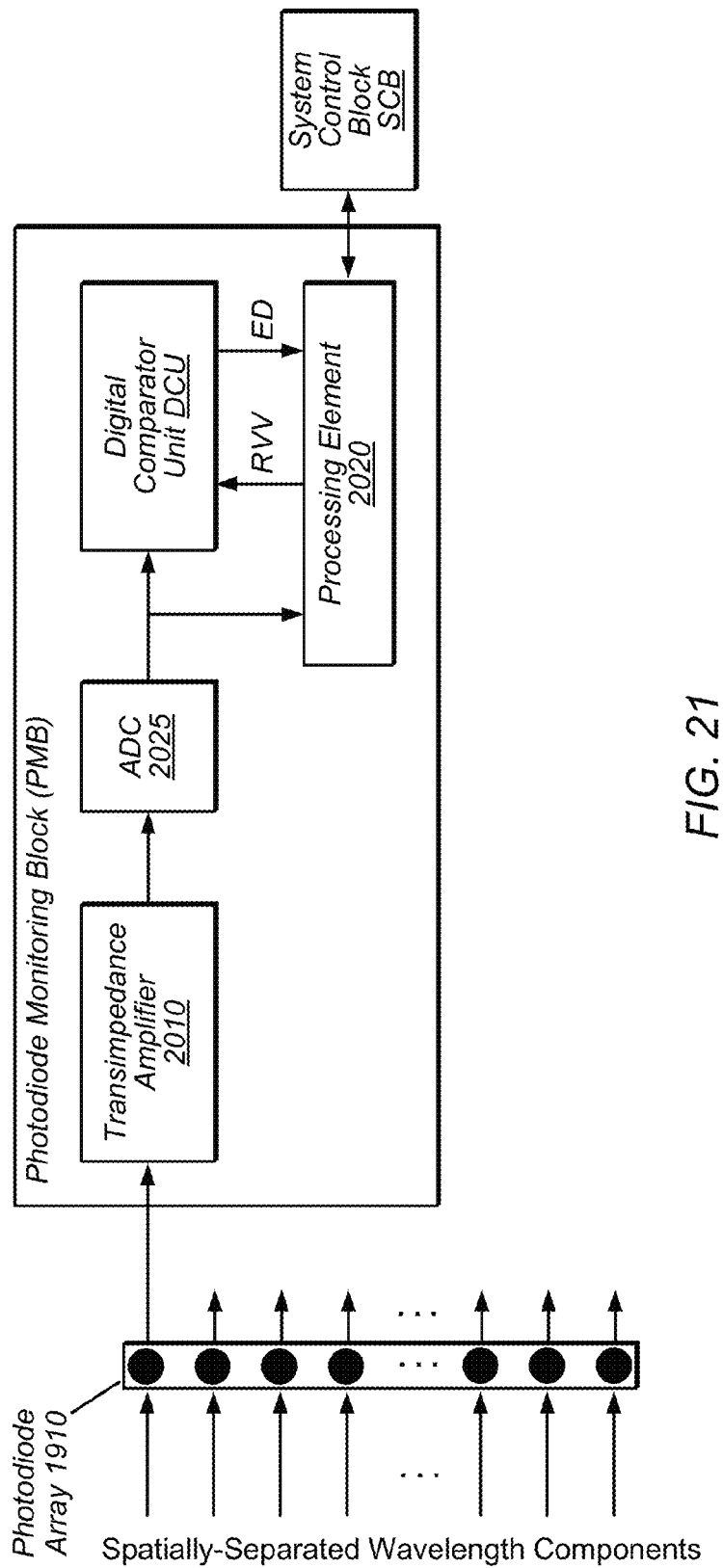
FIG. 21 illustrates another embodiment of the photodiode monitoring block (PMB), including a digital comparator unit DCU.

In another embodiment of the PMB, the comparator function is performed in the digital domain, e.g., using a digital comparator unit DCU as shown in FIG. 21. The DCU takes as its inputs the sample sequence supplied by the ADC 2025 and the digital reference voltage value RVV provided by the processing element 2020.

Figure 22:
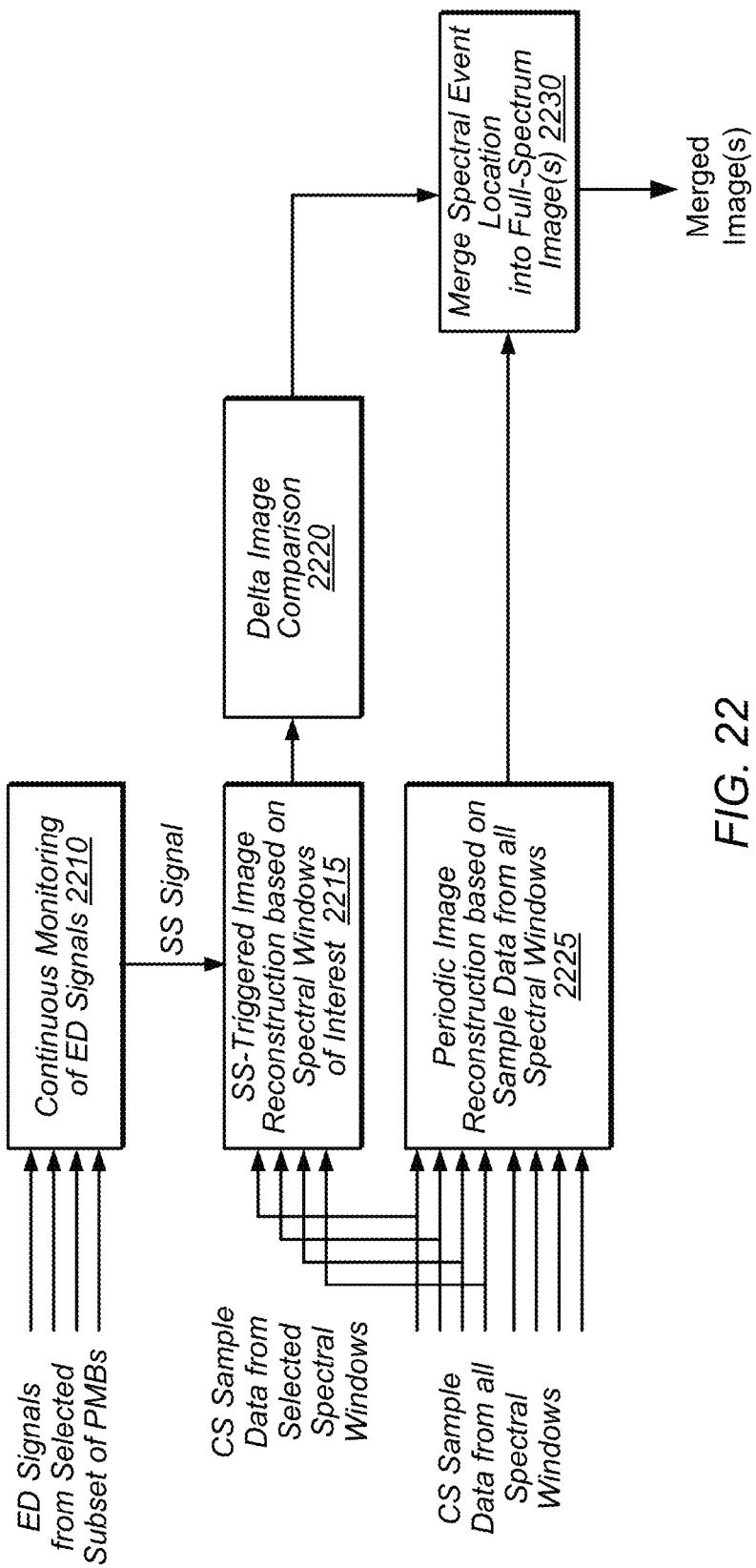
FIG. 22 illustrates one embodiment of an event detection and location method performed, e.g., by the system controller block (SCB) of FIG. 19.

The SCB may continuously monitor the photodiode monitoring blocks (PMBs) or a selected subset of the photodiode monitoring blocks, as shown at operation 2210 of FIG. 22. For example, when the SCB determines that the selected subset of PMBs are all asserting their respective ED signals, the SCB may declare a spectral signature (SS) event, e.g., by asserting an SS signal.

Differential Image Comparison to Locate Spectral Event

In some embodiments, the system control block (SCB) may reconstruct a pre-event image and an event-containing image in response to the assertion of the SS signal, as indicated at operation 2215 of FIG. 22. The pre-event image and the event-containing image may be reconstructed based respectively on a pre-event block of samples and an event-containing block of samples. The samples of each sample block may be drawn (or derived) from the sample sequences corresponding to the spectral windows of interest. For example, the SCB may add the sample sequences corresponding to the spectral windows of interest to obtain a sum sequence. The SCB may reconstruct the pre-event image based on a block of samples from the sum sequence, i.e., a block of samples that precedes the occurrence of the event. Furthermore, the SCB may reconstruct the event-containing image based on a second block of samples from the sum sequence, i.e., a block of samples that at least partially includes the temporal duration of the event. (The first and second block of samples may overlap in time.) At 2220, the SCB may perform a differential image comparison between the pre-event image and event-containing image to spatially identify the location of the source of the spectral event, e.g., as variously described above. At 2225, the SCB may reconstruct images based on corresponding blocks of sample data derived from all the spectral windows. The images may be reconstructed periodically, e.g., with programmable frequency. At 2230, the SCB may merge a visual indication of the location of the spectral event into the full-spectrum image(s) generated by operation 2225. The merged image(s) may be displayed via a display device.

Figure 23:
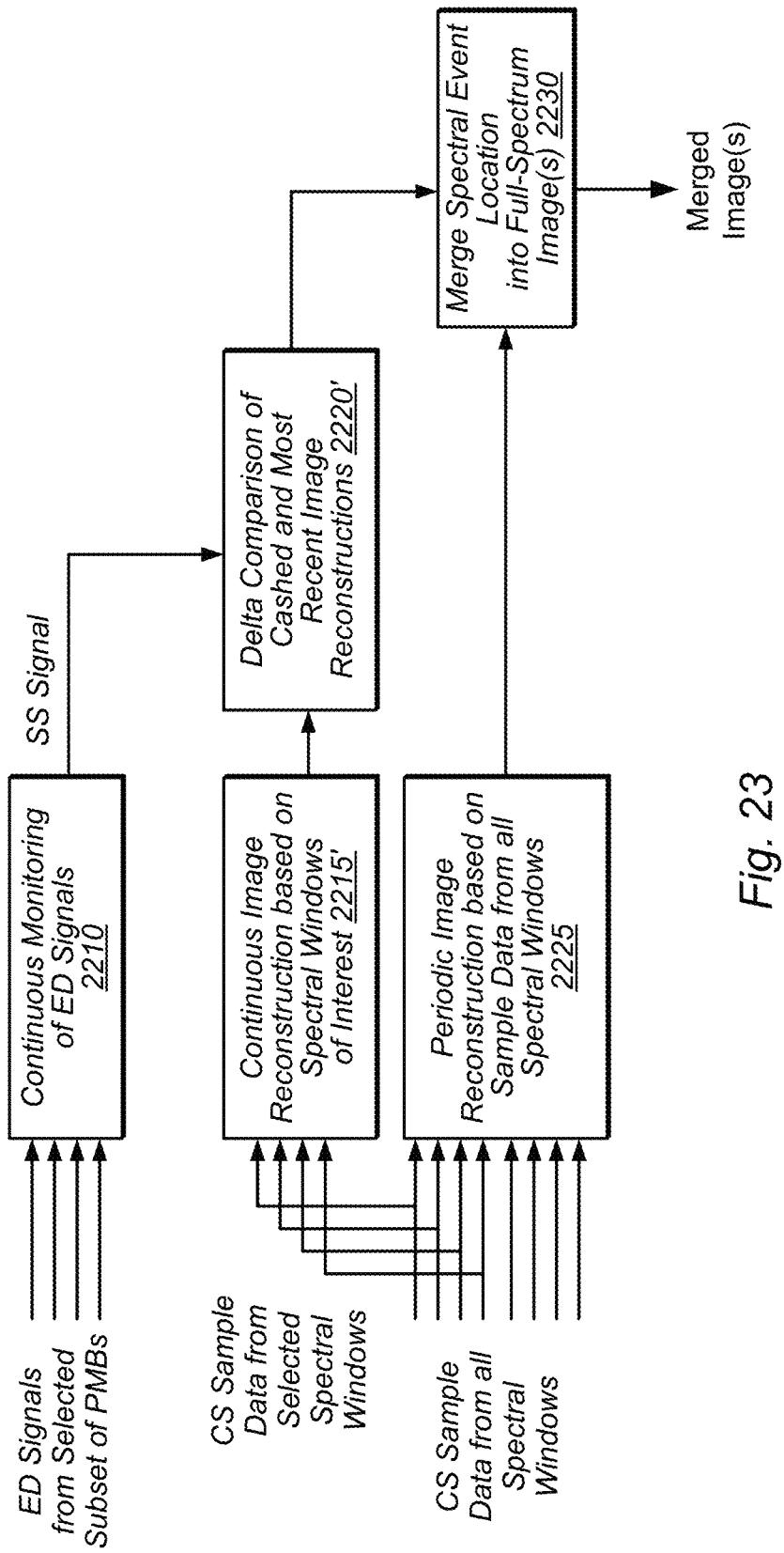
FIG. 23 illustrates one embodiment of an alternative event detection and location method performed, e.g., by the system controller block (SCB) of FIG. 19.

In alternative embodiments, the SCB may continuously reconstruct images based on sample data drawn from (or derived from) the sample sequences corresponding to the spectral windows of interest (i.e., from the selected subset of PMBs), as indicated at 2215' of FIG. 23. The reconstruction process may involve summing the sample sequences corresponding to the spectral windows of interest to obtain a sum sequence, and then generating images based on corresponding blocks (e.g., overlapping blocks) of samples from the sum sequence. The most recently reconstructed image may be continuously cached into memory. At shown at 2220' of FIG. 23, when the SS signal is asserted, the SCB may: (a) collect additional sample data from the sample sequences corresponding to the spectral windows of interest (i.e., from the sample sequences provided by selected subset of PMBs) for a programmable amount of time; (b) reconstruct a new image based on a block of samples including at least the additional sample data, e.g., as variously described above; and (c) perform a differential image comparison between the cached image and new image to spatially identify the location of the source of the spectral event. Again, a visual representation of the spatial location may be merged into the full-spectrum image(s) generated by operation 2225.

Dual Path Architectures

Figure 24:
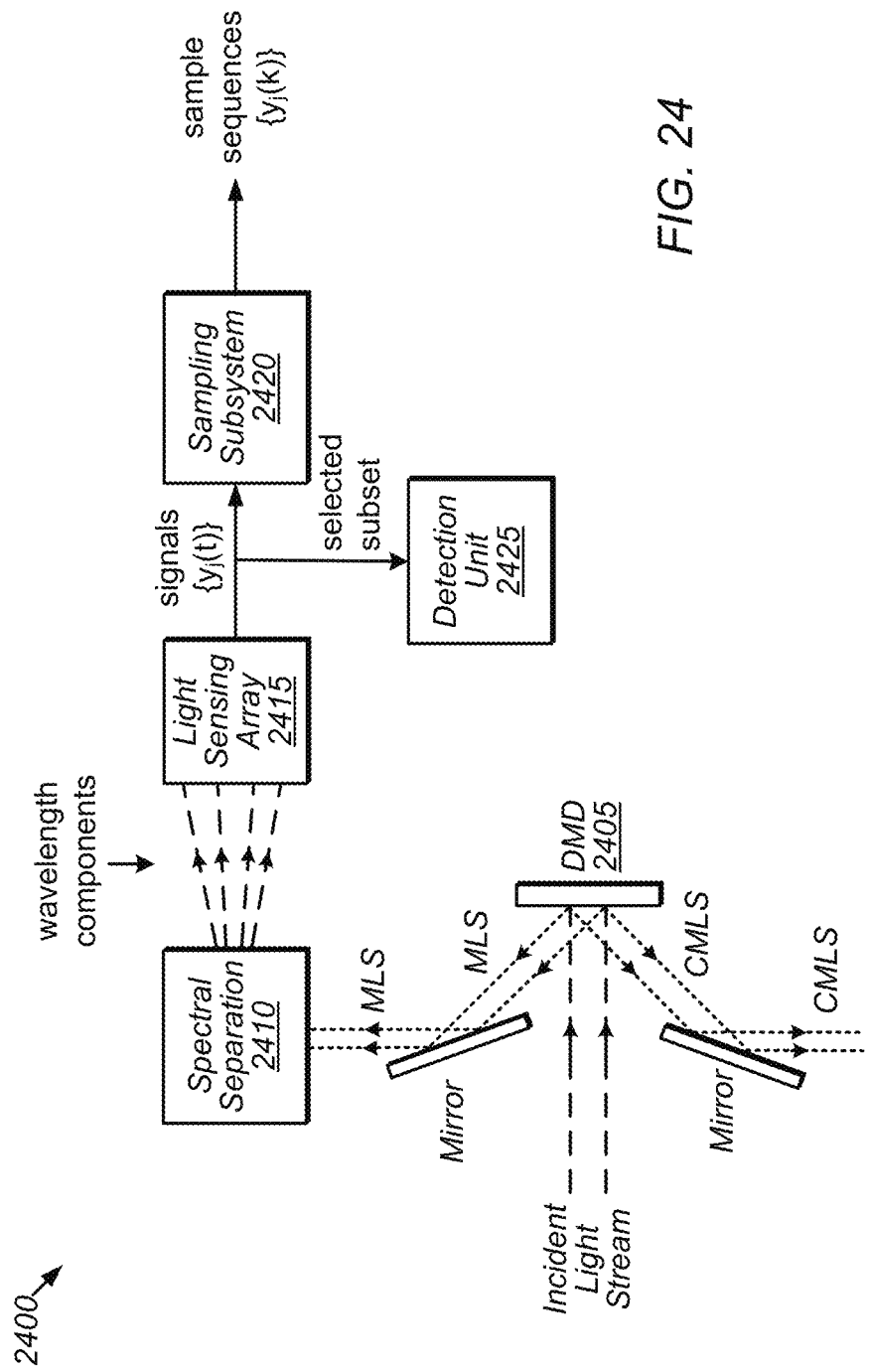
FIG. 24 illustrates one embodiment of a system 2400 for performing event detection and/or hyperspectral imaging using a digital micromirror device (DMD).

In one set of embodiments, a system 2400 for spectral event detection may be configured as shown in FIG. 24. The system 2400 may include a digital micromirror device (DMD) 2405, a spectral separation subsystem 2410, an array 2415 of light sensing elements, a sampling subsystem 2420 and a detection unit 2425. (The system 2400 may also include any subset of the features, element and embodiments described above in connection with system 100, system realization 200, system 1300, method 1700 and system 1800, and described below in connection with system 2800 and system 2900.)

The DMD 2405 may be configured to receive an incident light stream, and modulate the incident light stream with a temporal sequence of spatial patterns to obtain a modulated light stream MLS and a complementary modulated light stream CMLS. The modulated light stream MLS comprises portions of the incident light stream that are reflected at any given time by micromirrors in a first of two orientation states. The complementary modulated light stream CMLS comprises portions of the incident light stream that are reflected at any given time by micromirrors in a second of the two orientation states. The DMD 2405 may be realized as variously described above in connection with mirrors 110M.

The spectral separation subsystem 2410 may be configured to receive the modulated light stream, and separate the modulated light stream into a plurality of wavelength components. As noted above, the plurality of wavelength components may include a continuum of wavelength components and/or a set of discrete wavelength components. The spectral separation subsystem 2410 may be configured as variously described above in connection with spectral separation subsystem 1310.

The light sensing elements (e.g., photodiodes) of the array 2415 are configured to receive respective subsets (e.g., bands) of the wavelength components and to generate respective spectral element signals. Each of the spectral element signals represents intensity of the respective subset of the wavelength components as a function of time.

The sampling subsystem 2420 may be configured to sample the spectral element signals in order to obtain respective spectrally-limited sample sequences. The spectrally-limited sample sequences may be stored in a memory of the system 2400.

The detection unit 2425 may be configured (e.g., as variously described above in connection with system 1300 and/or system 1800) to monitor a selected subset of the spectral element signals to detect an event occurring within a field of view corresponding to the incident light stream. The action of detecting the event may include determining when the selected subset of the spectral element signals satisfy a predetermined signal condition.

Figure 25:
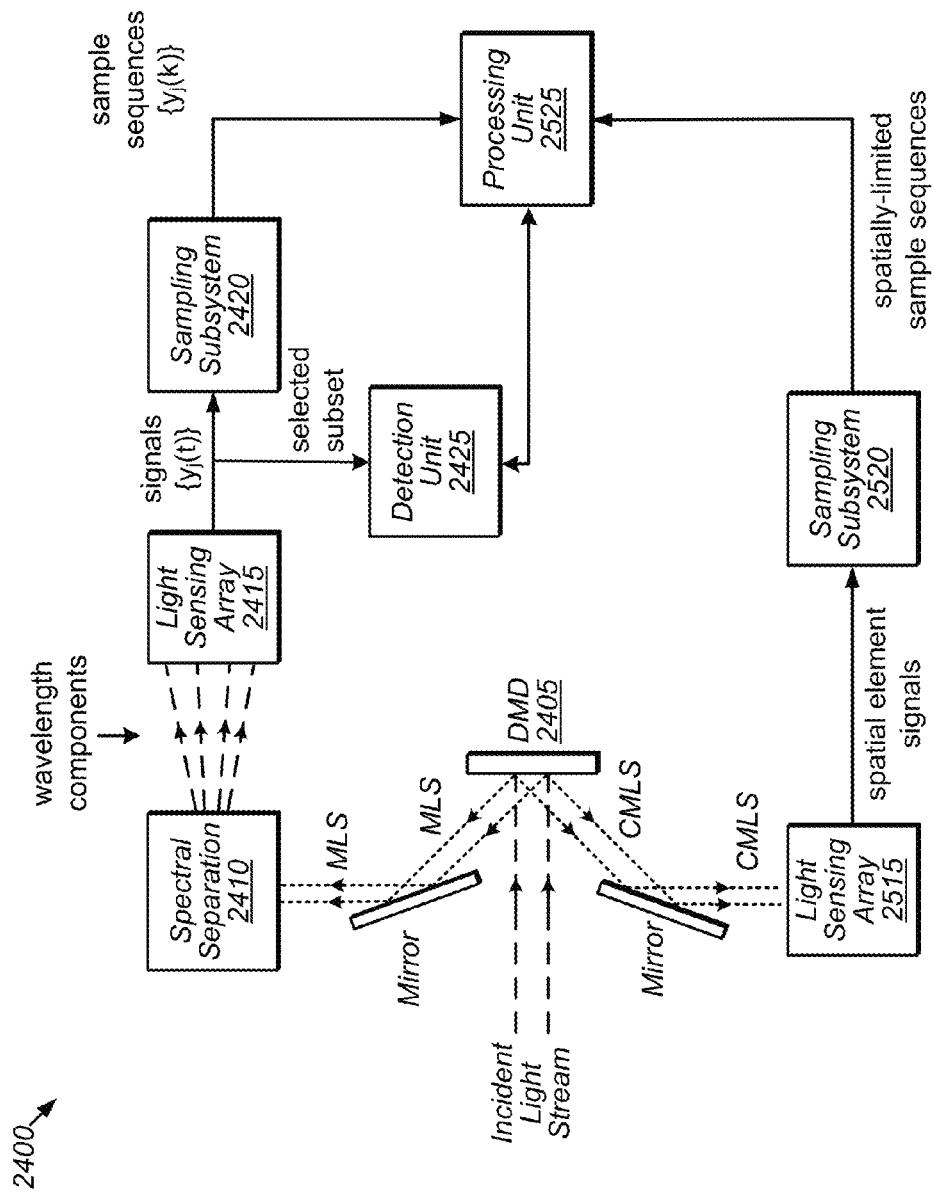
FIG. 25 illustrates an embodiment of system 2400 that uses both the output light streams produced by the DMD. The second output stream (i.e., the complementary modulated light stream CMLS) is sensed with an array 2515 of light sensing elements.

In some embodiments, the system 2400 may also include an array 2515 of light sensing elements, a sampling subsystem 2520 and a processing unit 2525 as shown in FIG. 25.

The light sensing elements (e.g., photodiodes) of the array 2515 may be configured to convert respective spatial portions of the complementary modulated light stream into respective spatial element signals, e.g., as variously described in U.S. patent application Ser. No. 13/197,304. A lens may be used to image the complementary modulated light stream onto the array 2515.

The sampling subsystem 2520 may be configured to sample the spatial element signals to obtain respective spatially-limited sample sequences. The spatially-limited sample sequences may be stored into memory.

The processing unit 2525 may be configured to reconstruct a temporal sequence of images based on the spatially-limited sample sequences. For example, at each frame time, the processing unit may generate an image by reconstructing a plurality of sub-images (i.e., one sub-image for each of the light sensing elements), and concatenating the sub-images, i.e., joining the sub-images together along their boundaries. Each sub-image represents a corresponding portion of the field of view, i.e., the portion that is captured by the respective light sensing element. Each sub-image is reconstructed based on a current block of samples from the corresponding spatially-limited sample sequence. The processing unit 2525 may be realized, e.g., as variously described above in connection with processing unit 150, processing unit 1330 and system controller block SCB.

Figure 26:
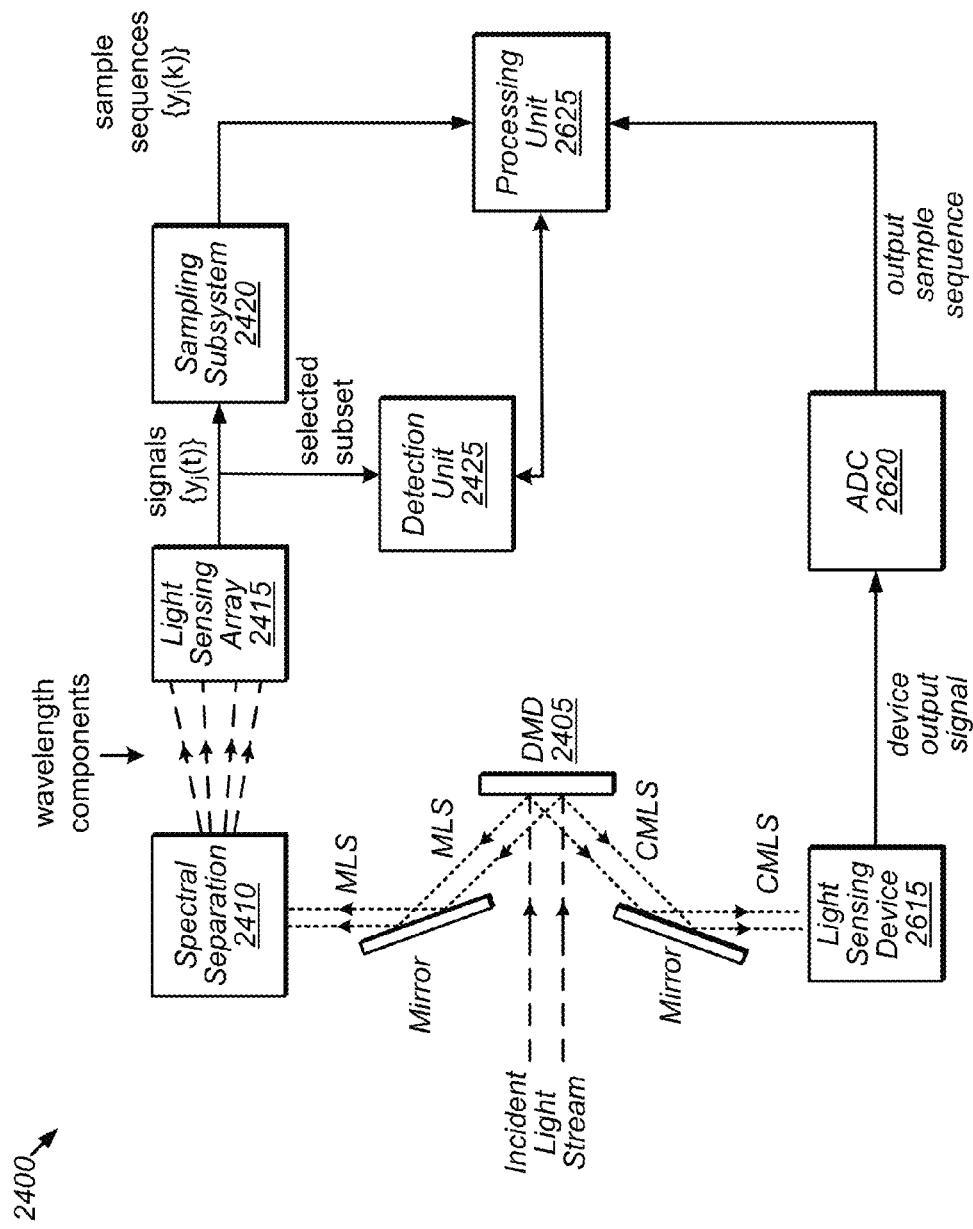
FIG. 26 illustrates another embodiment of system 2400 that uses both the output light streams produced by the DMD. The second output stream (i.e., the complementary modulated light stream CMLS) is sensed by a light sensing device 2615 (e.g., a photodiode).

In some embodiments, the system 2400 may also include a light sensing device 2615, an analog-to-digital converter (ADC) 2620 and a processing unit 2625 as shown in FIG. 26. The light sensing device 2615 may be configured to convert the complementary modulated light stream into a device output signal representing intensity of the complementary modulated light stream as a function of time. The light sensing device 2615 may be realized as variously described above in connection with light sensing device 130. (A lens may be used to focus or direct or concentrate the complementary modulated light stream onto the light sensing device.) The analog-to-digital converter (ADC) 2620 may be configured to sample the device output signal to obtain an output sample sequence. The output sample sequence may be stored into memory. The processing unit 2625 may be configured to reconstruct a temporal sequence (e.g., a video sequence) of images based on the output sample sequence, e.g, as variously described above in connection with system 100 and system realization 200. The temporal sequence of images may be displayed via a display device.

Figure 27:
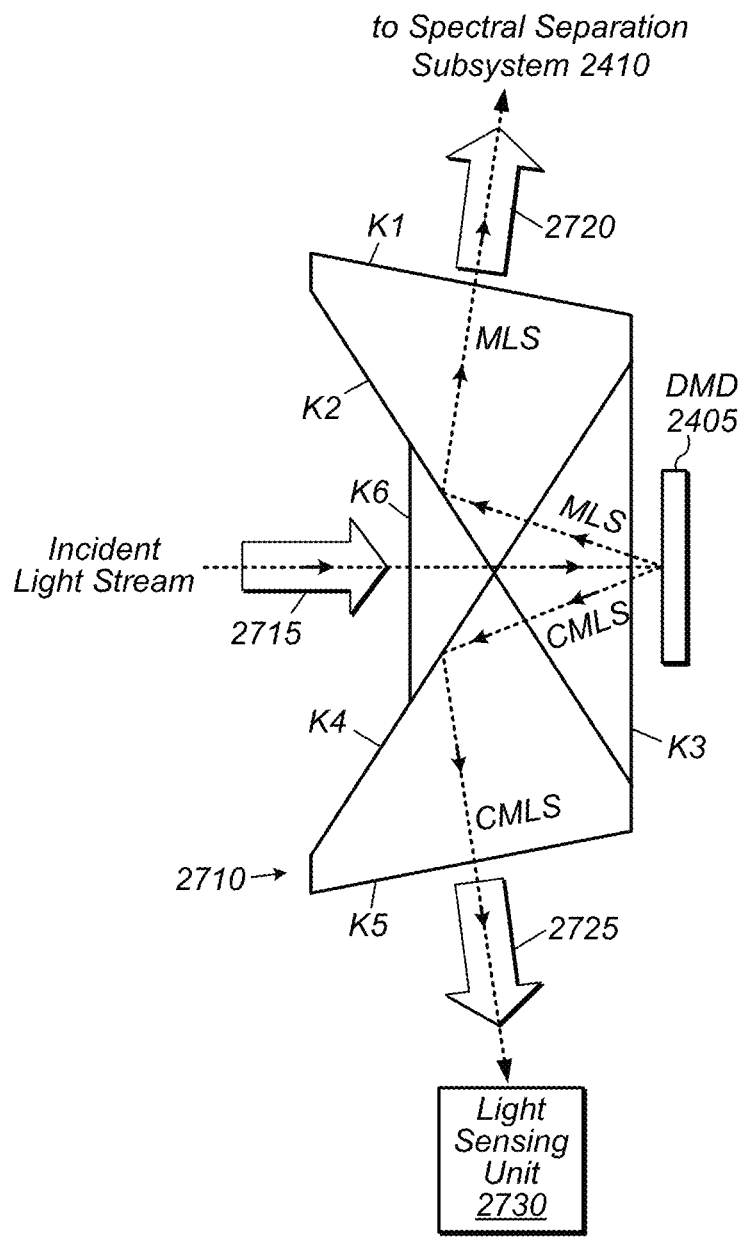
FIG. 27 illustrates one embodiment of a dual TIR prism that may be used to decrease the amount of space required to effectively separate the modulated light stream MLS and the complementary modulated light stream CMLS from each other and from the incident light stream, so that the two streams may be separately sensed.

In some embodiments, system 2400 may include a dual TIR prism 2710 and a light sensing unit 2712 as shown in FIG. 27. (TIR is an acronym for Total Internal Reflection.) The dual TIR prism may receive the incident light stream from an input path 2715 and transmit the incident light stream to the DMD 2405. The dual TIR prism is further configured to receive the modulated light stream MLS and the complementary modulated light stream CMLS from the DMD, to totally internally reflect the modulated light stream MLS onto an output path 2720 leading to the spectral separation subsystem 2410, and to totally internally reflect the complementary modulated light stream CMLS onto an output path 2725 leading to a light sensing unit 2730. The light sensing unit may be configured to receive the complementary modulated light stream CMLS from the output path 2725, and to generate one or more output signals representative of the complementary modulated light stream. For example, light sensing unit 2730 may be realized by the light sensing array 2515 or the light sensing device 2615 described above.

Figure 28:
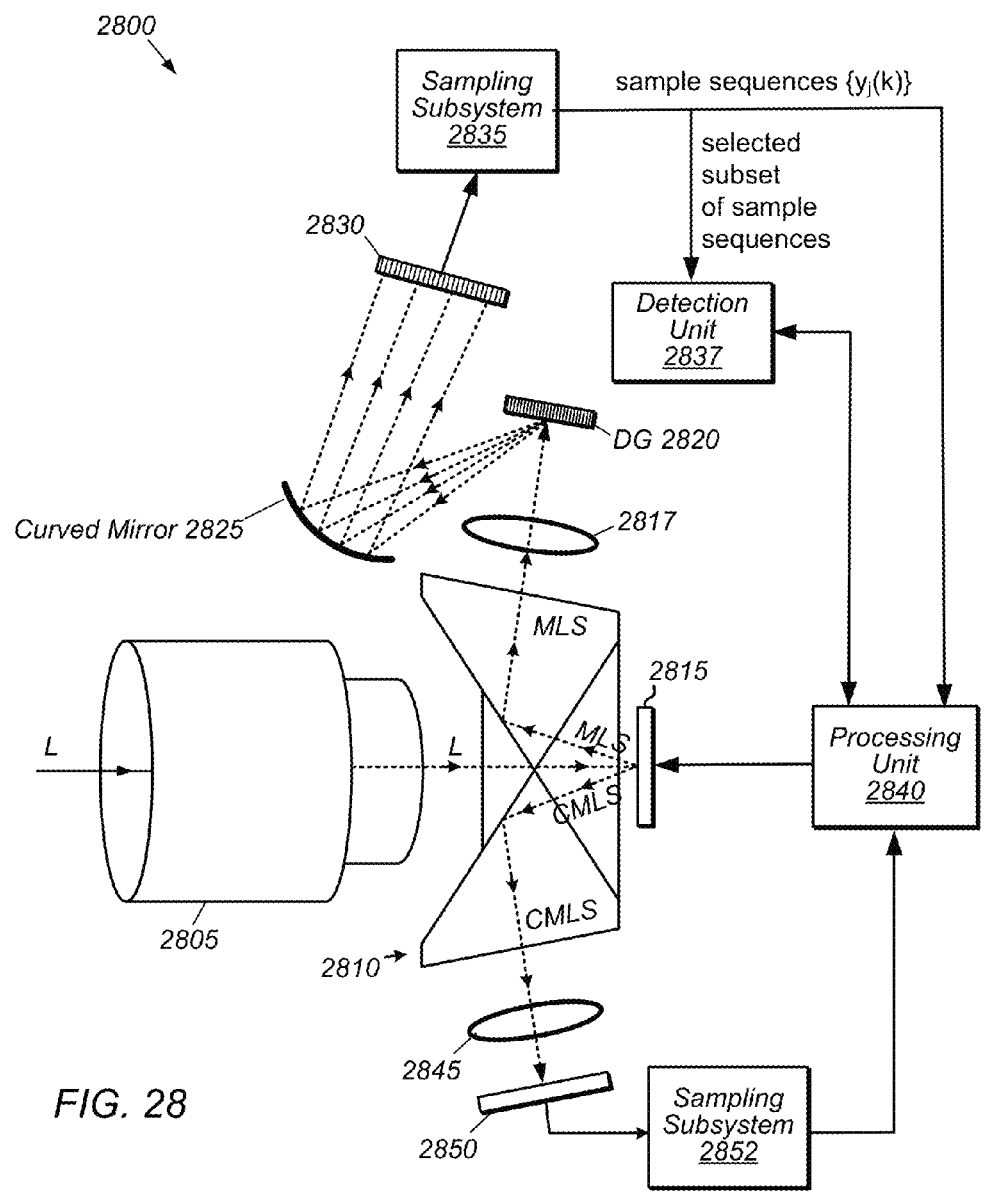
FIG. 28 illustrates one embodiment of a system 2800 including a dual TIR prism 2810.

FIG. 28 illustrates an embodiment 2800 of system 2400. A camera lens 2805 may receive and operate on the incident light stream L. The incident light stream L then passes through the dual TIR prism 2810 and is supplied to the DMD 2815. The DMD 2815 modulates the incident light stream as variously described above to obtain a modulated light stream MLS and a complementary modulated light stream CMLS. The dual TIR prism receives the modulated light stream MLS and complementary modulated light stream CMLS, and reflects those streams onto output paths leading respectively to lens 2817 and lens 2845. Lens 2817 may image the modulated light stream onto the diffraction grating 2820. The diffraction grating 2820 may diffract the modulated light stream into a plurality of wavelength components, as variously described above. A curved mirror 2825 may be used to reflect the wavelength components onto an array 2830 of light sensing elements. The light sensing elements convert respective subsets (e.g., respective bands) of the wavelength components into respective signals. The sampling subsystem 2825 samples the signals to generate respective sample sequences. The detection unit 2837 and processing unit 2840 may operate as variously described above. The lens 2845 may focus, image or direct or concentrate the complementary modulated light stream CMLS onto the light sensing unit 2850. The light sensing unit 2850 may be realized by the light sensing array 2515, in which case the lens 2845 may image the CMLS onto the light sensing array 2515. Alternatively, the light sensing unit 2850 may be realized by the light sensing device 2615, in which case the lens 2845 may focus or direct or concentrate the CMLS onto the light sensing device 2615. The light sensing unit 2850 converts the CMLS into one or more signals as variously described above. The sampling subsystem 2852 converts the one or more signals respectively into one or more sample sequences. The processing unit 2840 may reconstruct a sequence of images based on the one or more sample sequences.

Separately Sensing Zeroth Order and First Order Diffraction Beams

Figure 29:
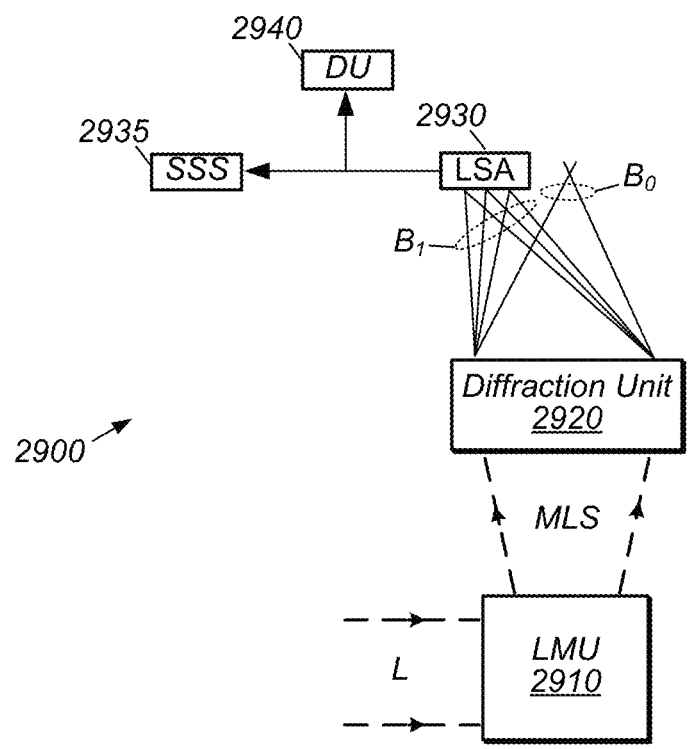
FIG. 29 illustrates one embodiment of a system 2900 that performs event detection using a first-order diffraction beam generated by a diffraction unit.

In one set of embodiments, a system 2900 may be configured as shown in FIG. 29. The system 2900 includes a light modulation unit 2910, a diffraction unit 2920, an array 2930 of light sensing elements, a sampling subsystem 2935 and a detection unit 2940. (Furthermore, system 2900 may include any subset of the features, elements and embodiments described above in connection with system 100, system realization 200, system 1300, method 1700, system 1800, system 2400 and system 2800.)

The light modulation unit 2910 may be configured to receive an incident light stream L, and modulate the incident light stream L with a temporal sequence of spatial patterns to obtain a modulated light stream MLS. The light modulation unit 2910 may be realized as variously described above in connection with system 100, system realization 200 and system 1300.

The diffraction unit 2920 may be configured to diffract the modulated light stream into a zeroth-order diffraction beam $B_0$ and a first-order diffraction beam $B_1$. (For a basic tutorial on the subject of diffraction, see the Wikipedia page on diffraction at http://en.wikipedia.org/wiki/Diffraction_grating.) Thus, the wavelength components present in the modulated light stream MLS are spatially separated (angularly spread out) in the beam $B_1$ but not spatially separated in the beam $B_0$. The diffraction unit may be realized by a diffraction grating, e.g., a transmission grating.

The light sensing elements of the light sensing array (LSA) 2930 may be configured to receive respective subsets (e.g., bands) of the wavelength components of the first-order beam $B_1$ and to generate respective spectral element signals. Each of the spectral element signals represents intensity of the respective subset of the wavelength components as a function of time.

The sampling subsystem (SSS) 2935 may be configured to sample the spectral element signals in order to obtain respective spectrally-limited sample sequences. The spectrally-limited sample sequences may be stored into a memory of the system 2900.

The detection unit (DU) 2940 may be configured (e.g., as variously described above in connection with system 1300 and method 1700) to monitor a selected subset of the spectral element signals to detect an event occurring within a field of view corresponding to the incident light stream. The action of detecting the event includes determining when the selected subset of the spectral element signals satisfy a pre-determined signal condition, e.g., as variously described above.

Figure 30:
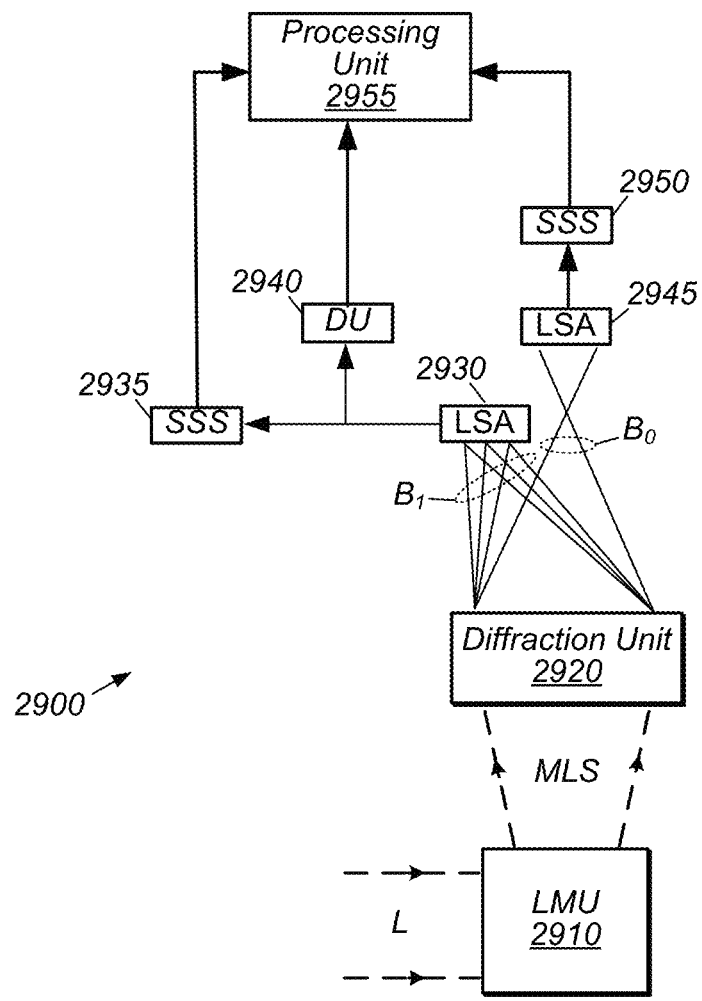
FIG. 30 illustrates an embodiment of system 2900 that separately senses the zeroth-order diffraction beam generated by the diffraction unit.

In some embodiments, system 2900 may also include an array of light sensing elements 2945, a sampling subsystem (SSS) 2950 and a processing unit 2955 as shown in FIG. 30.

The light sensing elements of the light sensing array (LSA) 2945 may be configured to convert spatial portions of the zeroth-order beam $B_0$ into respective spatial element signals. Each of the spatial element signals represents intensity of the respective spatial portion as a function of time.

The sampling subsystem (SSS) 2950 may be configured to sample the spatial element signals to obtain respective spatially-limited sample sequences. The spatially-limited sample sequences may be stored into memory.

The processing unit 2955 may be configured to reconstruct a temporal sequence of images based on the spatially-limited sample sequences. For example, each of the spatially-limited sample sequences may be used to reconstruct a corresponding temporal sequence of subimages representative of a corresponding portion of the field of view.)

Figure 31:
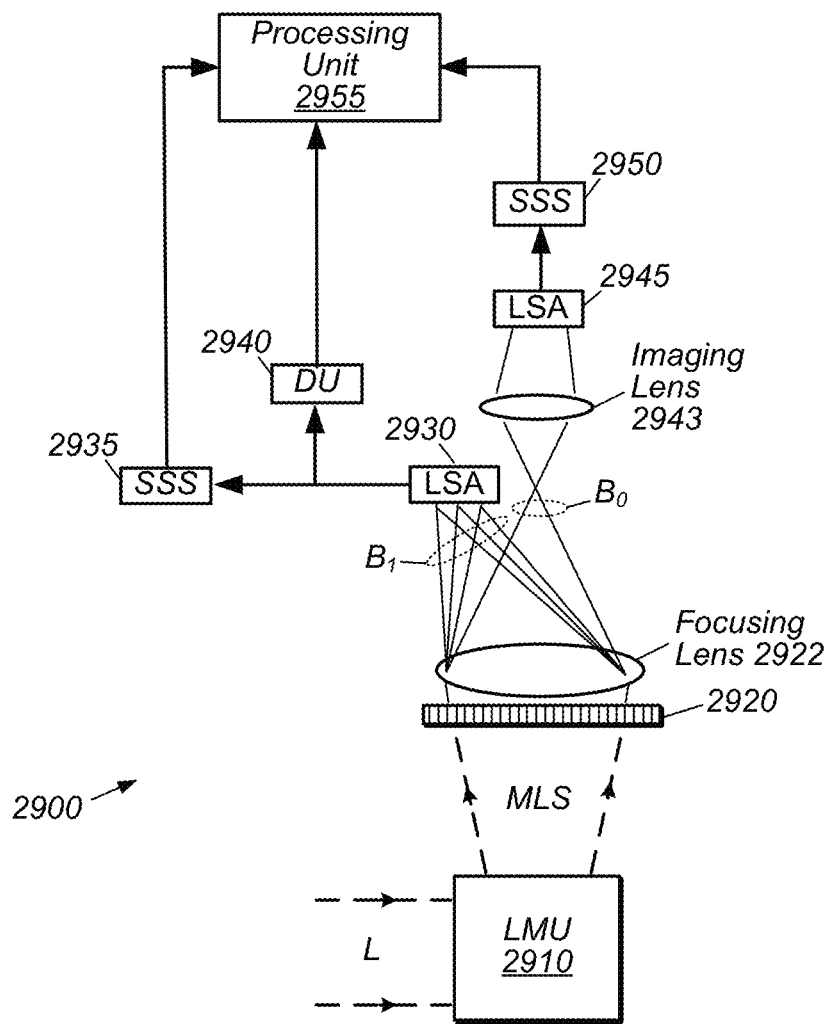
FIG. 31 illustrates an embodiment of system 2900 where the diffraction unit is realized by a diffraction grating.

In some embodiments, the system 2900 may include a focusing lens 2922 and/or an imaging lens 2943 as shown in FIG. 31. The focusing lens 2922 directs (e.g, focuses) the beam $B_0$ to the imaging lens 2950, which images the beam $B_0$ onto the sensing array 2950. The focusing lens 2922 also directs (e.g., focuses) the beam $B_i$ to the sensing array 2930.

Figure 32:
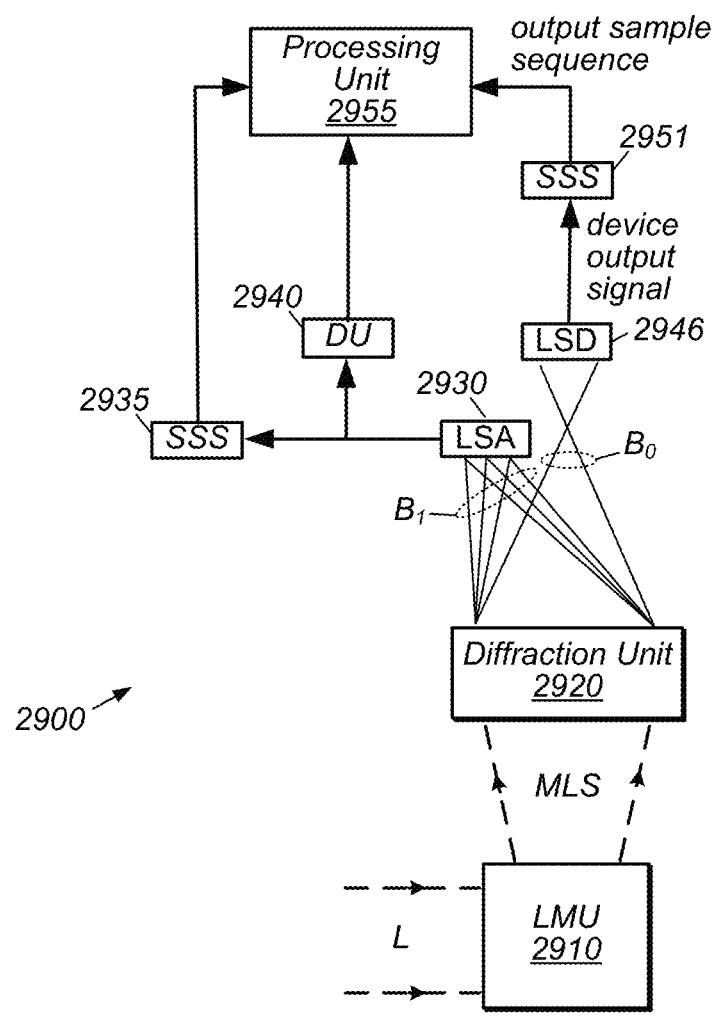
FIG. 32 illustrates an embodiment of system 2900 where the zeroth-order diffraction beam is sensed by a light sensing device (e.g., a photodiode).

In some embodiments, the system 2900 may include a light sensing device 2946 and a sampling subsystem 2951 as shown in FIG. 29. The light sensing device 2946 may be configured to convert the zeroth-order beam $B_0$ into a device output signal representing intensity of the zeroth-order beam as a function of time. The analog-to-digital converter (ADC) 2951 may be configured to sample the device output signal to obtain an output sample sequence (and to store the output sample sequence). The processing unit 2955 may be configured to reconstruct a temporal sequence of images based on the output sample sequence, e.g., as variously described above. Furthermore, the system of FIG. 32 may include a lens to focus or direct the beam $B_0$ onto the light sensing device 2946 and/or to focus or direct the beam $B_1$ onto the light sensing array 2930, e.g., as variously described above.

Figure 33:
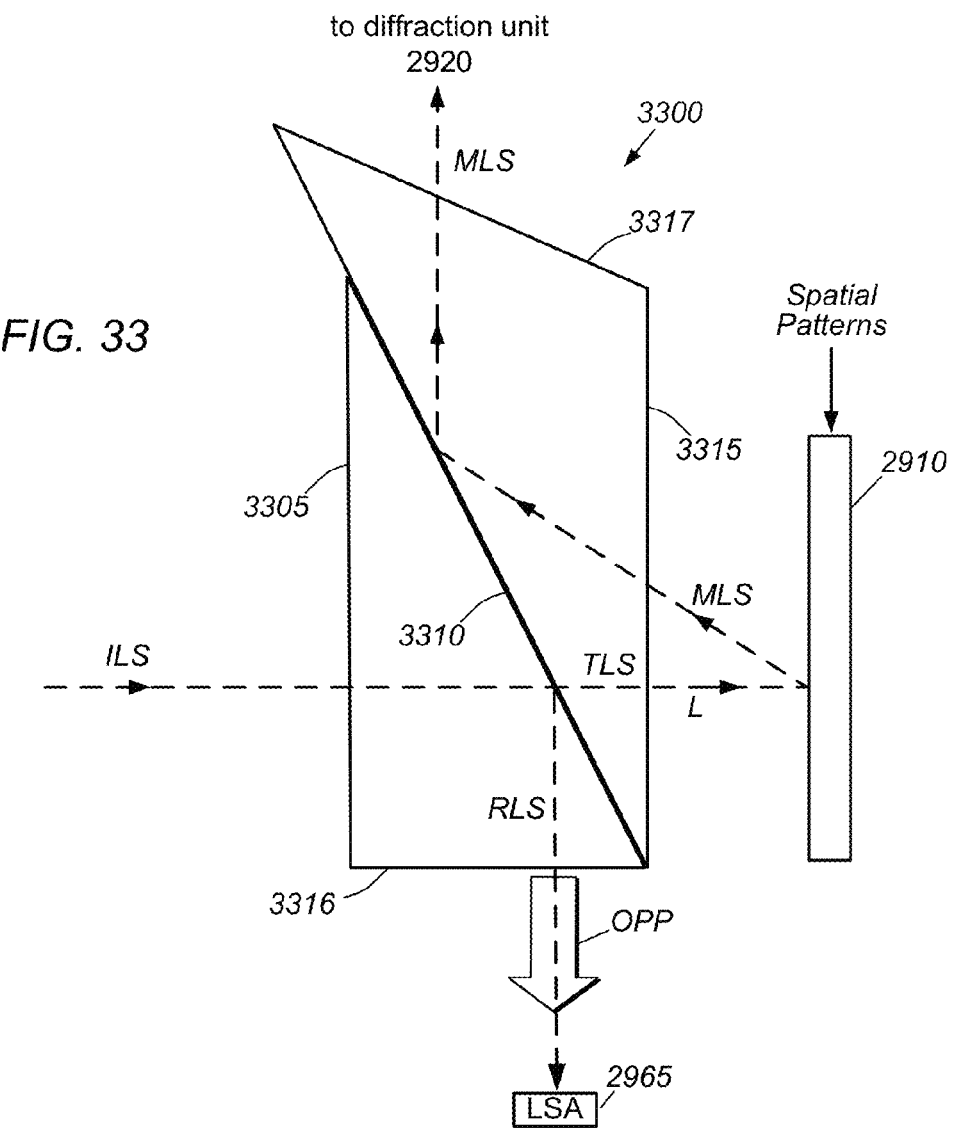
FIG. 33 illustrates one embodiment of a TIR prism pair 3300 configured partially transmit and partially reflect an input light stream ILS from an internal interface 3310.

In some embodiments, the system 2900 may also include a TIR prism pair 3300 as shown in FIG. 33. (In these embodiments, the light modulation unit 2910 may be a digital micromirror device.) The TIR prism pair may be configured to receive an input light stream ILS (from the external environment) at an external surface 3305, to partially transmit and partially reflect the input light stream at an internal interface 3310 in order to respectively generate a transmitted light stream TLS and a reflected light stream RLS, to output the transmitted light stream TLS at an external surface 3315, and to output the reflected light stream at external surface 3316 onto an output path OPP. The incident light stream L received by the light modulation unit 2910 is the same as the transmitted light stream as outputted onto the first output path. The modulated light stream MLS produced by the light modulation unit 2910 enters the TIR prism pair at the surface 3315, is totally internally reflected at internal interface 3310 and outputted (at external surface 3317) onto a path leading to the diffraction unit 2920.

In some embodiments, the internal interface 3310 of the TIR prism pair may be configured so that the reflected light stream is spectrally different from the transmitted light stream. For example, the interface may realize a spectral filter. In one embodiment, the reflected light stream RLS may comprise visible light while the transmitted light stream TLS comprises SWIR light.

In some embodiments, the system 2900 may also include an array 2965 of light sensing elements. The array 2965 may be configured to receive the reflected light stream RLS from the output path OPP, and to capture a temporal sequence of images representative of the reflected light stream. For example, the array 2865 may be a CMOS sensor array. Because the reflected light stream RLS is a partial reflection of the input light stream ILS and does not experience the modulating action of the light modulation unit 2910, the images of the temporal sequence directly represent the external scene, without the need to execute a compressive-sensing reconstruction algorithm. The temporal sequence of images may be displayed via a display device.

In some embodiments, the above-described embodiment of system 2900, i.e., including the array 2965 may be used to realize a dual-band imager. For example, the array 2965 may be capture visible light images while the light sensing array 2930 captures SWIR light. For example, the internal interface 3310 may be configured to so that the reflected light stream comprises only (or mostly) visible light while the modulated light stream MLS, after total internal reflection at the internal interface 3310 comprises only (or mostly) SWIR light. The diffraction unit 2910 then separates the modulated light stream MLS into wavelength components within the SWIR range. Image registration may be necessary to integrate the images from the different bands.

Any of the various embodiments described herein may be combined to form composite embodiments. Furthermore, any of the various features, embodiments and elements described in U.S. Provisional Application No. 61/502,153 may be combined with any of the various embodiments described herein.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
 a spectral separation subsystem configured to receive a modulated light stream, wherein the modulated light stream is generated by modulating an incident light stream with a temporal sequence of spatial patterns, wherein the incident light stream carries images from an external environment, wherein the spatial patterns belong to a set of measurement vectors that is incoherent with a second set of vectors in which the images are sparse, wherein the spectral separation subsystem is configured to separate the modulated light stream into a plurality of wavelength components;
 an array of light sensing elements, wherein the light sensing elements are configured to receive respective subsets of the wavelength components and to generate respective electrical signals, wherein each of the electrical signals represents intensity of the respective subset of the wavelength components as a function of time;
 a sampling subsystem configured to sample the electrical signals in order to obtain respective sample sequences;
 a detection unit configured to monitor a selected subset of the electrical signals to detect an event occurring within a field of view corresponding to the incident light stream, wherein said detecting the event includes determining when the selected subset of electrical signals satisfy a pre-determined signal condition;
 a processing unit configured to reconstruct a temporal sequence of images based on the sample sequences;
 a display device configured to the display the temporal sequence of images to a user;

wherein the processing unit is configured to:
    in response to detecting said event, reconstruct a first image and a second image, wherein first image is reconstructed based on a first window of samples taken from the sample sequences corresponding to the selected subset, wherein the second image is reconstructed based on a second window of samples taken from the sample sequences corresponding to the selected subset, wherein the first window corresponds to a first time interval prior to the event, wherein the second window corresponds to a second time interval that at least partially includes the event;
    determine spatial localization information based on a difference between the first image and the second image, wherein the spatial localization information indicates where the event has occurred in the field of view; and
    inject a visual representation of the spatial localization information into at least a subset of the images of said temporal sequence of images, enabling the user to identify where the event has occurred in the field of view.

2. The system of claim 1, wherein the pre-determined signal condition is the condition that the electrical signals of the selected subset simultaneously exceed respective programmable thresholds.

3. The system of claim 1, wherein the detection unit includes a plurality of analog comparator circuits configured to compare respective electrical signals of the selected subset to respective programmable thresholds.

4. The system of claim 1, wherein the detection unit includes a plurality of digital comparator circuits, wherein each of the digital comparator circuits is configured to compare a respective one of the sample sequences of the selected subset to a respective programmable threshold.

5. The system of claim 1, wherein the detection unit includes a plurality of digital circuits, wherein each of the digital circuits is configured to compare a rate of change of a respective one of the sample sequences of the selected subset to a respective programmable threshold.

6. The system of claim 1, wherein the pre-determined signal condition is the logical AND of a first condition and a second condition, wherein the first condition is that the electrical signals of the selected subset simultaneously exceed respective programmable value thresholds, wherein the second condition is that rates of change of the respective electrical signals of the selected subset simultaneously exceed respective programmable rate thresholds.

7. The system of claim 1, wherein the pre-determined signal condition is the condition that the electrical signals of the selected subset have respective values that conform to a pre-determined spectral signature.

8. The system of claim 1, wherein said plurality of wavelength components comprises one or more continuous distributions of wavelength components spanning a wavelength range.

9. The system of claim 1, wherein the array of light sensing elements comprises a linear array.

10. The system of claim 1, wherein the processing unit is configured to:
    in response to detecting said event, perform a search process on one or more of the sample sequences belonging to the selected subset and during the occurrence of the event in order to identify a spatial subregion within the field of view that contains the event, wherein the search process includes:
        injecting search patterns into the temporal sequence of spatial patterns; and
        analyzing the samples of the one or more sample sequences in response to the injection of the search patterns.

11. The system of claim 10, wherein the search process includes a hierarchical search based on a quadtree, wherein the quadtree corresponds to a recursive partitioning of the field of view into rectangular subsets.

12. The system of claim 10, wherein the processing unit is further configured to:
    inject a visual representation of the spatial subregion into at least a subset of the images of said temporal sequence of images.

13. The system of claim 1, wherein the selected subset of the electrical signals is programmable.

14. A method comprising:
    receiving a modulated light stream, wherein the modulated light stream is generated by modulating an incident light stream with a temporal sequence of spatial patterns;
    separating the modulated light stream into a plurality of wavelength components;
    converting subsets of the wavelength components into respective electrical signals, wherein each of the electrical signals represents intensity of the respective subset of the wavelength components as a function of time;
    sampling the electrical signals in order to obtain respective sample sequences;
    monitoring a selected subset of the electrical signals to detect an event occurring within a field of view corresponding to the incident light stream, wherein said detecting the event includes determining when the selected subset of electrical signals satisfy a pre-determined signal condition; and
    reconstructing a temporal sequence of images based on the sample sequences;
    displaying the sequence of temporal images via a display device;
    in response to detecting said event, reconstructing a first image and a second image, wherein first image is reconstructed based on a first window of samples taken from the sample sequences corresponding to the selected subset, wherein the second image is reconstructed based on a second window of samples taken from the sample sequences corresponding to the selected subset, wherein the first window corresponds to a first time interval prior to the event, wherein the second window corresponds to a second time interval that at least partially includes the event;
    determining spatial localization information based on a difference between the first image and the second image, wherein the spatial localization information indicates where the event has occurred in the field of view; and
    injecting a visual representation of the spatial localization information into a subset of the images of said temporal sequence of images, enabling a user to identify where the event has occurred in the field of view.

15. The method of claim 14, wherein the pre-determined signal condition is the condition that the electrical signals of the selected subset simultaneously exceed respective programmable thresholds.

16. The method of claim 14, wherein the pre-determined signal condition is the condition that rates of change of the respective electrical signals of the selected subset exceed respective programmable thresholds.

17. The method of claim 14, wherein the pre-determined signal condition is the condition that the electrical signals of the selected subset have respective values that conform to a pre-determined spectral signature.

18. The method of claim 14, wherein said reconstructing the temporal sequence of images is initiated in response to said detection of the event.

19. The method of claim 14, further comprising:
in response to detecting said event, performing a search process on one or more of the sample sequences belonging to the selected subset and during the occurrence of the event in order to identify a spatial subregion of the field of view that contains the event, wherein the search process includes:
injecting search patterns into the temporal sequence of spatial patterns; and
analyzing the samples of the one or more sample sequences in response to the injection of the search patterns.

20. The method of claim 19, wherein the search process includes a hierarchical search based on a quadtree, wherein the quadtree corresponds to a recursive partitioning of the field of view into rectangular subsets.

21. The method of claim 19, further comprising:
injecting a visual representation of the spatial subregion into at least a subset of the images of said temporal sequence of images.

22. The method of claim 14, wherein the selected subset of the electrical signals is programmable.

* * * * *